United States Patent
Feinberg et al.

[11] Patent Number: 6,065,046
[45] Date of Patent: *May 16, 2000

[54] COMPUTERIZED SYSTEM AND ASSOCIATED METHOD OF OPTIMALLY CONTROLLED STORAGE AND TRANSFER OF COMPUTER PROGRAMS ON A COMPUTER NETWORK

[75] Inventors: Michael A. Feinberg; Matthew A. Feinberg, both of Ghent, N.Y.

[73] Assignee: Catharon Productions, Inc., Ghent, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,591

[22] Filed: Jul. 29, 1997

[51] Int. Cl.[7] .................................................. G06F 15/167
[52] U.S. Cl. .......................................... 709/216; 709/218
[58] Field of Search ........................... 395/200.3, 200.33, 395/200.46, 200.62, 200.48, 200.49, 675; 385/684; 709/200, 216, 203, 232, 218, 219

[56] References Cited

U.S. PATENT DOCUMENTS

| | | | |
|---|---|---|---|
| 4,558,413 | 12/1985 | Schmidt et al. . | |
| 4,954,941 | 9/1990 | Redman . | |
| 5,329,619 | 7/1994 | Page et al. | 395/200.33 |
| 5,341,477 | 8/1994 | Pitkin et al. | 395/200.56 |
| 5,388,211 | 2/1995 | Hornbuckle . | |
| 5,426,427 | 6/1995 | Chinnock et al. . | |
| 5,473,772 | 12/1995 | Halliwell et al. . | |
| 5,475,813 | 12/1995 | Cieslak et al. . | |
| 5,475,819 | 12/1995 | Miller et al. | 395/200.33 |
| 5,497,479 | 3/1996 | Hornbuckle . | |
| 5,544,320 | 8/1996 | Konrad . | |
| 5,727,950 | 3/1998 | Cook et al. | 434/350 |
| 5,732,273 | 3/1998 | Srivastava et al. | 395/704 |
| 5,774,660 | 6/1998 | Brendel et al. | 395/200.31 |
| 5,819,020 | 10/1998 | Beeler, Jr. | 395/182.03 |
| 5,828,847 | 10/1998 | Gehr et al. | 395/200.69 |
| 5,850,449 | 12/1998 | McManis | 380/25 |

*Primary Examiner*—Zarni Maung
*Attorney, Agent, or Firm*—R. Neil Sudol; Henry D. Coleman

[57] ABSTRACT

A computerized system and an associated method for optimally controlling storage and transfer of computer programs between computers on a network to facilitate interactive program usage. In accordance with the method, an applications program is stored in a nonvolatile memory of a first computer as a plurality of individual and independent machine-executable code modules. In response to a request from a second computer transmitted over a network link, the first computer retrieves a selected one of the machine-executable code modules and only that selected code module from the memory and transmits the selected code module over the network link to the second computer.

36 Claims, 29 Drawing Sheets

Microfiche Appendix Included
(4 Microfiche, 325 Pages)

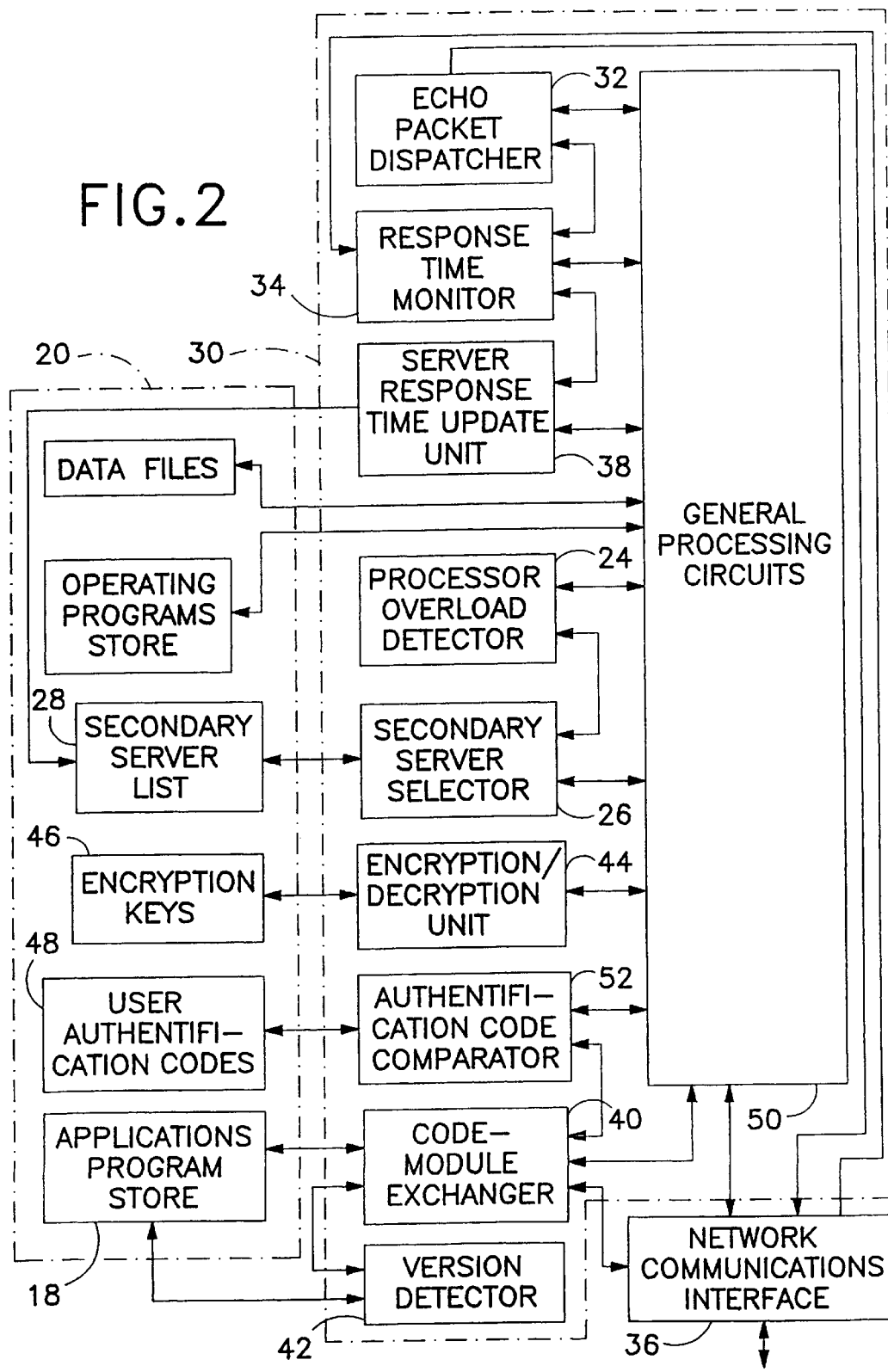

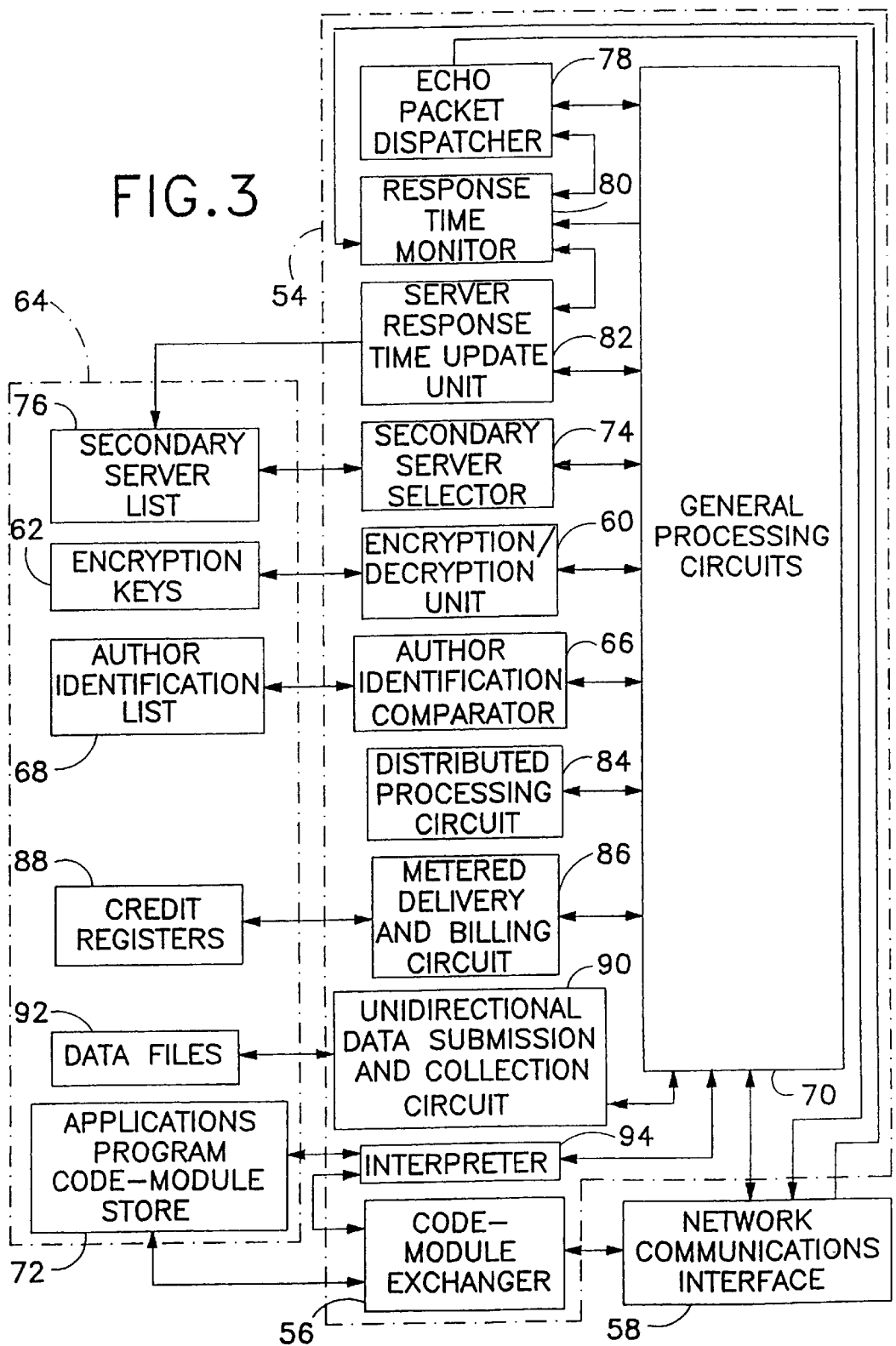

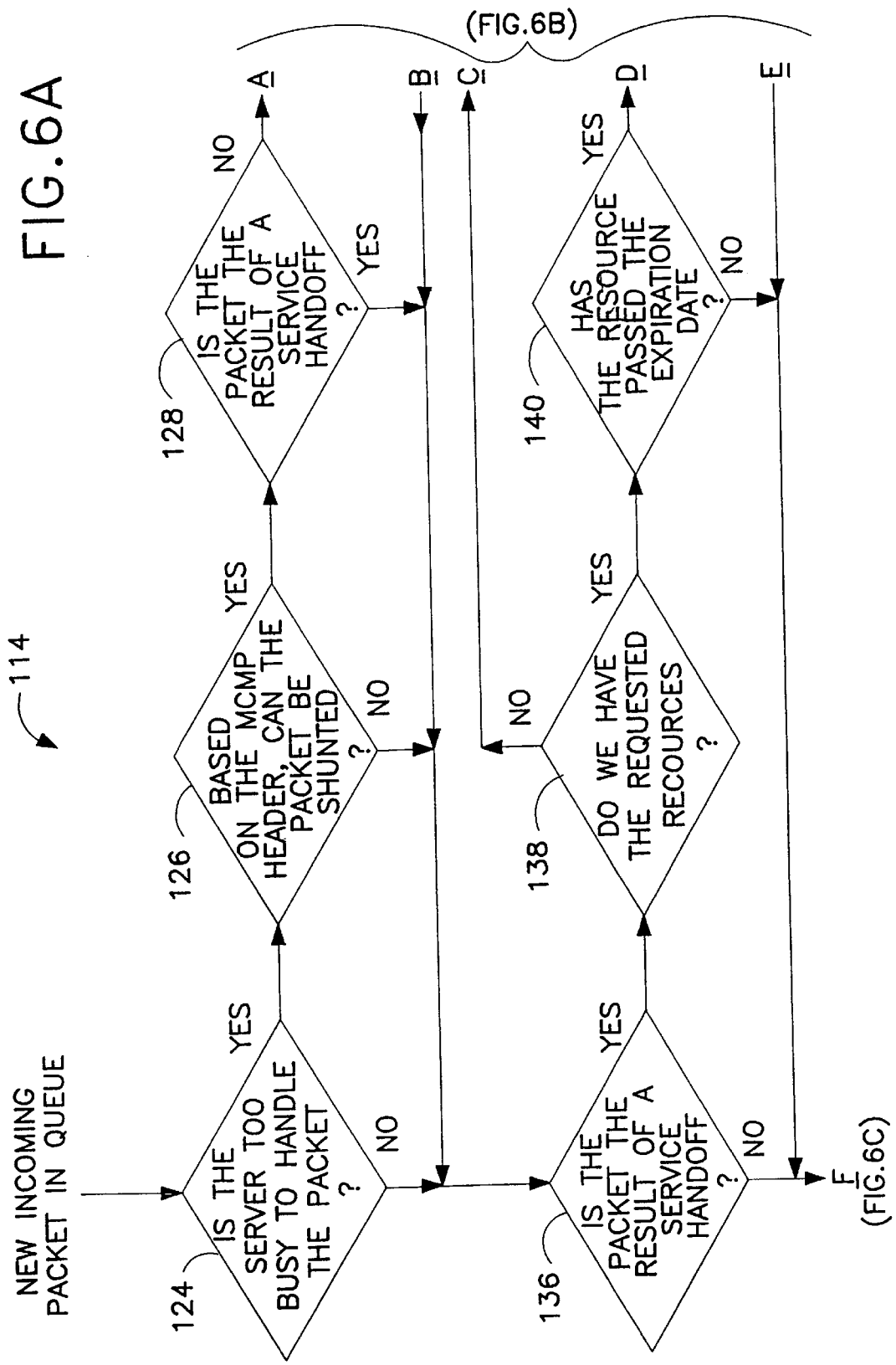

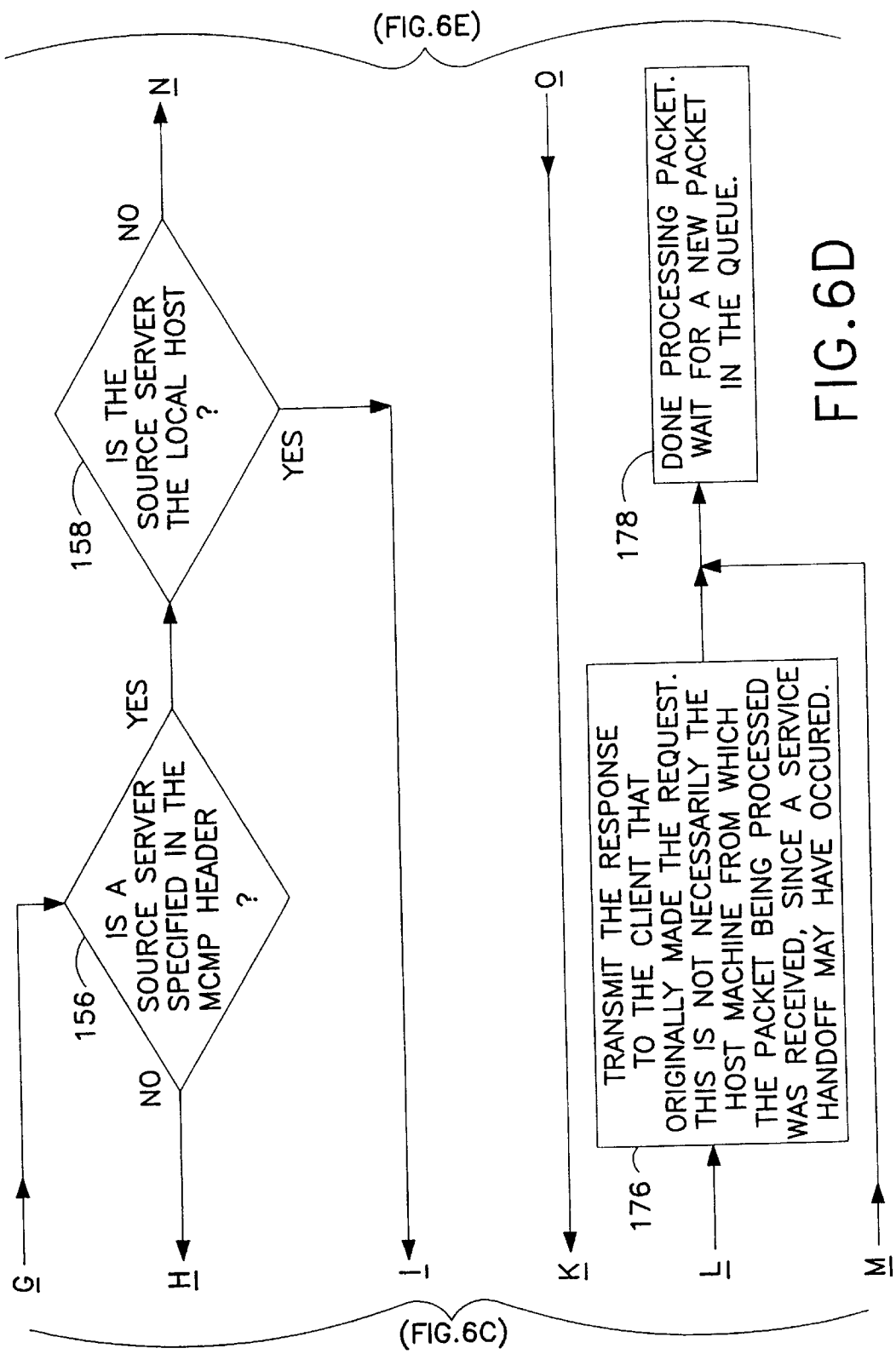

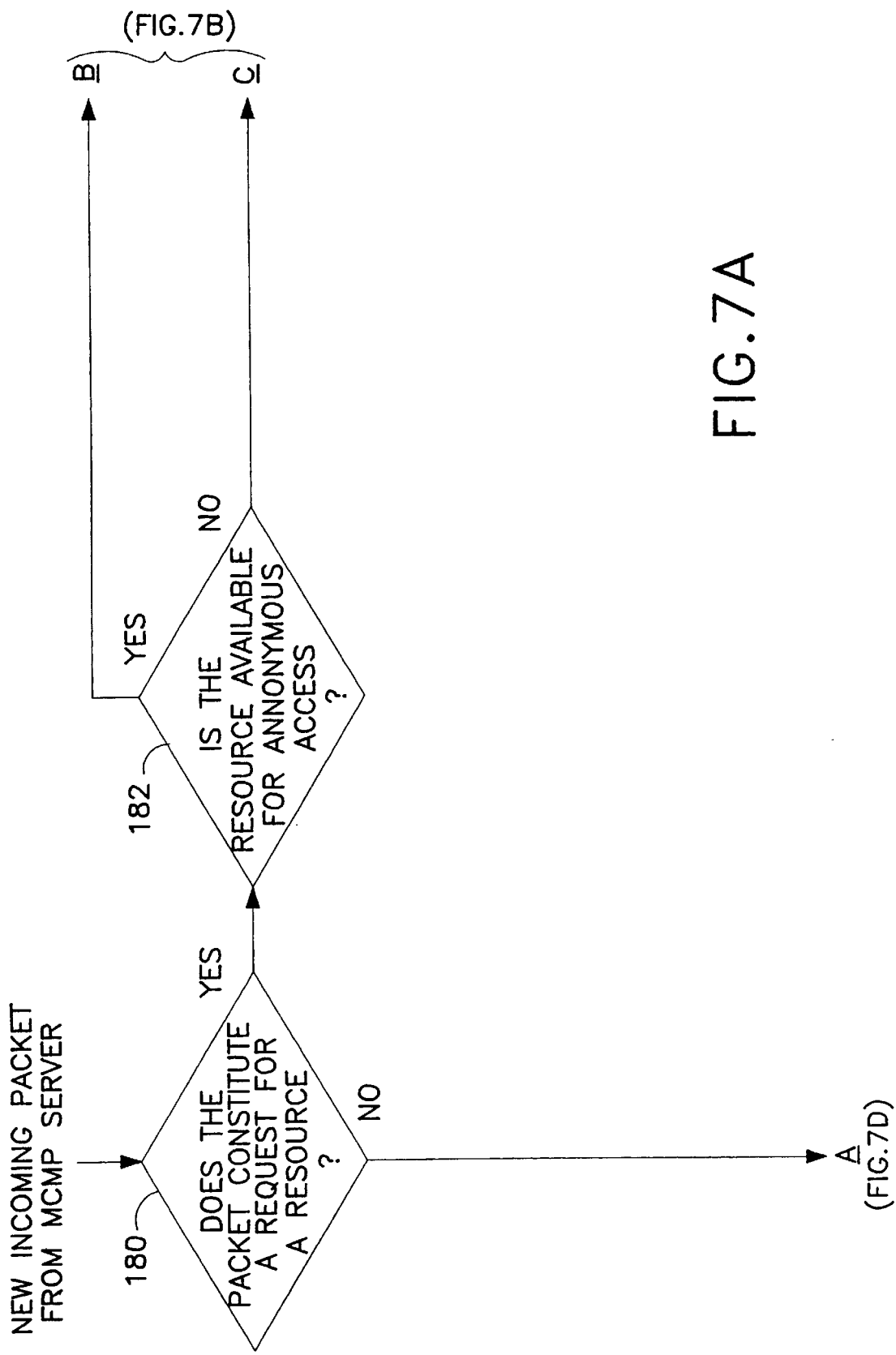

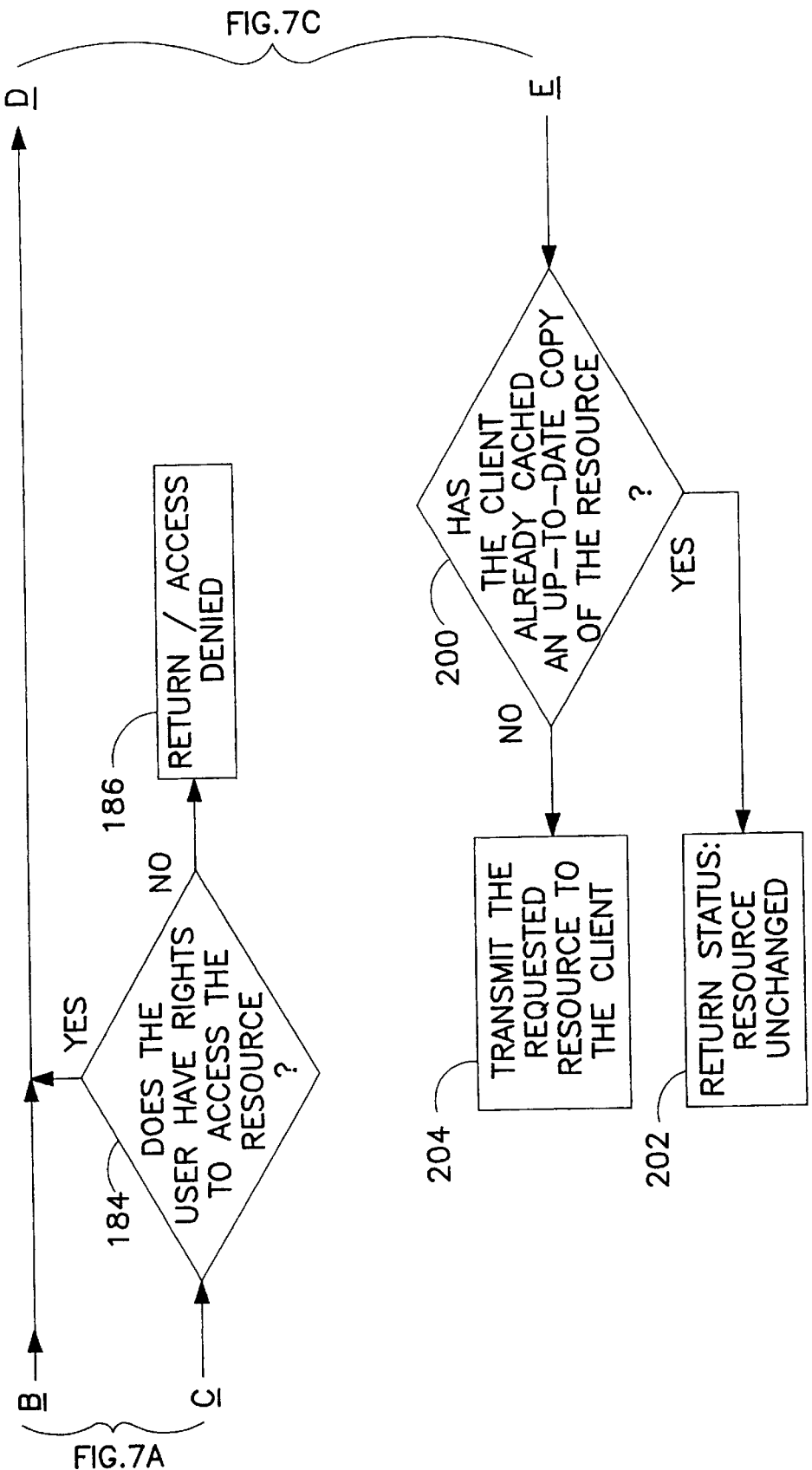

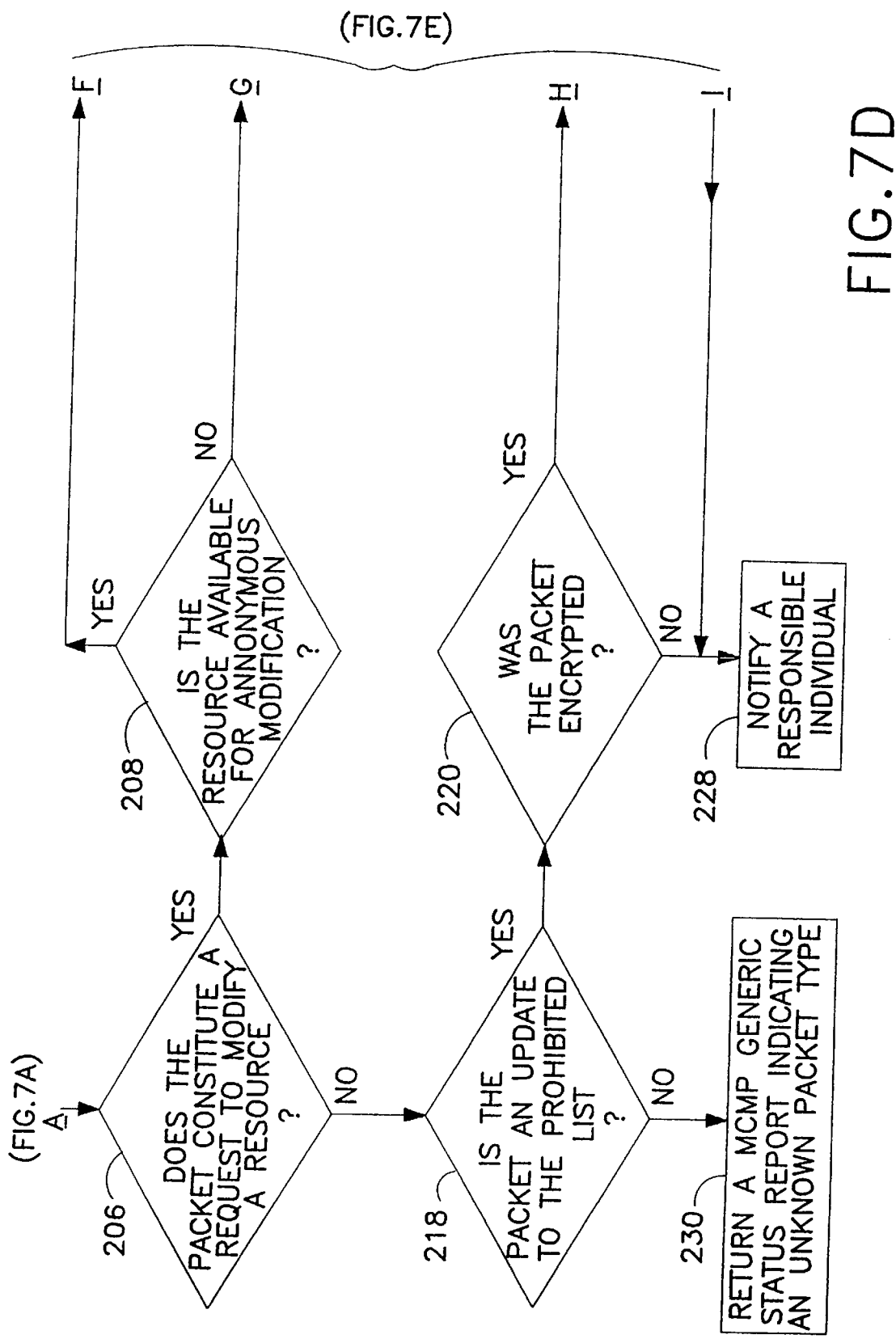

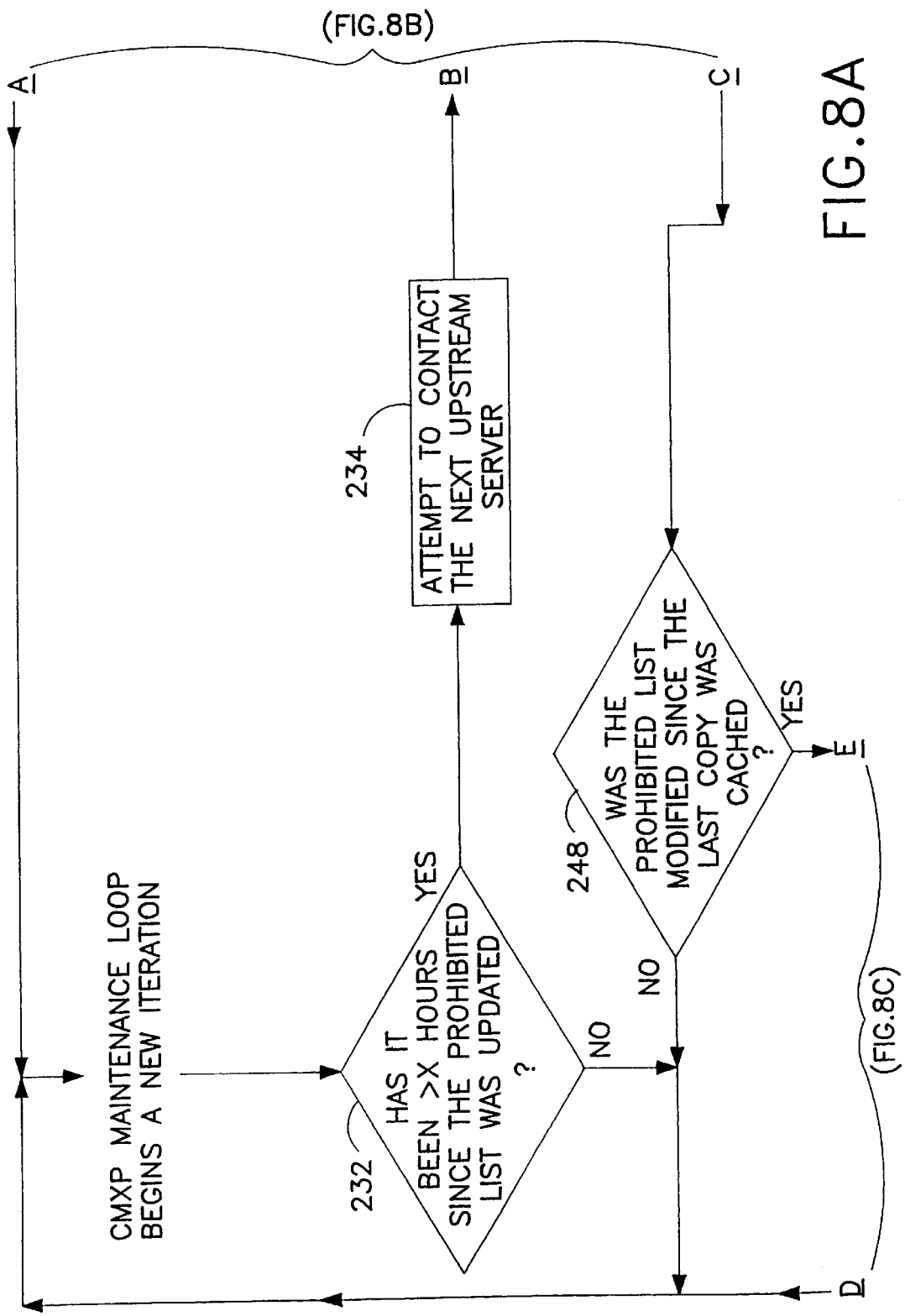

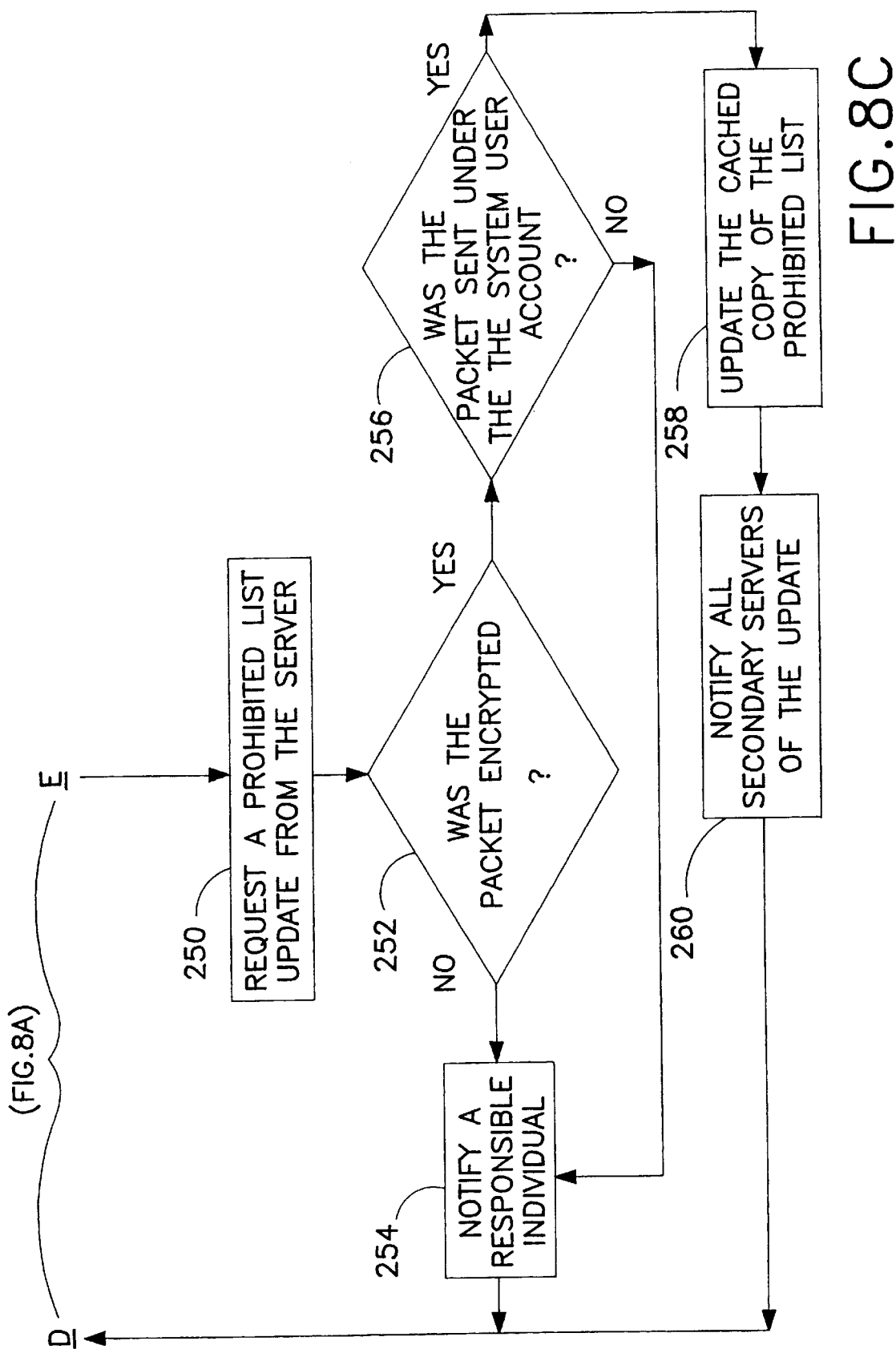

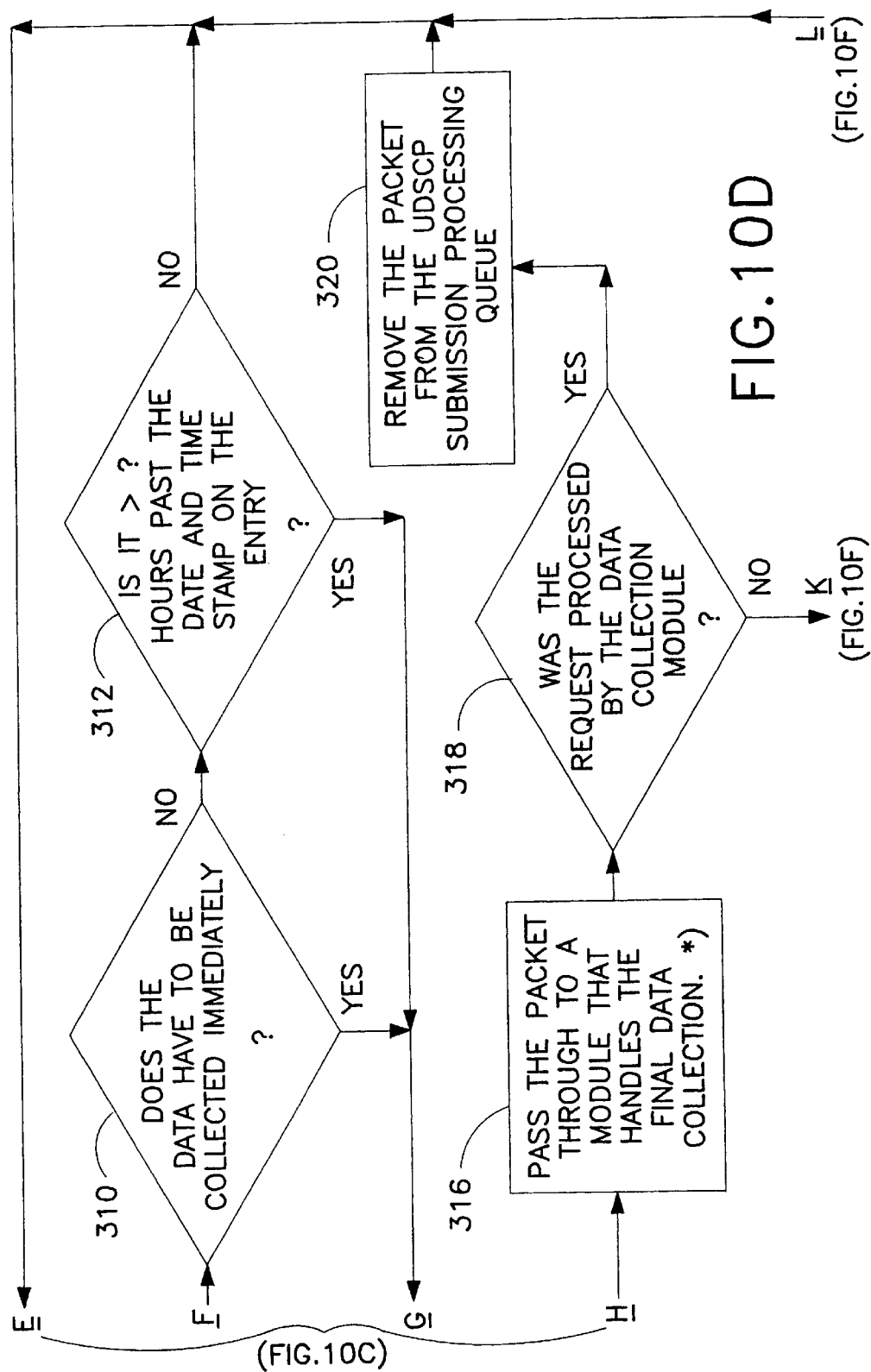

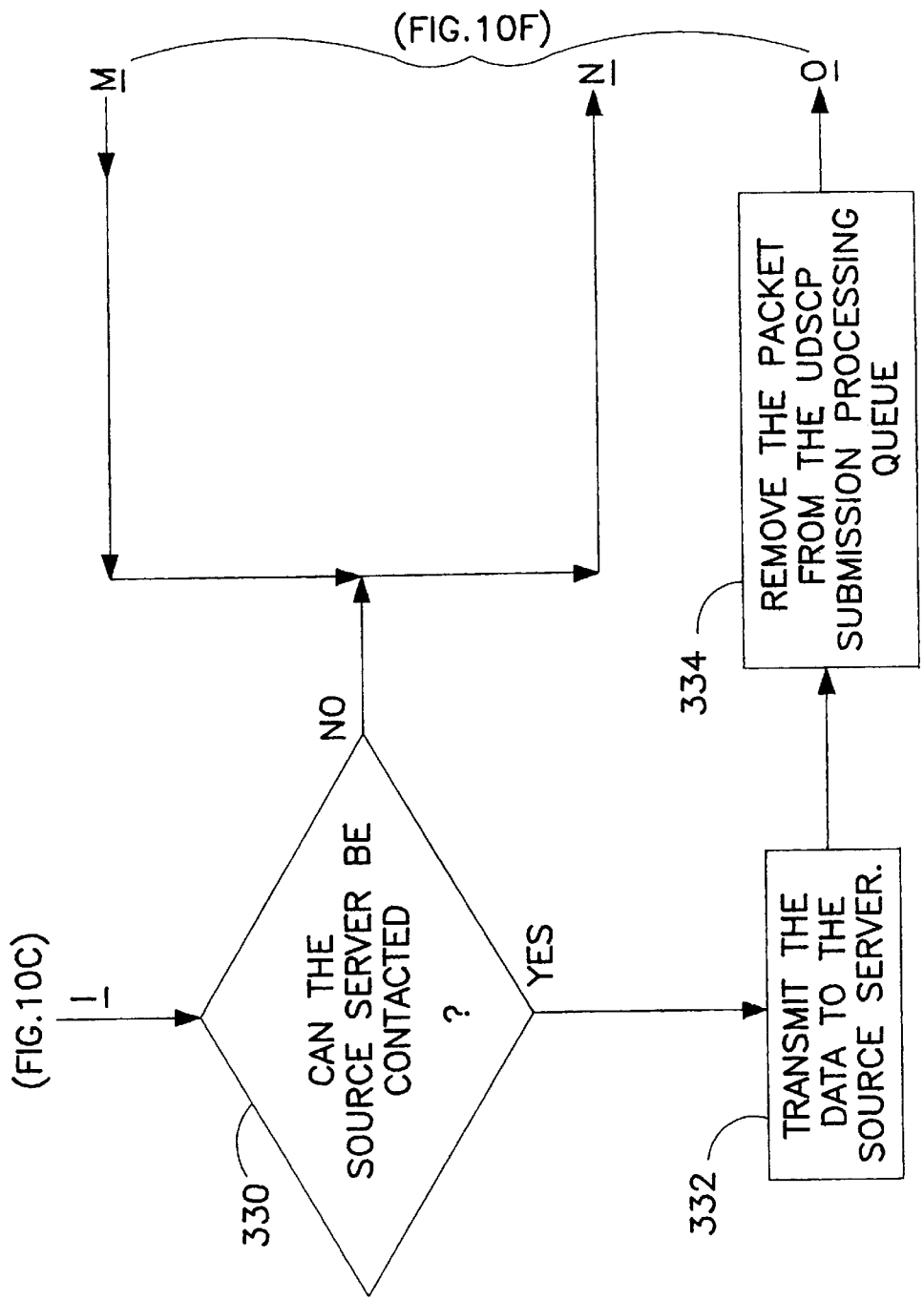

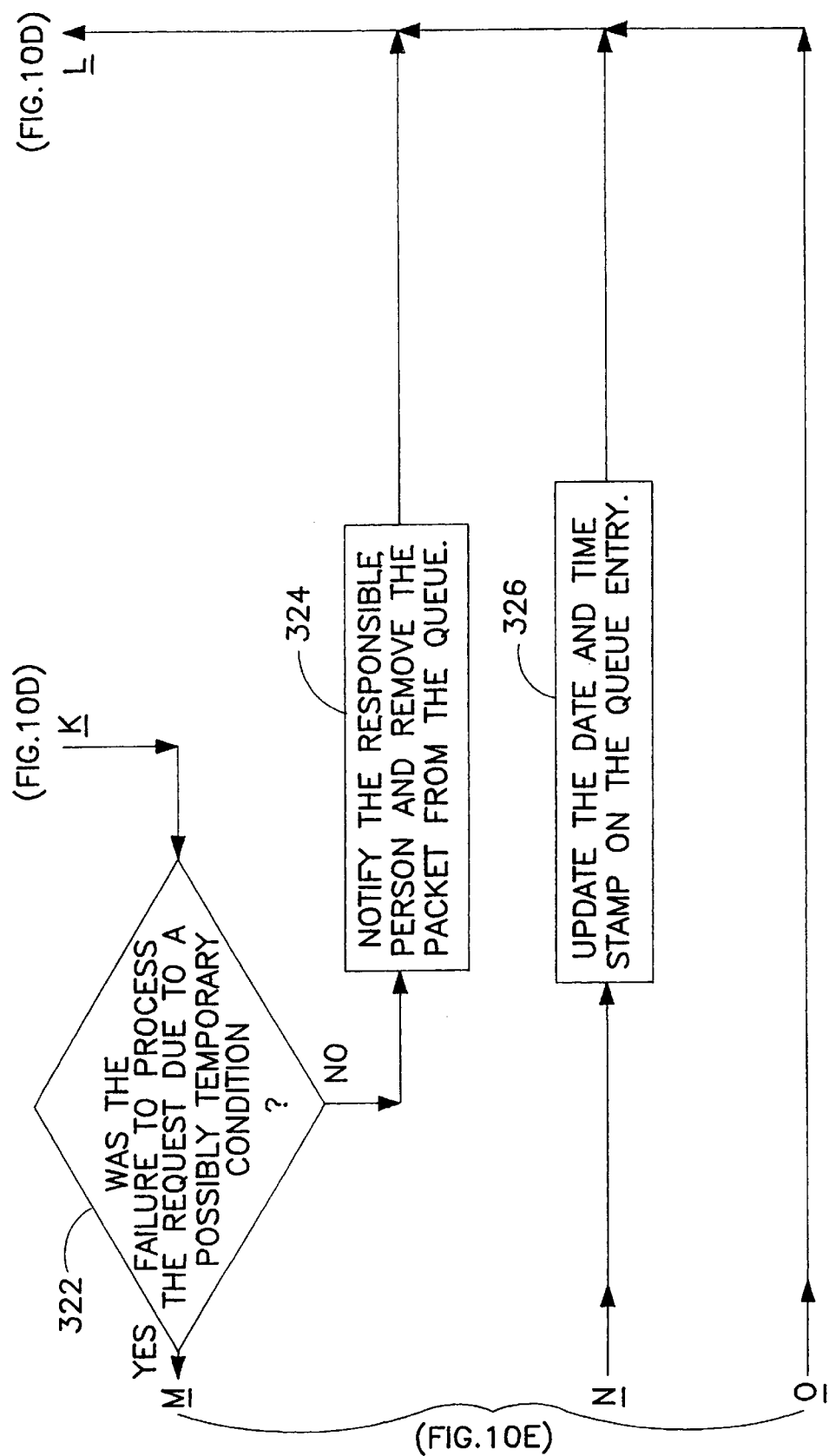

COMPUTERIZED SYSTEM AND ASSOCIATED METHOD OF OPTIMALLY CONTROLLED STORAGE AND TRANSFER OF COMPUTER PROGRAMS ON A COMPUTER NETWORK

This application includes a microfiche appendix consisting of four microfiche transparencies with a total of 325 frames including specification pages numbered 90 through 406.

BACKGROUND OF THE INVENTION

This invention relates to computing and communications on a computer network. More specifically, this invention relates to a computerized system and an associated method for optimally controlling storage and transfer of computer programs between computers on a network to facilitate interactive program usage.

In the past several years, there has been an ever increasing number of individuals, corporations and other legal entities which have obtained access to the global network of computers known as the Internet. More precisely described, the Internet is a network of regional computer networks scattered throughout the world. On any given day, the Internet connects roughly $20^2$ million users in over 50 countries. That number will continue to increase annually for the foreseeable future.

The Internet has provided a means for enabling individual access to enormous amounts of information in several forms including text, video, graphics and sound. This multi-media agglomeration or abstract space of information is generally referred to as the "World-Wide Web," which is technically a "wide-area hypermedia information retrieval initiative aiming to give universal access to a large universe of documents." To obtain access to the World-Wide Web, a computer operator uses software called a browser. The most popular browsers in the United States are Netscape Navigator and Microsoft's Internet Explorer.

The operation of the Web relies on so-called hypertext for enabling user interaction. Hypertext is basically the same as regular text in that it may be stored, read, searched and edited, with one important exception: a hypertext document contains links to other documents. For instance, selecting the word "hypertext" in a first document could call up secondary documents to the user's computer screen, including, for example, a dictionary definition of "hypertext" or a history of hypertext. These secondary documents would in turn include connections to other documents so that continually selecting terms in one documents after another would lead the user in a free-associative tour of information. In this way, hypertext links or "hyperlinks" can create a complex virtual web of connections.

Hypermedia include hypertext documents which contain links not only to other pieces of text, but also to other media such as sounds, images and video. Images themselves can be selected to link to sound or documents.

The standard language the Web uses to create and recognize hypermedia documents is the HyperText Markup ("HTML") Language. This language is loosely related to, but technically not a subset of, the Standard Generalized Markup Language ("SGML"), a document formatting language used widely in some computing circles. Web documents are typically written in HTML and are nothing more than standard text files with formatting codes that contain information about layout (text styles, document titles, paragraphs, lists) and hyperlinks.

HTML is limited to display functions (text, animation, graphics, and audio) and form submission. Inherent in the basic HTML protocol (set of software-encoded rules governing the format of messages that are exchanged between computers) are design limitations that prevent the implementation of the type of program functionality that is commonly used in today's desktop computers. Because of this limitation, it is impossible to enhance HTML documents with the features necessary to support the Internet applications currently being sought by industry and consumers.

Sun Microsystems and Netscape Communications have attempted to introduce additional program functionality through the implementation of Sun's Java programming language as a browser plug-in. Microsoft, in addition to supporting Java, has introduced Active-X as a browser plug-in. Currently, after two years of development, both Java and Active-X are still failing to deliver working software. These languages are plagued by software errors that crash the newer operating systems. Even the developers of these languages, Sun and Microsoft, are having major problems with Java and Active-X applications that they have written to demonstrate the capabilities of the languages.

Java, Active-X and almost all other programming languages use a programming paradigm based on the "C" programming language introduced by AT&T in the 1970's to develop the UNIX operating system. Although well suited for operating system development, "C" has two major drawbacks for Internet content delivery. The first drawback is that an entire program must be loaded before anything can be executed using the program. Because Internet content is open-ended, most applications can become very large, making downloading impractical due to the limited bandwidth of most Internet connections. Typical Java and Active-X applications take several minutes to download before they start running. The second drawback using programs based in "C" is that content development is very inefficient. "C" and programming languages based on the "C" paradigm are currently used to produce software tools and utilities such as word processors, spreadsheets, and operating systems. Software developers can assign a large number of programmers to a long-term project, with the knowledge that repeated sales of the product to existing users will recover the large investment expenditure. However, developers of Internet content cannot afford this type of approach and have fallen back upon the very simple HTML protocol to economize development.

However, even HTML is inadequate to enable or facilitate the conducting of interactive programming on the Internet. Although well adapted to passively providing multimedia information, HTML is extremely limited in active and interactive software use and development. Thus, companies seeking to conduct commercial activities on the Internet are seeking a programming tool or information-exchange methodology to replace HTML or to provide major enhancement to that language. In contrast to applications programs based on the "C" paradigm, Internet applications programming is generally not subject to multiple uses. Rather an Internet program is consumed: the program is used only once by the typical user. Utilities-type software developed for individual computer use, such as word processors, spread sheets, E-mail, etc., can be sold at higher prices because the software is used again and again by any individual.

Programming languages based on the "C" programming paradigm are awkward for programming interactions involving the computer's display screen. For example, a Microsoft program for the manipulation of sprites (graphic images that can move over a background and other graphic objects in a nondestructive manner) requires over 800 lines of "C" code and over 290 lines of assembler code. The same program written in the TenCORE language requires only six lines.

TenCORE is a modular programming language designed in the early 1980's to facilitate the transfer of information between disk drives and RAM, particularly for the delivery of interactive instruction ("Computer-Based Training"). At that time, disk drives were all slow and RAM was inevitably small. In adapting to these hardware limitations, TenCORE introduced the use of small individual code modules for performing respective functions, thereby enabling efficient performance as each code module loaded a single interaction from the slow disk drives. Programming in the form of substantially independent code modules is open-ended, a necessary characteristic for educational software requiring the delivery of whatever remedial instruction is required by the individual student TenCORE utilizes a program called an "interpreter" that implements all basic required functions efficiently. The interpreter has no content itself. The content comes from an unlimited number of small pseudocode modules which are loaded into the system memory and issue commands to the interpreter. In writing a program, the programmer's involvement is reduced to simply issuing commands, leaving all the difficulties of implementation to the interpreter.

In contrast to TenCORE, "C" type programming includes a series of pre-written code libraries which are linked together as they are compiled. In theory, when a new microprocessor is designed, only the code libraries need to be rewritten and then all programs can be re-compiled using the new libraries. However, over the past twenty years the number of these code libraries has grown to a point where the original concept of rewriting for different microprocessors is no longer practical because of the difficulty in compensating for subtle differences between microprocessors. What remains is a complex and difficult programming syntax that takes years to master and is very difficult to debug.

OBJECTS OF THE INVENTION

A general object of the present invention is to provide a method for communicating over a computer network.

A more particular object of the present invention is provide a method for enabling or facilitating the conducting of interactive programming over a computer network such as the Internet.

A related object of the present invention is to provide a method for communicating software over a computer network, to enable an increased degree of interactive computer use via the network.

Another object of the present invention is to provide a computing system for enabling or facilitating the conducting of interactive programming over a computer network such as the Internet.

It is a further object of the present invention to provide a computing system for communicating software over a computer network, to enable an increased degree of interactive computer use via the network.

These and other objects of the present invention will be apparent from the drawings and descriptions herein.

SUMMARY OF THE INVENTION

The present invention is directed to a computerized system and to an associated method for optimally controlling storage and transfer of computer programs between computers on a network to facilitate interactive program usage. In accordance with the method, an applications program is stored in a nonvolatile memory of a first computer as a plurality of individual and independent machine-executable code modules. In response to a request from a second computer transmitted over a network link, the first computer retrieves a selected one of the machine-executable code modules and only that selected code module from the memory and transmits the selected code module over the network link to the second computer.

In one important field of use of the invention, the first computer is a server computer on a network. The second computer may be a user computer or a secondary server. Alternatively, the two computers may be two individual user computers on the network.

Where the second computer is a user computer, the request for the executable code module arises because the user needs the code module to perform a desired function in the applications program. The user's computer does not have all of the code modules of the applications program and obtains new code modules only as those modules are needed. Because executable code of the applications program is broken down into individually executable modules, the program can be downloaded piecemeal, module by module, as the individual modules are needed by the user's execution of the program. Accordingly, the user need not wait for the entire program to be downloaded before the user can start using the program.

Where the first computer and the second computer are a primary server and a secondary server, respectively, the present invention allows the primary server, when is too busy to handle a user request or task, to hand that request or task off to the secondary server. When a primary server receives a user request or task that the server cannot handle due to load, that request or task is forwarded preferably to the least busy secondary server available. The secondary server then processes the user request and responds to the client/user directly. If the secondary server does not have a code module, data file, or other resource required to handle the user request, the required code module, data file, or other resource can be transferred to the secondary server from the first server. This shunting of user requests contemplates the utilization of multiple secondary servers located on different Internet connections. The present invention thus eliminates most bandwidth and server load issues on the Internet and other computer networks.

Of course, a server computer must shed its load before the server reaches its full capacity, thereby leaving enough system resources (processor, memory, etc.) free to fulfill any requests from a secondary server for resources necessary for the secondary server to fulfill a shunted user request or task.

If a secondary server is unable to contact the client machine, the secondary server can forward the user request to another secondary server for processing, since the other secondary server may be able to reach the client machine directly.

A secondary server may also serve as a backup server. In that case, the secondary server immediately requests all code modules, data files, and other resources from the primary server instead of waiting for a client request that requires one of those resources. When a client or secondary server makes a request of the primary server and discovers it to be inaccessible, the request can then be made of a backup server. In this way, if a primary server were to fail, the information that was on the primary server would still be accessible through the backup server. To facilitate the maintenance of up-to-date resources on backup servers, the primary server sends notification packets to each of the backup servers whenever a resource is created or updated. The backup servers can then request the new, updated copy of the resource from the primary server, thereby remaining up to date with the primary server at all times.

In order to optimize processing of user requests, a primary server stores in its memory a list of secondary servers on the network, the list including response times and load statistics (processor usage, etc.) for the respective secondary servers. The primary server periodically updates these response times, by sending echo packets to the secondary servers and measuring delays between the sending of the echo packets and a receiving of responses to the echo packets from the respective secondary servers. The server also periodically updates the load statistics by requesting the current load statistics from the secondary servers. For processing a recently received user request, the primary server scans the list in memory and selects the secondary saver having the lightest load and shortest response time.

For security purposes, code modules, as well as other resources such as data files, are transmitted in encrypted form. Encryption is accomplished by placing the code modules, files, documents or other transmittable resources in the data area of an encryption packet. When an encrypted packet is received, it is decrypted and the code modules, files, documents or other transmittable resources subsequently handled pursuant to normal procedures. The encryption/decryption process can be handled by a plug-in code module. Any number of plug-in encryption code modules may exist in a data and code transfer system in accordance with the invention at any one time. The header of an encryption packet contains an indication of which plug-in encryption code module must be used for decryption purposes. Encryption/decryption code modules can be delivered real time by a code module exchange protocol.

To further enhance the security of the system, the primary server stores a list of user authentification codes in its memory. Upon receiving a request, e.g., for a machine executable code module, from another computer, the primary server compares a user authentification code in the request with the stored list of user authentification codes. The primary server proceeds with retrieving and transmitting a selected machine-executable code module only if the user authentification code in the request matches a user authentification code in the stored list. Where an incoming request for a machine-executable code module is contained in an encryption packet, the server decrypts the encryption packet prior to the comparing of the user authentification code in the request with the list of user authentification codes in the memory. Encrypting and decrypting of encryption packets, as well as the checking of user authentification codes, may be performed by the secondary server(s). Whatever programming or data required for carrying out these security measures can be transmitted from the primary server in accordance with the present invention.

The present invention provides for the updating of an applications program in users' machines. When a user sends a request for a code module to a server, the request includes a specification of the version of the program code sought. The server processing the request checks whether the requested version is the latest version available. When a newer version of a requested code module is available, the server informs the user and inquires whether the user could use the newer version of the requested module. The user could then send a request for the updated version of the desired code module.

If the updated version of the desired code module is incompatible with older versions of other code modules, the older version of the desired code module will be transmitted from the server to the user. If the older version is not available, the user may have to request transmission of the newer versions of several additional modules.

Generally, it is contemplated that machine-executable code modules are written in a user-friendly programming code such as TenCORE. In that case, a software-implemented interpreter unit of the user computer translates the code modules from the programming code into machine code directly utilizable by the user computer. When such an interpreter is used, the interpreter itself can be updated in the same fashion as an application program or code module. For purposes of updating the interpreter, the interpreter is treated as a single large code module.

In a related method in accordance with the present invention for optimally controlling storage and transfer of computer programs between computers on a network to facilitate interactive program usage, a portion of an applications program is stored in a first computer. The applications program comprises a plurality of individual and independent machine-executable code modules. Only some of the machine-executable code modules are stored in the first computer. This method includes executing at least one of the machine-executable code modules on the first computer, transmitting, to a second computer via a network link, a request for a further machine-executable code module of the applications program, receiving the further machine-executable code module at the first computer from the second computer over the network link, and executing the further machine-executable code module on the first computer.

To further facilitate program transfer on the network, the first computer may conduct an investigation into server availability. Pursuant to this feature of the invention, a request is sent from the first computer (e.g., a user) to a further computer (e.g., a primary server) for a list of servers (e.g., secondaries) on said network. After transmission of the list of server to the first computer, response times for the server are determined by (a) sending echo packets from the first computer to the servas, (b) measuring, at the first computer, delays between the sending and receiving of the echopackets, (c) querying the servers as to current server load (processor usage, etc.) The request for a further machine-executable code module is sent to the server having the lightest load and shortest measured response time. The list of servers can be cached in memory by the first computer to facilitate further access to the information in the event that the server from which the list was requested becomes unavailable or is too busy to handle the request.

In the event that there has been an update in a requested code module, a request from the first computer for a particular version of the code module may trigger an inquiry as to whether the first computer could use the updated version of the code module. If so, the first computer transmits a second requests, this time for the updated version of the desired code module.

Where the two computers are both user machines, the method of the present invention facilitates interactive processing. Each computer executes one or more selected code modules in response to the execution of code modules by the other computer. Thus, both computers store at least some of the machine-executable code modules of the applications program. Occasionally one computer will require a code module which it does not have in present memory. Then the one computer can obtain the required code module from the other computer. If the other computer does not have the required module, a request may be made to a server on which the applications program exists in its entirety.

Where the machine-executable code modules are written in a user-friendly programming code, each user computer includes an interpreter module implemented as software-modified generic digital processing circuits which translates the code modules from the programming code into machine code utilizable by the respective computer.

In accordance with a feature of the present invention, the machine-executable code modules each incorporate an author identification. The method then further comprises determining, in response to an instruction received by a user computer over the network and prior to executing the one of the machine-executable code modules on the user computer, whether the particular author identification incorporated in the one of the machine-executable code modules is an allowed identification. The user computer proceeds with code module execution only if the particular author identification is an allowable identification. Generally, the instruction determining whether a code module is written by an allowed author is a list of blacklisted authors.

The author identification feature of the invention severs to prevent an author from creating a virus or other malicious program and distributing it using the code module exchange protocols of the present invention. All compilers supporting the coding of individual machine-executable code modules in accordance with the present invention will incorporate a respective author identification code into each machine-executable code module. The author identification is unique to each author. When a malicious program is discovered, the identification of the author may be distributed throughout the network to blacklist that author and prevent the execution of code modules containing the blacklisted author's identification. As an additional advantage, this feature will discourage users from distributing illegal copies of the authoring package, since the respective users will be held responsible for any malicious programs written under their author identification.

The storing of applications program modules in a user computer may include caching the code modules in a nonvolatile memory of the user computer.

It is to be noted that the present invention permits the transmission during user computer idle time of code modules whose use is anticipated. A request from the user computer is transmitted to a server or other computer for a machine-executable code module during an idle time on the user computer.

A computing system comprises, in accordance with the present invention, digital processing circuitry and a nonvolatile memory storing general operations programming and an applications program. The applications program includes a plurality of individual and independent machine-executable code modules. The memory is connected to the processing circuitry to enable access to the memory by the processing circuitry. A communications link is provided for communicating data and programs over a network to a remote computer. A code module exchange means is operatively connected to the memory and to the communications link for retrieving a single code module from among the machine-executable code modules and transferring the single code module to the remote computer in response to a request for the single code module from the remote computer.

As discussed above, the computing system of the present invention may be a server computer on the network. The server's memory may contain a list of secondary servers on the network, the list including response times for the respective secondary servers, The computing system then further comprises a detection circuit, generally implemented as software-modified generic digital processing circuitry, for detecting an overload condition of the computing system. A server selector also generally implemented as software-modified generic digital processing circuitry, is operatively connected to the detection circuit, the memory and the communications link for determining which of the secondary servers has a shortest response time and for shunting an incoming user request to the secondary server with the shortest response time when the overload condition exists at a time of arrival of the user request.

Thus, the remote computer transmitting a code-module request to the computing system may be a secondary server to which a user request has been shunted. The requested single code module is required for enabling the remote computer to process the user request. On behalf of the computing system.

Pursuant to another feature of the present invention, the computing system further comprises an updating unit, preferably implemented as software-modified generic digital processing circuitry, operatively connected to the memory and the communications link for (1) periodically sending echo packets to the secondary servers, (2) measuring delays between the sending of the echo packets and a receiving of responses to the echo packets from the respective secondary servers, and (3) updating the response times in the list in accordance with the measured delays.

For security purposes, the memory of the computing system may contain a stored list of user authentification codes. The computing system then includes a comparison unit, preferably implemented as software-modified generic digital processing circuitry, for comparing a user authentification code in an incoming request with the list of user authentification codes in the memory and for preventing code-module retrieval and transmission in the event that the user authentification code in the request fails to correspond to any user authentification code in the list.

Where incoming requests for code modules are contained in encryption packets, the computing system further comprises a software-implemented decryption circuit connected to the communications link and the comparison unit for decrypting the encryption packet prior to the comparing of the user authentification code in the request with the list of user authentification codes in the memory.

In accordance with another feature of the invention, the computing system includes means for determining whether a requested code module has an updated version and for responding to the request with an invitation to the remote computer to accept the updated version of the requested code module.

It is contemplated that the machine-executable code modules are written in a user-friendly programming code. Where the computing system uses the applications code itself, the computing system further comprises an interpreter for translating the programming code into machine code directly utilizable by the processing circuitry. The interpreter may take the form of generic digital processing circuit modified by programming to perform the translation function.

A computing system (e.g., a user computer on a network) also in accordance with the present invention comprises a memory storing a portion of an applications program having a plurality of individual and independent machine-executable code modules, only some of the machine-executable code modules being stored in the memory. A digital processing circuit is operatively connected to the memory for executing at least one of the machine-executable code modules. A communications link is provided for communicating data and programs over a network to a remote computer. A code module exchange unit is operatively connected to the memory and to the communications link for communicating with a remote computer (e.g., a server on the network) via a network link to obtain from the remote computer a further machine-executable code module of the applications program. The digital processing circuitry is operatively tied to the code module exchange unit for executing the further machine-executable code module upon reception thereof from the remote computer.

When a client or user machine is not running at full capacity (processor idle time is over a given threshold and network traffic is under a given threshold), that machine can look for other client machines on the same virtual network that may be in the midst of a processor-intensive task and take on some of the load. If necessary, the code modules to handle that task can be transferred to the idle client machine. It is possible for clients working together on the same project to communicate with each other using a custom sub-protocol. This client-side distributed processing significantly improves the performance of processor-intensive tasks.

The present invention provides a programming paradigm which addresses the Internet content developer's specific needs. A software system and computer communications method in accordance with the present invention delivers rapidly over the Internet, provides a practical programming paradigm that supports rapid economical development of content, and facilitates new capabilities in Internet software and systems management.

TenCORE, a modular programming language designed to use small efficient code modules for facilitating program transfer between disk drives and central processing units of desktop computers, may be easily modified to carry out the present invention. Minimal modifications require the adapting of the transfer capabilities to work over network links.

The present invention arises in part from the realization by the inventors that the problems facing the developers of TenCORE in 1980 are the same problems that software designers face today when dealing with the Internet and its limited bandwidth and slow connections. It was perceived that Internet applications must be open-ended and programming must be delivered rapidly in spite of bandwidth limitations. Thus, the solution provided by TenCORE is useful in solving today's problems with interactive software on the Internet. The modular programming of TenCORE enables rapid Internet performance because a single TenCORE Net programming module can be quickly downloaded over the Internet The TenCORE Net programming modules are TenCORE programming modules which are modified to enable downloading from Internet servers instead of from a microcomputer's disk drive.

TenCORE and TenCORE Net are interpreted languages, i.e., they serve to translate into machine language pseudocode programs and to perform the indicated operations as they are translated. "Pseudocode" is unrelated to the hardware of a particular computer and requires conversion to the code used by the computer before the program can be used. Once the TenCORE Net interpreter is installed on a computer equipped with an Internet connection, clicking with a mouse on a conventional World-Wide Web hyperlink that points to a TenCORE Net application automatically bypasses the Internet browsing software and launches the application. Because only the required modules are sent over the Internet and because the TenCORE Net modules are very small, Internet performance is very fast.

BRIEF DESCRIPTION OF THE DRAWING

FIG. 2 is a block diagram of a primary server in accordance with the present invention.

FIG. 3 is a block diagram of a user computer in accordance with the present invention.

FIGS. 6A through 6E are a flow chart diagram illustrating further operations relating to the processing of an incoming request for a code module in accordance with the present invention.

FIGS. 7A through 7E (hereinafter FIG. "7") are flow chart diagram illustrating a subroutine for processing an incoming resource request packet in the operation of selected program-modified processing circuits in the primary server of FIG. 2.

FIGS. 8A through 8E (hereinafter "FIG. 8") are a flow chart diagram illustrating a maintenance loop in the operation of selected program-modified processing circuits in the primary server or a secondary server of FIG. 2.

FIGS. 10A through 10F (hereinafter "FIG. 10") are a flow chart diagram illustrating a maintenance loop in the operation of selected program-modified processing circuits in the primary server or a secondary server of FIG. 2.

DESCRIPTION OF THE PREFERRED EMBODIMENTS

Figure 1:
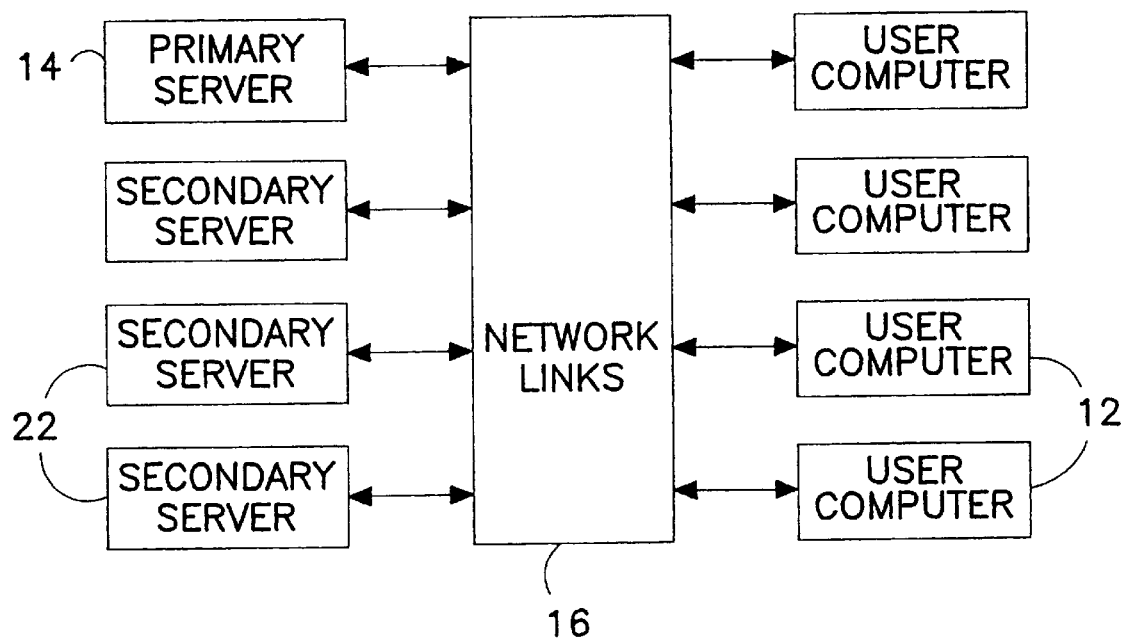
FIG. 1 is a block diagram of a computer network with various servers and user computers, which transmit executable programs to one another pursuant to the present invention.

As illustrated in FIG. 1, a computer network comprises a plurality of user computers 12 operatively connected to a primary server computer 14 via a complex of network links 16. The primary server 14 stores, in an area 18 of a nonvolatile memory 20 (FIG. 2), an applications program which may be desired for use on one or more user computers 12. The term "applications program" as used herein refers to any executable collection of computer code other than operating systems and other underlying programming for controlling basic machine functions.

As further illustrated in FIG. 1, the network includes a plurality of secondary servers 22 which are available for assisting primary server 14 in responding to requests from user computers 12. More particularly as shown in FIG. 2. primary computer 14 includes an overload detector 24 which continually monitors a queue of jobs or tasks which primary server 14 has to perform. Overload detector 24 determines whether the number and size of tasks in the queue has exceeded a predefined threshold. Once that threshold is reached, overload detector 24 signals a secondary server selector 26 which accesses an area 28 of memory 20 to identify a secondary server 22 which is least busy. To that end, memory area 28 contains a list of secondary servers 22 as well as measured response times for the respective servers.

The response times in the secondary-server list in memory area 28 are periodically measured by dispatching echo packets to each secondary server 22 and measuring the delays between the transmission of the respective echo packets from primary server 14 and the receipt of responses from the respective secondary servers 22. To accomplish the measurement, primary server 14 and, more particularly, a processing unit 30 thereof contain an echo packet dispatcher 32 and a response-time monitor 34. Upon transmitting an echo packet to a secondary server 22 via a network communications interface 36 at primary server 14, dispatcher 32 notifies response-time monitor 34 as to the transmission of a packet and as to the secondary server 22 to which the transmission was made. Monitor 34 counts out the time between the transmission of the echo packet and the arrival of a response from the respective secondary server 22 via network links 16 and communications interface 36. A response-time update unit 38 is connected to response-time monitor 34 and to memory area 28 for writing updated response times in the secondary server list stored in memory area 28.

The applications programs store 18 in memory 20 contains a multiplicity of interacting individual and independent machine-executable code modules. Accordingly, a user computer 12 working with the applications program need not be loaded with the entire program in order to begin processing operations. In the event that the user's execution of the applications program requires a code module not contained in the user's computer memory, a request is transmitted from the user computer 23 over network links 16 to primary server 14. If primary server 14 is not overloaded, it retrieves the requested code module from program store 18 and transmits it over communications interface 36 and network links 16 to the user computer which made the request.

Processing unit 30 of primary server 14 includes a code-module exchanger 40 which processes incoming requests for code modules of the applications program or programs stored in memory area 18. Exchanger 40 cooperates with a version detector 42 which consults the applications program store 18 to determine whether a requested version of a particular code module is the latest version in store 18. If not, version detector 42 and code module exchanger 40 transmit an inquiry to the resting computer as to whether the latest version of the desired code module is utilizable by the requester. If the newer version of the desired code module can be used in place of the older version, the newer version is transmitted over communications interface 36 and network links 16.

Code modules, as well as other resources such as data files, may be transmitted in encrypted form for security purposes. Encryption is accomplished by placing the code modules, files, documents or other transmittable resources in the data area of an encryption packet. When an encrypted packet is received by processing unit 30 via communications interface 36, the packet is forwarded via generic processing circuits 50 to an encryption/decryption unit 44 for deciphering Encryption/decryption unit 44 consults a memory area 46 containing a plurality of possible encryption keys and selects an encryption key identified by header information in the encryption packet containing the user request. Upon decryption of the incoming encryption packet, the user request or code module exchange packet contained therein is forwarded to code-module exchanger 40 for processing. The encryption/decryption process can be handled by a plug-in code module performing the functions of encryption/decryption unit 44 and memory area 46. Any number of plug-in encryption code modules may exist in a data and code transfer system at any one time. The header of an encryption packet contains an indication of which plug-in encryption code module must be used for decryption purposes.

To further enhance the security of a computer network which has protocols for the exchange of executable code modules, primary server 14 stores a list of user authentification codes in a memory area 48. In response to a request, e.g., for a machine-executable code module, from another computer, comparator 52 in processing unit 30 compares a user authentification code in the request with the list of user authentification codes stored in memory area 48. Code module exchanger 40 proceeds with retrieving and transmitting a selected machine-executable code module only if the user authentification code in the request matches a user authentification code in the stored list. Where an incoming request for a machine-executable code module is contained in an encryption packet, encryption/decryption unit 44 deciphers the encryption packet prior to the comparing by comparator 52 of the user authentification code in the request with the list of user authentification codes in memory area 48. Where a user request is relayed to a secondary server 22 chosen by selector 26, the secondary server incorporates an encryption/decryption unit and an authentification-code comparator for encrypting and decrypting of encryption packets and the checking of user authentification codes, may be performed by the secondary server(s). Whatever programming or data required for carrying out these security measures can be transmitted from primary server 14 to the selected secondary server 22.

As illustrated in FIG. 3, a processing unit 54 of a user computer 12 includes a code-module exchanger 56 which generates requests for desired code modules of an applications program as those code modules are required during execution of the applications program by the user. The code-module requests are transmitted to code-module exchanger 40 of primary server 14 via a network communications interface 58 at user computer 12, network links 16 (FIG. 1) and communications interface 36 at primary server 14.

In a security enhanced system, processing unit 54 of user computer 12 includes a encryption/decryption unit 60 which inserts code-module request packets, as well as other information transfer packets, into the data areas of respective encryption packets whose encryption keys are selected from a plurality of keys stored in an area 62 of a nonvolatile memory 64 of user computer 12. Again, the encryption/decryption process at user computer 12 can be handled by a plug-in code module performing the functions of encryption/decryption unit 60 and memory area 62. The header of an encryption packet generated by encryption-decryption unit 60 contains an indication of which plug-in encryption code module at primary server 14 must be used for decryption purposes.

In a further security enhancement used to protect the computing system of FIG. 1 in general and user computer 12 in particular from computer viruses and other malicious programming, processing unit 54 is provided with an author identification comparator 66 which accesses an author identification list 68 in memory 64. Author identification list 68 is periodically updated by author identification comparator 66 and other function-converted blocks in generic processing circuits 70 in response to incoming instructions from primary server 14. Author identification list 68 contains a list of allowed authors or, perhaps more efficiently, a list of authors who have been blacklisted owing to their passing of viruses or other malicious programming onto the network. Prior to the use of an incoming machine-executable code module. The author identification in a packet header is checked by comparator 66 to determine that the author of the particular code module has not been blacklisted If the author is allowed to produce executable code modules for user computers 12, processing of the incoming code module proceeds normally. If, on the other hand, the author of the incoming code module has been blacklisted, then the code module is never executed and may be discarded prior to storage in an applications program store 72 in memory 64.

As discussed above with reference to FIGS. 1 and 2, primary server 14 may occasionally hand off an incoming user request to a secondary server 22, depending on the load condition of the primary server and the secondary servers. Generally, this handing off of responsibility for responding to users' requests is transparent to the users, i.e., the processing of users' requests proceeds without knowledge or intervention by the users. It is also possible for user computers 12 to take over selection of a secondary computer 22 from primary computer 14. To that end, processing unit 54 of user computer 12 is provided with a secondary server selector 74 which accesses a list 76 of secondary-servers in memory 64. Generally, selector 74 selects a secondary server 22 with a smallest response time relative to the respective user computer 12. To that end, processing unit 54 further includes an echo packet dispatcher 78, a response-time monitor 80 and a response-time update unit 82. Dispatcher 78 sends echo packets to secondary servers 22 via communications interface 58 and network links 16 (FIG. 1), while monitor 80 determines the delays of responses from the various secondary servers. Update unit 82 corrects response time data in list 76 in accordance with measurements carried out by dispatcher 78 and monitor 80. It is contemplated that the updating of secondary-server response times in list 76 is implemented only when user computer 12 requires a user module or other resource from primary server 14 and that server is too busy to handle the user request.

Processing unit 54 of a user computer 12 has a distributed processing circuit 84 which enables processing unit 54 to share the processing of large tasks with other user computers in the network. Thus, when a user computer is not running at full capacity (processing unit 54 is more than 50% idle and there is no network traffic), that distributed processing circuit 84 looks for other user computers 12 that may be in the midst of a processor-intensive task and enable transfer of some of the load to the processing unit 54 of the respective user computer 12. If necessary, the code modules to handle that task can be transferred to the idle user computer 12. This client-side distributed processing significantly improves the performance of processor-intensive tasks.

Processing unit 54 of a user computer 12 also contains a metered delivery and billing circuit 86 which controls access to content which must be paid for. Credit registers 88 in memory 64, accessible by circuit 86, store credits which the particular user has against respective accounts. When credit in an account maintained or monitored by primary server 14 is low, circuit 86 may arrange for the transfer of more credit from primary server 14 to the particular user. Metered delivery and billing circuit 86 includes a billing method to pay for the credit. Generally, credit requests and responses thereto should be encrypted.

Processing unit 54 of a user computer 12 additionally includes a unidirectional data submission and collection circuit 90 which accesses data files 92 in memory 64 for purposes of uploading those data files to primary server 14 or to a selected secondary server 22. Data submission and collection circuit 90 is operative when the user computer does not need to read the data back from the server. This circuit is particularly useful for on-line orders, form submission, and data collection (including statistical data) among other things.

Generally, packets that contain data to be written must be sent directly to the primary server 14 and cannot be shunted. This prevents conflicts between different versions of the resource that was written to. Data written back to the server should require user authentification. User authentification should be used even if the write-back will be done only by a program under author control. In that case, user identification codes and passwords can be built into the program. The reason for this is to prevent another author from writing a program that would write back to the same data and possibly corrupt it.

Applications program code modules stored in memory area 18 (FIG. 2) and module store 72 (FIG. 3) are written in TenCORE, a modular programming language originally designed to use small efficient code modules for facilitating program transfer between disk drives and central processing units of desktop computers. TenCORE is easily modified, for example, to adapt the code transfer capabilities to operate over network links. The program so modified for use on user computers 12, primary server 14 and secondary servers 22 may be called "TenCORE Net."

TenCORE Net uses small individual code modules for performing respective functions, thereby enabling efficient performance as each code module is downloaded a single interaction from primary server 14 or a selected secondary server 22. Programming in TenCORE Net is open-ended, so that a user computer 12 executes instructions of an applications program when that applications program is only partially stored in program store 72 of memory 64.

The code modules held in memory store 72 are in a user-friendly pseudocode language which must be translated or interpreted for direct machine use. To that end, processing unit 54 includes a program or programmed interpreter circuit 94 that implements all basic required functions efficiently. The interpreter has no content itself Content is derived from a potentially unlimited number of small pseudocode modules which are loaded into memory store 72 and which effectively issue commands to interpreter 94. In writing a program, the programmer's or author's involvement is reduced to simply issuing commands, leaving all the difficulties of implementation to the interpreter.

TenCORE may be modified in two ways to enable network use. First, a subroutine or set of instructions may be inserted before each call line of computer code for checking whether the code intended for execution exists in applications program memory area 72. If not, code module exchanger 56 is instructed to obtain the required code module from primary server 14. Once the required code module has been downloaded into memory area 72, it is called and translated by interpreter circuit 94 prior to execution by processing circuits 70.

Through the use of modular applications programs and code-module exchangers 40 and 56, the control of computer program storage and transfer between computers 12, 14, 22 on a network is optimized, thereby facilitating interactive program usage. An applications program stored in nonvolatile memory area 18 of primary server 14 may be transferred to various user computers 12 in modular fashion. In response to a request transmitted over network links 16 from a user computer 12 or a selected secondary server 22, primary server 14 retrieves a selected machine-executable code module and only that selected code module from memory area 18 and transmits the selected code module over network links 16 to the user computer or secondary server.

Where the applications program is, for instance, a drawing or painting program, a user computer 12 may be instructed to draw a three-dimensional geometric figure such as a truncated pyramid. If processing circuits 70 discover that the applications program in program store 72 is missing a code module required for performing that task, code module exchanger 56 requests that the requisite module be transferred from primary server 14. In response to that request, version detector 42 may find that a later version of the desired module exists and inquire of code-module exchanger 56 whether the later version would be acceptable for use by the respective user computer.

Thus, user computers 12 do not have all of the code modules of the applications program and obtain new code modules only as those modules are needed. Because executable code of the applications program is broken down into individually executable modules, the program can be downloaded piecemeal, module by module, as the individual modules are needed by the user's execution of the program. Accordingly, the user need not wait for the entire program to be downloaded before the user can start using the program.

Similarly, a selected secondary server 22 can begin to process a transferred or shunted user request and respond to the client/user directly, without having the entire applications program and other resources relating to the handling of the program's distribution by the primary server 14. If the selected secondary server does not have a code module, data file, or other resource required to handle the user request, the required code module, data file, or other resource can be transferred to the secondary server from the primary server. Secondary servers 22 are thus provided with code module exchangers similar to exchangers 40 and 56.

Of course, primary server 14 must shed its load before that server reaches its full capacity, thereby leaving enough system resources (processor, memory, etc.) free to fulfill any requests from a secondary server for resources necessary for the secondary server to fulfill a shunted user request or task.

In security sensitive networks, secondary servers 22 are equipped with encryption/decryption units like unit 44, as well as authentification comparators 52. Where an incoming request for a machine-executable code module is contained in an encryption packet, the secondary server decrypts the encryption packet prior to the comparing of the user authentification code in the request with a list of user authentification codes in memory. Whatever programming or data required for carrying out these security measures can be transmitted from primary server 14.

If a secondary server is unable to contact the client machine, the secondary server can forward the user request to another secondary server for processing, since the other secondary server may be able to reach the client machine directly.

Code module exchanger 56 of processing unit 54 facilitates interactive processing on a network. Each user computer 12 executes one or more selected code modules in response to the execution of code modules by the other computer. Thus, both computers store at least some of the machine-executable code modules of the applications program. Occasionally, one computer will require a code module which it does not have in present memory. Then the one computer can obtain the required code module from the other computer. If the other computer does not have the required module, a request may be made to a server on which the applications program exists in its entirety.

Thus, clients or users on a network are able to exchange code modules with one another. If a first user and a second user are engaged in an interactive whiteboarding session and the first user starts drawing with a tool that the second user does not have in her version of the whiteboarding program, the code module or modules for that tool can be transferred automatically from the first user's computer to the second user's computer.

It is to be noted that code module exchanger 56 may be instructed to initiate the transmission during user computer idle time of code modules whose use is anticipated. A request from the user computer 12 is transmitted to primary server 14 or other computer for a machine-executable code module during an idle time on the user computer. Resource requests that are generated for idle-time downloading should be flagged as such, so that code module exchanger 56 can assign different priorities from standard requests for load balancing and distribution purposes. The status of a resource request can be upgraded to real time from idle time in the event that the user attempts to access the associated section of the application.

It is to be noted that the various dedicated function blocks of processing units 30 and 54 are generally and preferably implemented as software-modified generic digital processing circuits. Accordingly, code-module exchanger 40 and 56 are characterizable as protocols for the exchange of code modules between a server 14 or 22 and a user computer 12. This code module exchange protocol is considered a sub-protocol of a Modularized Code Master Protocol ("MCMP") which handles load distribution, user authentification and encryption. Load distribution is more particularly handled in primary server 14 by processor overload detector 24 and secondary-server selector 26, while user authentification and encryption are handled in primary server and secondary servers 22 by comparator 52 and encryption/decryption unit 44.

The MCMP has four subprotocols, namely, the Code Module Exchange Protocol ("CMXP"), the Uni-Directional Data Submission and Collection Protocol ("UDSCP"), the Metered Delivery and Billing Protocol ("MDBP"), and the Distributed Processing Protocol (DPP"). The Code Module Exchange Protocol is realized by code-module exchanger 40 in processing unit 30 of primary server 14 and secondary servers 22 and by code-module exchanger 56 in processing unit 54 of user computers 12. The Uni-Directional Data Submission and Collection Protocol is implemented by circuit 90 in user computers 12 and by corresponding non-illustrated program-modified processing circuitry in primary server 14. The Metered Delivery and Billing Protocol finds realization by circuit 86 in user computers 12 and by corresponding non-illustrated program-modified processing circuitry in primary server 14. The Distributed Processing Protocol takes the form of circuit 84 in processing unit 54 of user computers 12.

Figure 4A:
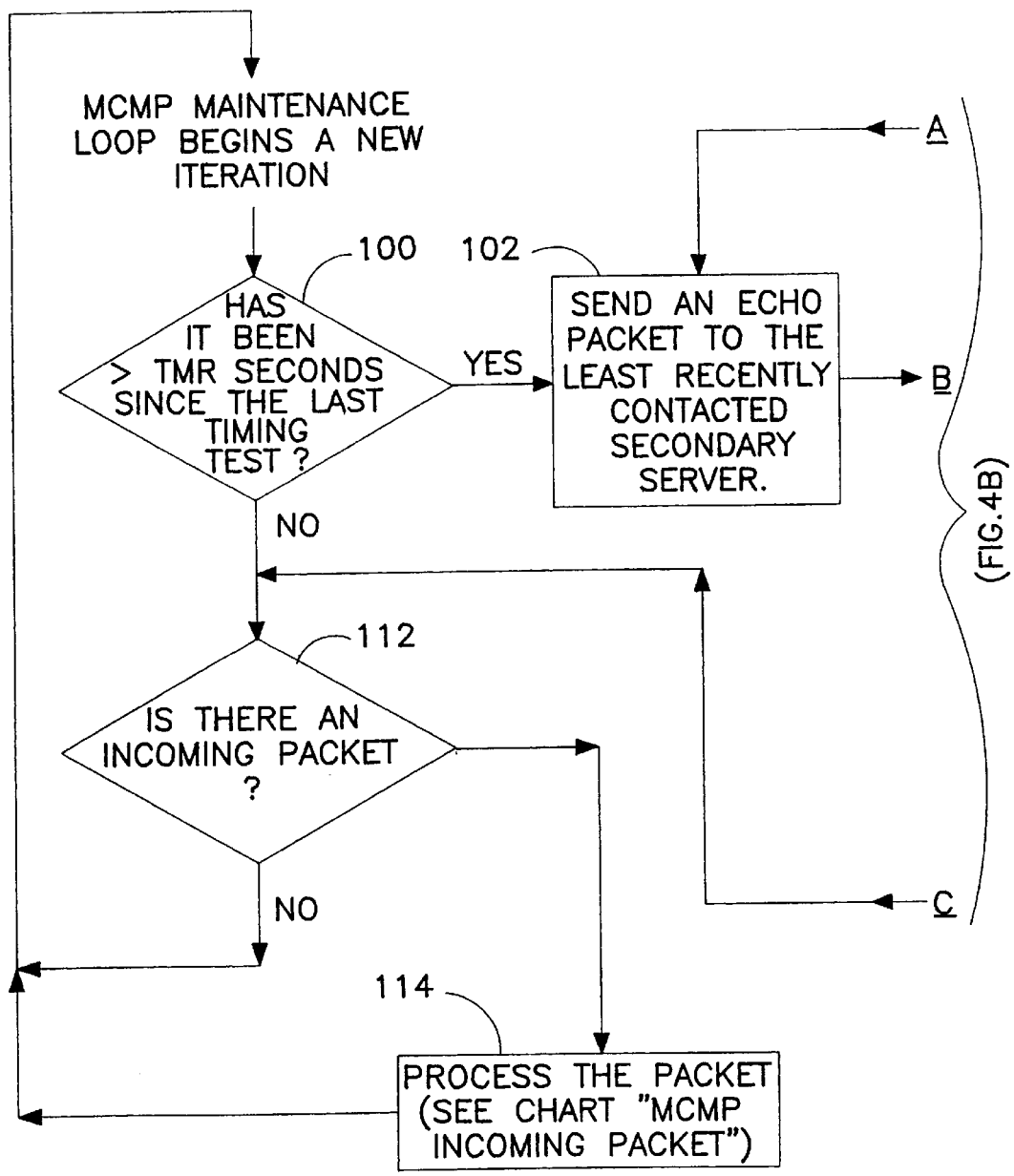
FIGS. 4A and 4B (hereinafter "FIG. 4") are a flow chart diagram illustrating a maintenance loop in the operation of selected program-modified processing circuits in the primary server of FIG. 2 and the user computer of FIG. 3.
Figure 4B:
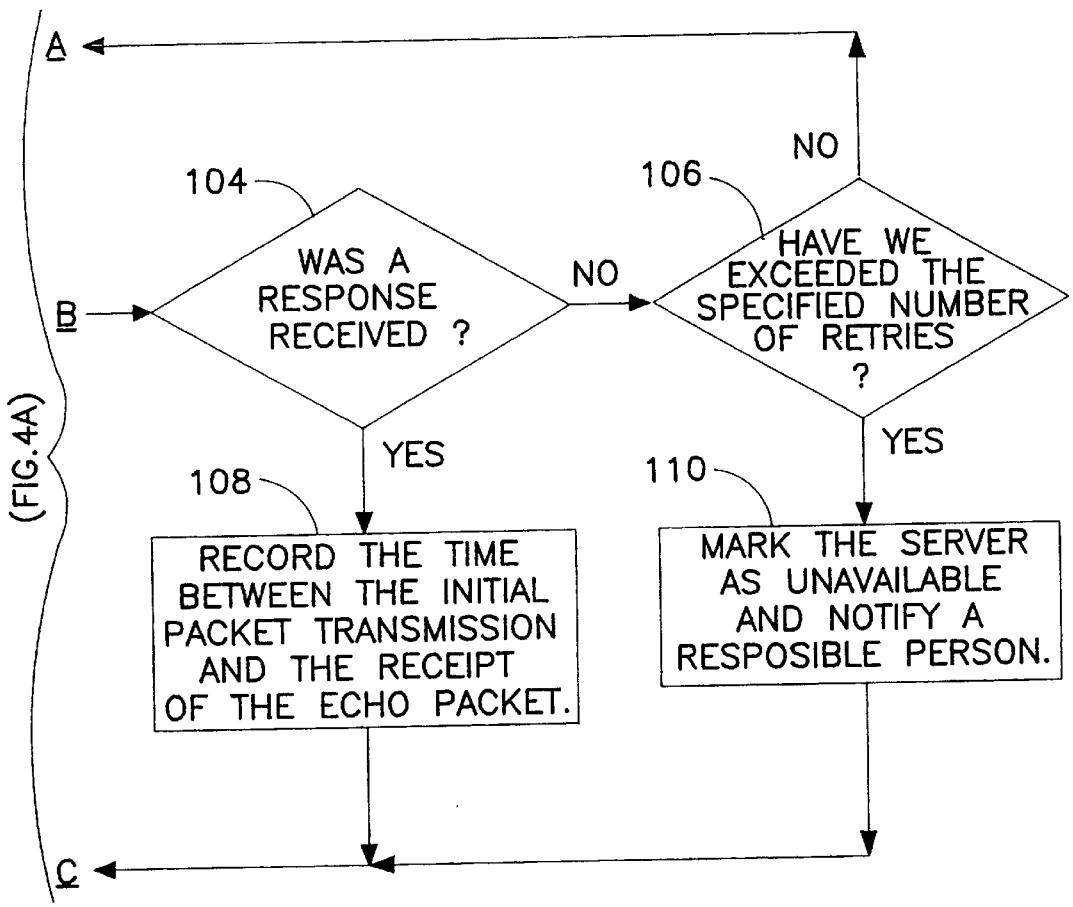

FIG. 4 illustrates operations undertaken by echo dispatcher 32, response-time monitor 34, and update unit 38 as well as other processing circuits of processing unit 30 of primary server 14 to maintain an updated list 28 of the availability of secondary servers 22. The same steps may be performed by echo dispatcher 78, response-time monitor 80, and update unit 82 as well as other processing circuits of processing unit 54 of user computer 12 to obtain an updated list of secondary server response times. In an inquiry 100, echo dispatcher 32 or 78 or generic processing circuits 50 or 70 query whether the time since the last echo testing is greater than a predetermined maximum period TMR. If the maximum period has been exceeded, echo packet dispatcher 32 or 78 transmits, in a step 102, an echo packet to the secondary server 22 which was tested the least recently. Response-time monitor 34 or 80 determines in an inquiry 104 whether a response has been received from the targeted secondary server 22. If a response has not been received and if a prespecified number of measurement attempts has not been exceeded, as determined at a decision junction 106, another echo packet is dispatched in step 102. If a response is received from the targeted secondary server 22, update unit 38 or 82 then records, in list 28 or 76, the time between the initial packet transmission by dispatcher 32 or 78 and the receipt of the echo packet by monitor 34 or 80. This recordation is effected in a step 108. If the number of attempts at secondary-server response-time measurement has exceeded the pre-specified number, as determined at decision junction 106, the server is marked in list 28 or 76 as being unavailable (step 110). Also a message or alert signal may be generated to inform a server overseer. If at query 100, it is determined that the time since the last echo testing is less than predetermined maximum period TMR, processing unit 30 or 54 investigates at 112 whether there is a packet in a MCMP incoming packet queue. If not, the maintenance loop of FIG. 4 is re-entered. If so, a packet processing operation 114 is executed. It should be noted that the MCMP incoming packet queue contains both packets received from the network, and packets placed into the queue by the MCMP protocol.

FIGS. 6A through 6E illustrate operation 114 carried out under the MCMP protocol by processing unit 30 of primary server 14 or of a secondary server 22 selected for overflow handing. In an initial inquiry 124, overload detector 24 decides whether processing unit 30 is too busy to handle the incoming packet (which may be, for example, a user request for a code module). If so, processing circuits 50 investigate the MCMP packet header at a junction 126 to determine whether the packet can be shunted to a secondary server 22. If so, a further investigation 128 is conducted to determine whether the incoming packet has already been shunted. If the packet was sent to the server directly by the originating computer (i.e., not shunted), secondary-server selector 26 accesses list 28 in a step 130 to find the secondary server 22 with the lightest load. At a subsequent inquiry 132, processing unit 30, and more particularly, server selector 26, determines whether the selected secondary server is suitable for transfer of responsibility for the incoming packet. If the selected secondary server is suitable, the packet is flagged as the result of a service hand-off and forwarded to the selected secondary server (step 134).

If the secondary server selected in step 130 is not suitable for a hand-off, for example, if the response time of the secondary server is greater than a predetermined maximum, as determined at inquiry 132, a query 136 is made as to whether an incoming packet is the result of a service hand-off This inquiry 136 is also made if the packet cannot be shunted, as determined at decision junction 126.

If an incoming MCMP packet is the result of a service hand-off, as determined at query 136, processing circuits 50 undertake an investigation 138 as to whether the requested resource is available. If the resource is available, processing circuits 50 ask at 140 whether the resource has passed a pre-assigned expiration date. If so, a signal is transmitted in a step 142 to the source of resource to determine if a newer version of the resource is available. If a new version is available, as ascertained at a decision junction 144 a request for the newer version of the resource is transmitted to the source in a step 146. This request is flagged as non-shuntable and should be additionally flagged as a priority request.

Prior to the processing of an incoming packet, e.g., a user request for a code module, processing unit 30 examines the header information in the incoming packet at an inquiry 150 to determine whether the packet contains user authentification information. Where user authentification information is found, the former encryption status of the packet is determined at 152. If the packet was not encrypted, a message is generated in a step 154 to report that the user authentification failed. If the incoming packet was encrypted, the MCMP header information is checked at 156 to determine if the source server is specified. If there is no source server specification, user authentification failure is reported in step 154. If there is a source server specified in the MCMP header information and if that source server is not the host server, as determined at a decision junction 158, an investigation 160 is conducted (by authentification code comparator 52) as to whether memory area 48 has a non-expired, cached copy of the user authentification data. If there is no non-expired, cached copy of the user authentification data in memory area 48, comparator 52 induces processing circuits 50 to obtain the user's authentification data from the source server and to store that data in memory area 48 (step 162). If a user's password contained in the MCMP packet header information does not match the cached password, as determined by comparator 52 in an evaluation 164 or if the user is not listed with the source server, as discovered by processing circuits 50 at a check point 166, the user authentification is reported as failed in a step 168. A report as to user authentification failure (step 154) is also made if the source server is the host server (decision junction 158) and if comparator 52 finds in an investigation 170 that the user authentification data in the packet header does not correspond to any user authentification data in memory area 48.

Figure 5:
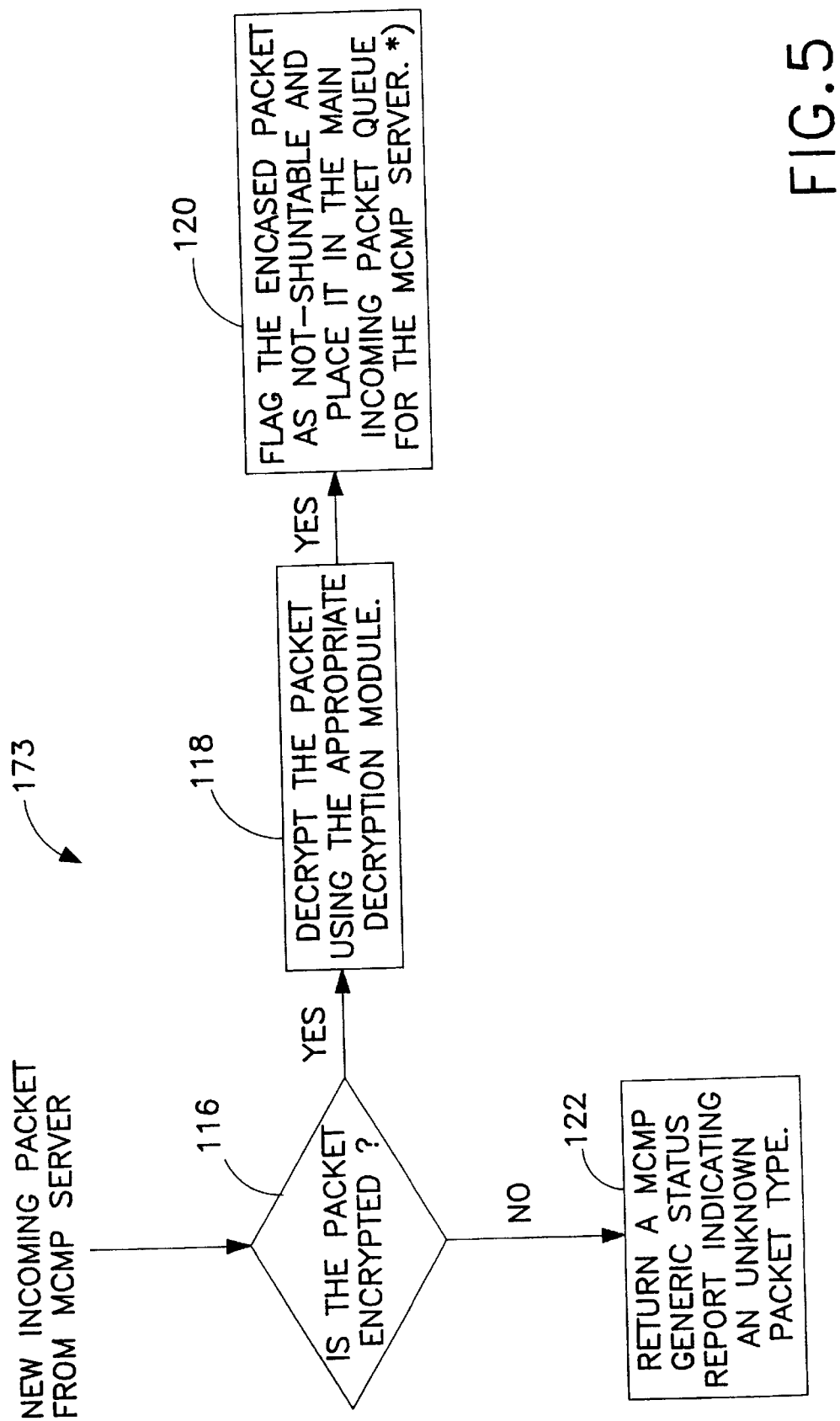
FIG. 5 is a flow chart diagram illustrating a loop for processing an incoming data packet in the operation of selected program-modified processing circuits in the primary server of FIG. 2 and the user computer of FIG. 3.
Figure 6B:
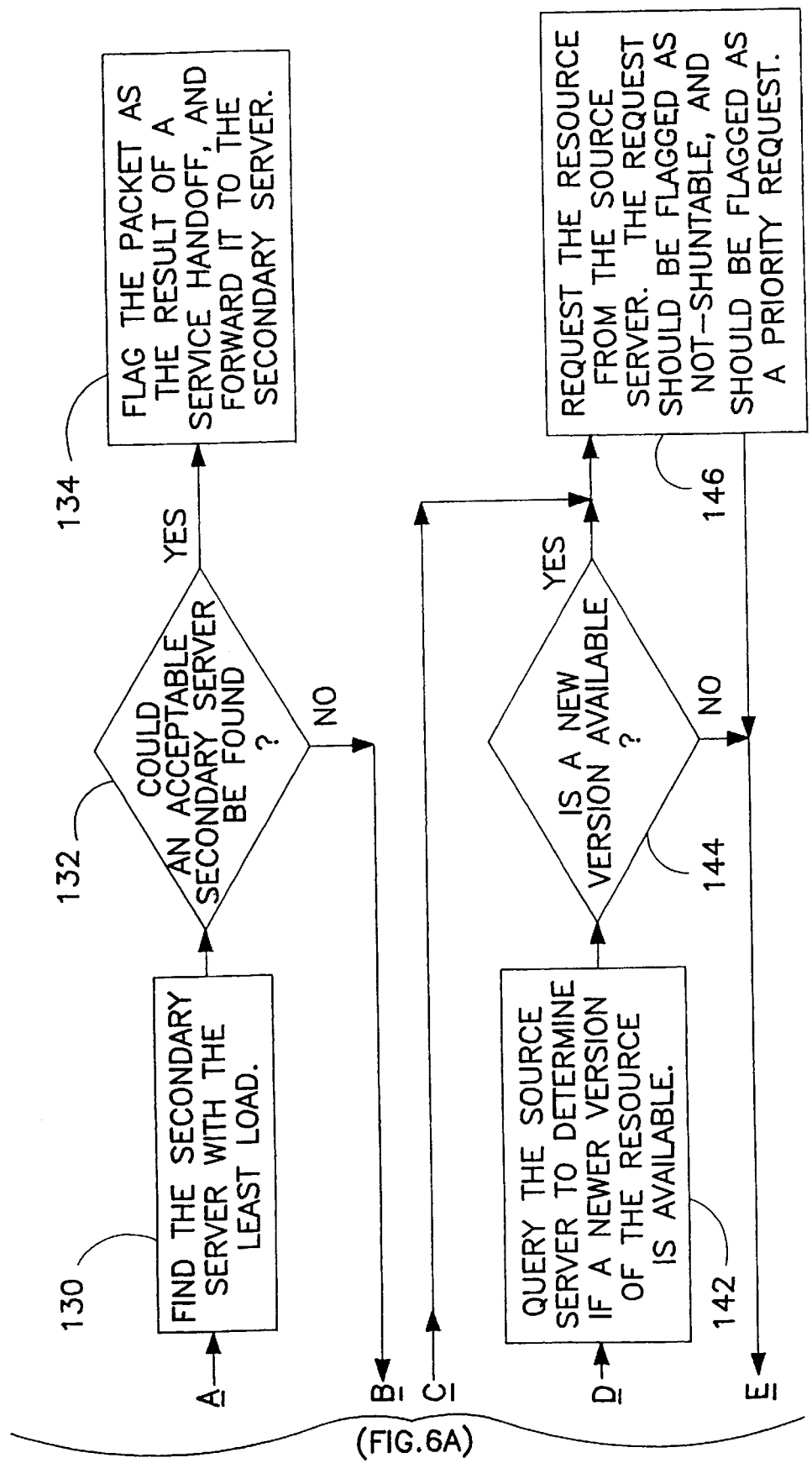
Figure 6C:
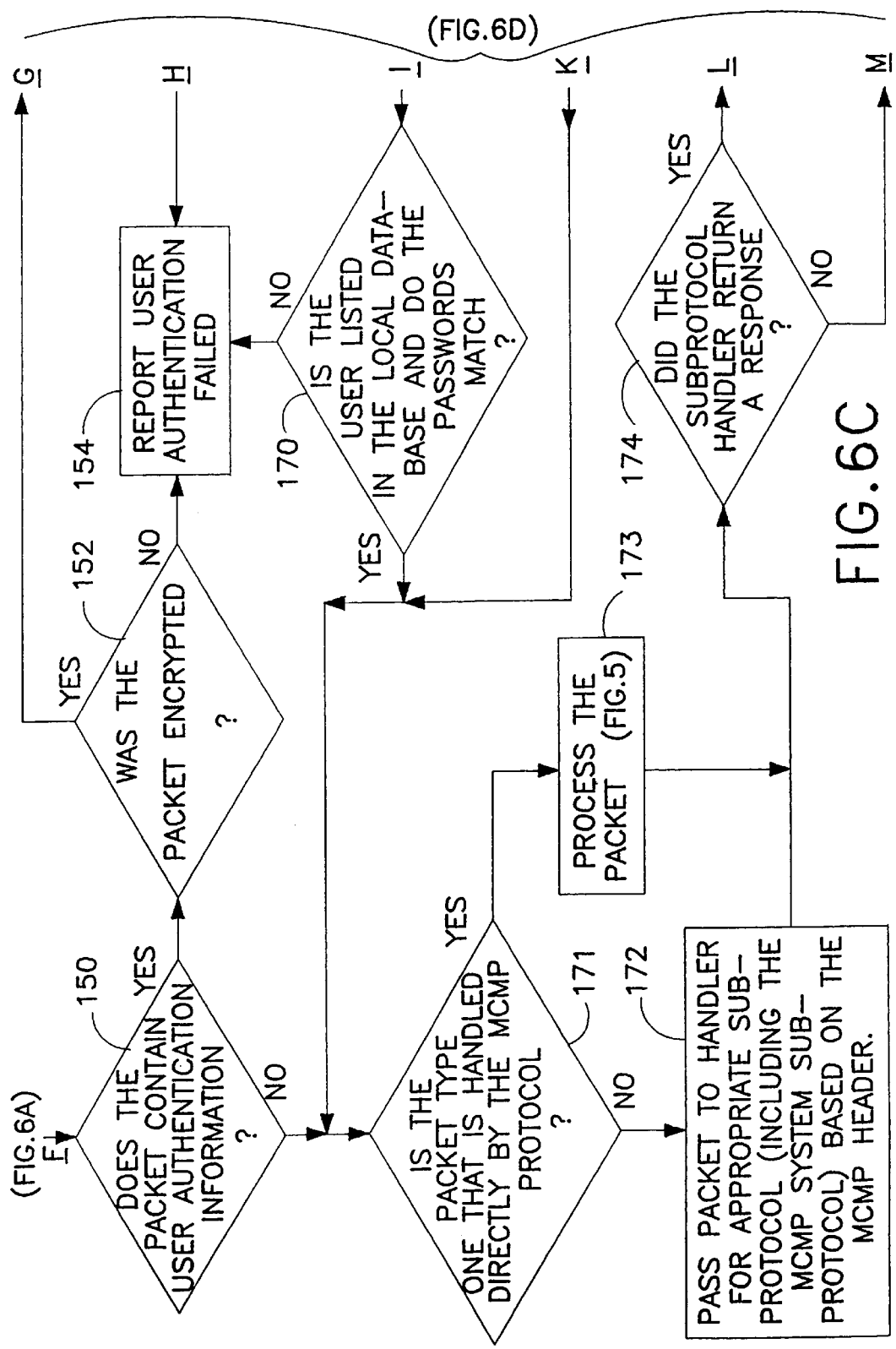
Figure 6E:
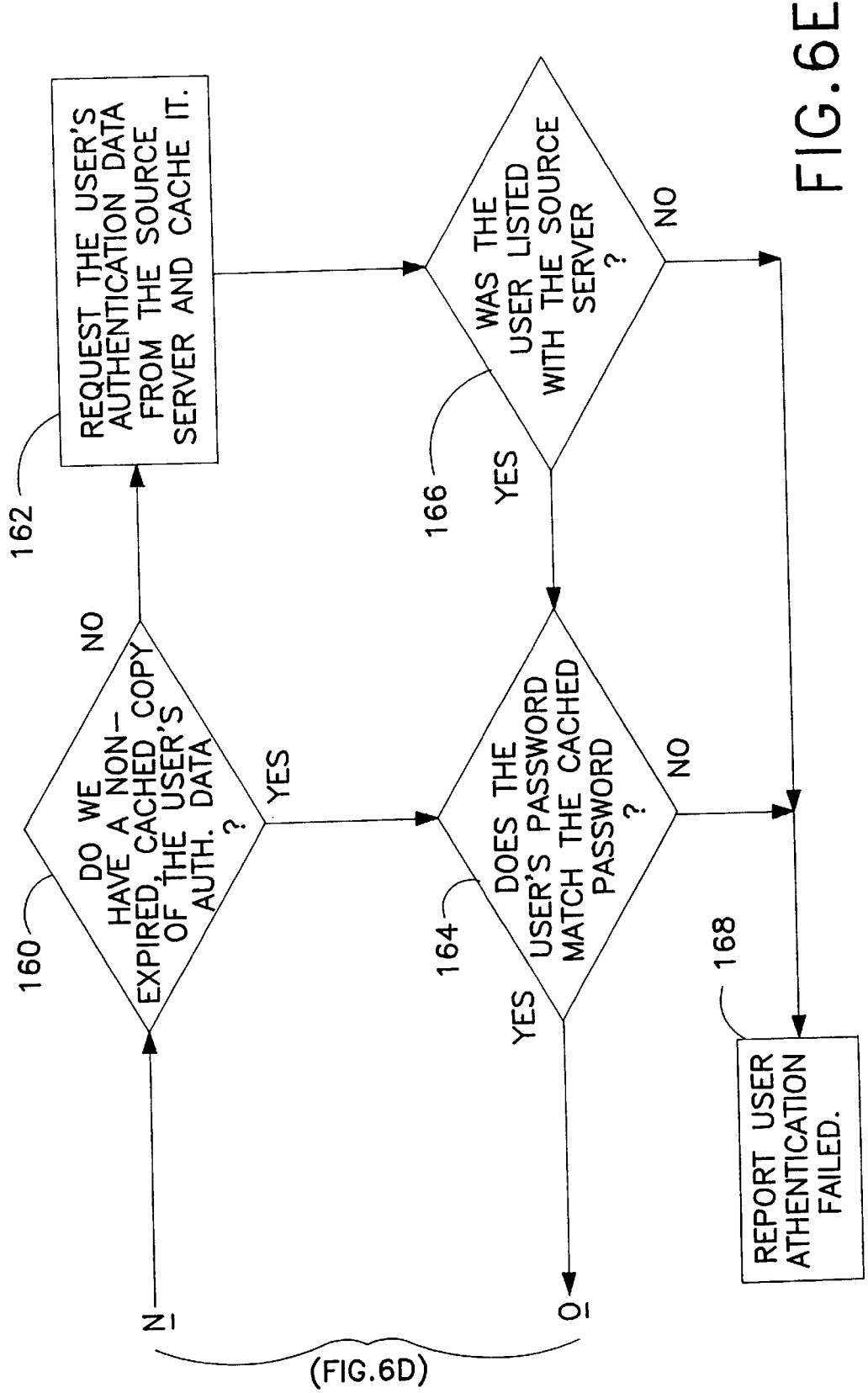

Once comparator 52 finds a match between the authentification code in an incoming packet and the user's authentification code in memory area 48, as determined in investigation 170 or in evaluation 164, or if the incoming packet did not contain a user authentification code, then evaluation 171 determines whether the packet should be handled directly by the MCMP protocol, or by another protocol. If evaluation 171 determines that the packet should be handled by the MCMP protocol directly, then the packet is processed accordingly at a step 173 as illustrated in FIG. 5. If evaluation 171 determines that the packet should be handled by a specific protocol, then processing circuits 50 determine in a step 172 which protocol (e.g., CMXD, UDSCP, MDBP, DPP) is appropriate for handling the content of the packet. If a response is produced by processing unit 30 under the selected protocol or by the main MCMP protocol, as determined in an inquiry 174, that response is tranenutted in a step 176 to the client that originally made the request. If there was a service handoff, that is, if the packet was shunted to the host server, then the response will be transmitted to a computer other than the computer from which the host received the packet. In a step 178, processing unit 30 begins processing the next packet in the queue or waits for a new packet to arrive.

As shown in FIG. 5, processing operation 173 includes an initial inquiry 116 into the type of packet. If the packet is an encryption packet, encryptionldecryption unit 38 or 60 is activated in a step 118 to decrypt the packet using the appropriate decryption module or key. In a subsequent step 120, the packet encased in the data area of the encrypted packet is flagged as non-shuntable and placed back into the MCMP incoming packet queue. If it is determined at inquiry 116 that the packet is not an encryption packet, an MCMP status report indicated an unknown packet type is issue in a step 122 and the packet is discarded. The functionality of the MCMP protocol may be enhanced at a later time by enhancing the process illustrated in FIG. 5 to include conditions for additional types of packets.

The Code Module Exchange Protocol (CMXP) handles dynamic downloading of executable code, program version control, client-to-client module exchange, virus and malicious program protection, data uploading, idle-time downloading, and code module caching. These functions are variously performed in servers 14 and 22 by code module exchanger 40 and version detector 42 and in user computer 12 by code module exchanger 56, author identification comparator 66, and unidirectional data submission and collection circuit 86, as well as by various nondesignated generic processing circuits 50 and 70. The server-side portion of the CMXP protocol, as implemented in part by code module exchanger 40, handles the delivery of code modules and supporting resources such as graphic images and fonts. Requests to the CMXP server and to code module exchanger 40 can reference a file, a portion of a file (such as a code module), or a portion of a code module or other supporting module. Because programs are broken down into separate code modules, these code modules can be delivered on an as-needed basis, eliminating the need to download an entire program before execution thereof can commence.

There are several ways of accommodating or incorporating an upgrade where programs are delivered piecemeal, module by module. If the old and new versions are completely compatible (for example, the new version was generated as the result a fix to a typographical error in a dialog box), the new modules can be merged with the old modules. Version information is stored on a per-file basis as well as a per-code-module basis. This means that code modules which were not changed in a version upgrade do not need to be downloaded again. If the old and the new versions are not compatible and cannot be merged, and the entire program has been cached locally or is still available from the server, the old version of the program can continue to execute until the next time the program is restarted. If the old and the new versions are not compatible and cannot be merged, and the old version of the program is no longer available in its entirety, the program should be immediately terminated and restarted using the new version code modules. The author of a program can override any of these update procedures by including a custom update module in the new version of the program,. This code module is downloaded (if necessary) and executed whenever a version conflict arises. Then, an election can be made to perform any of the above procedures or a custom procedure such as remapping the contents of the program's memory area so that they can be used by the new version.

Code modules and associated resources are cached by both user computers 12 and secondary servers 22. The caching rules can be incorporated into the CMXP protocol and/or the applications program itself This allows custom caching rules to be built into an application, thus providing for special caching schemes and hybrid applications. When a code module download is in progress, the number of bytes completed is stored in the cache along with the actual data downloaded. If a download is interrupted, it can resume where it left off at a later time.

Figure 7C:
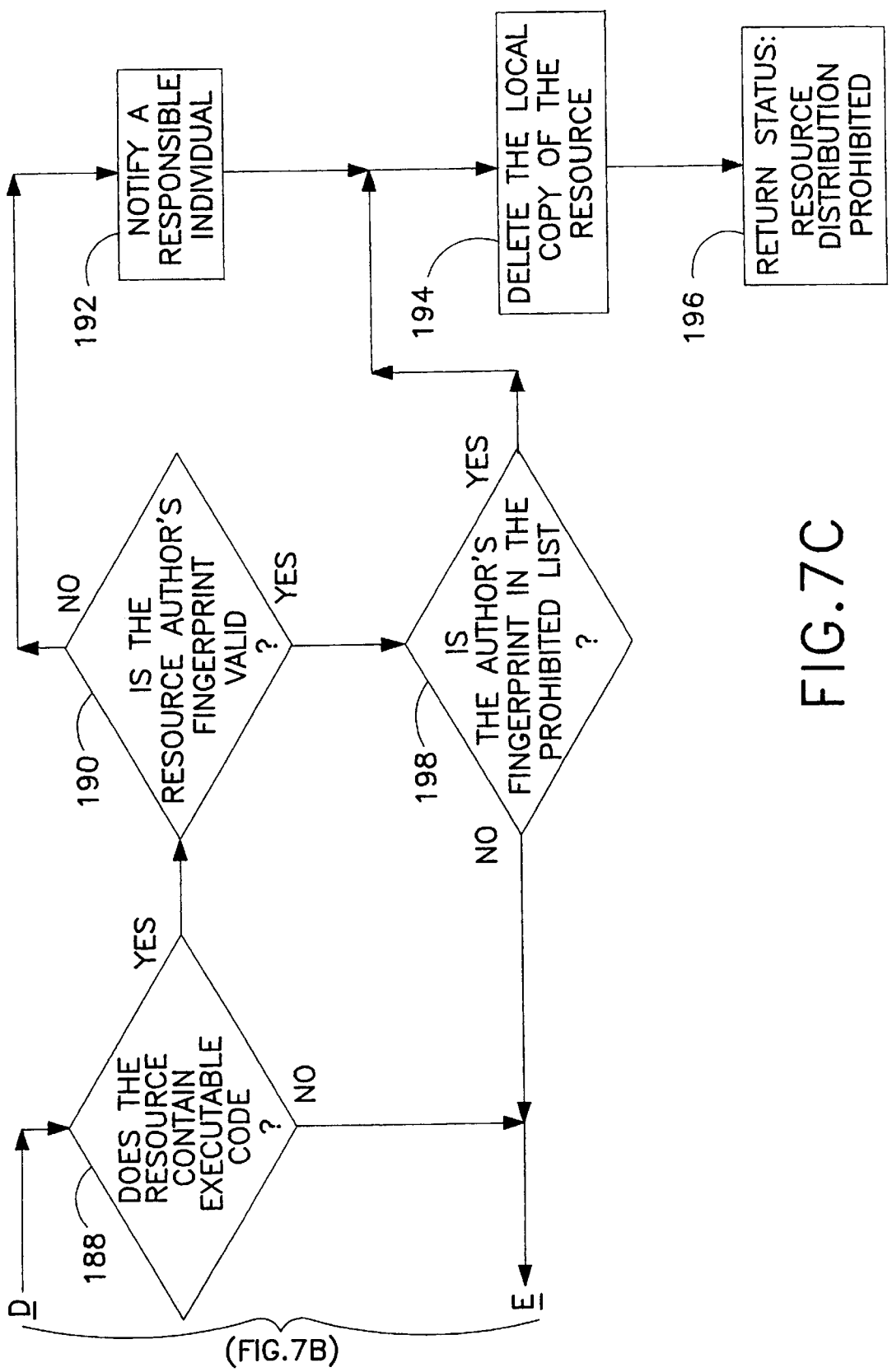
Figure 7E:
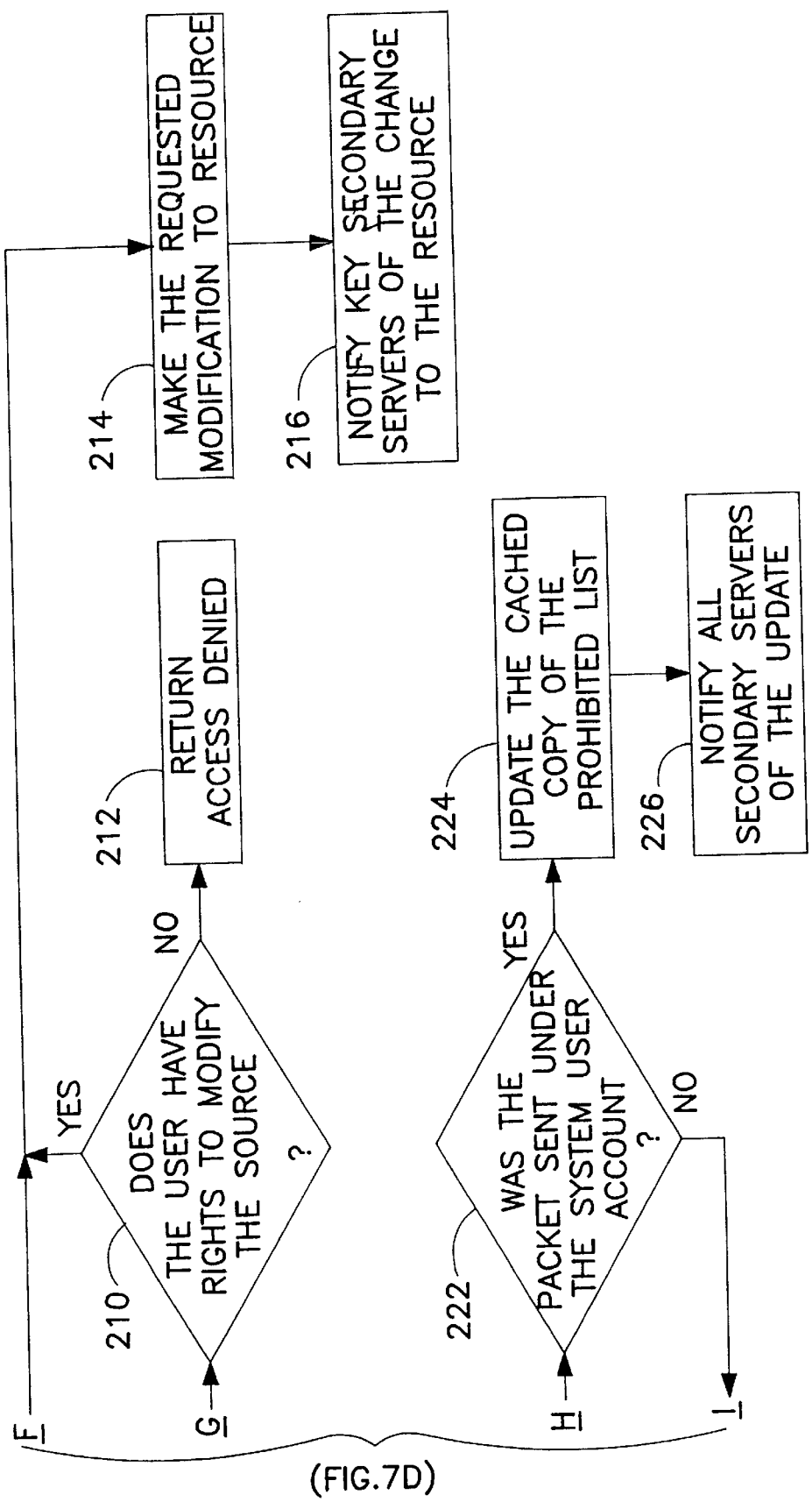
Figure 8B:
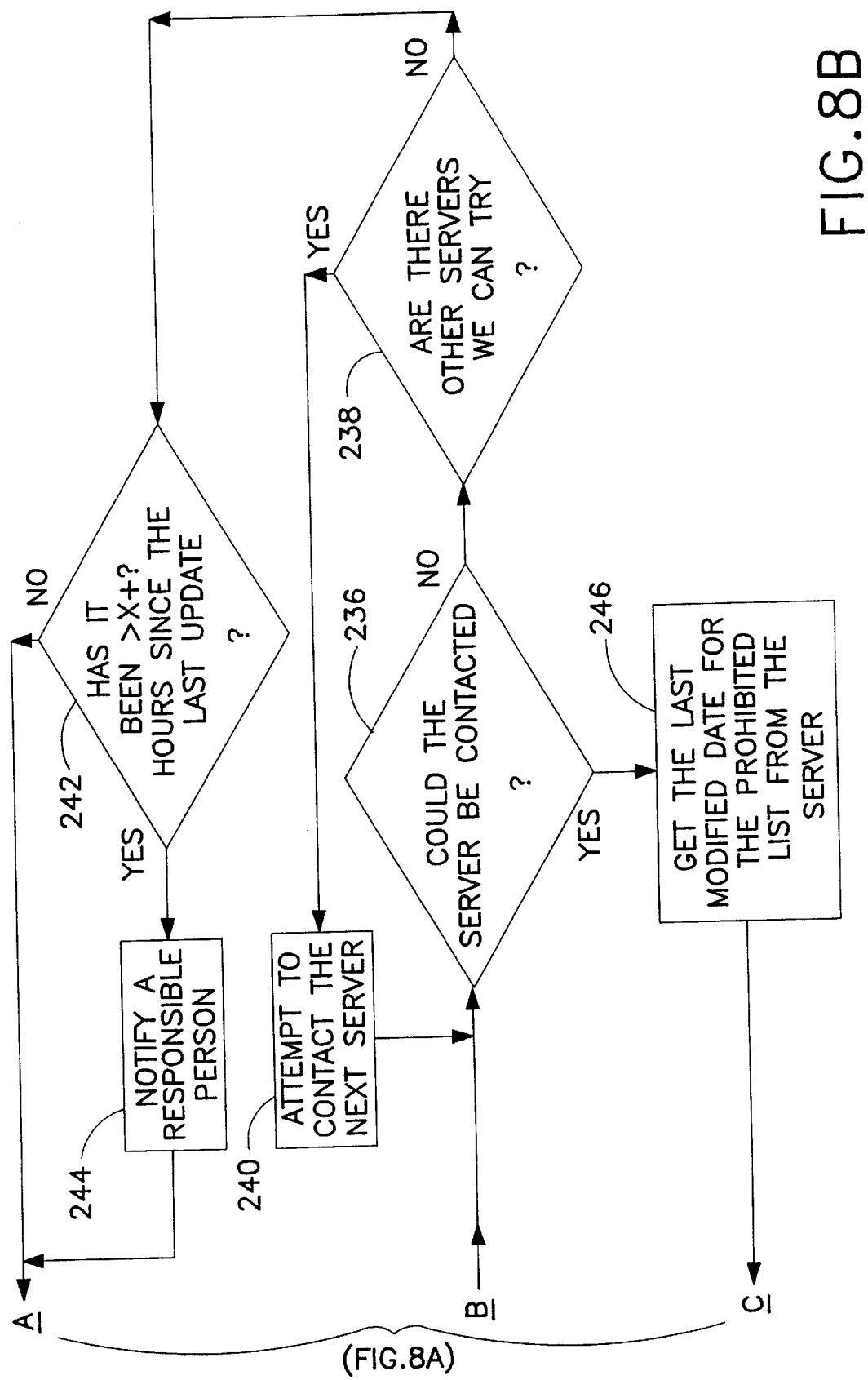
Figure 9A:
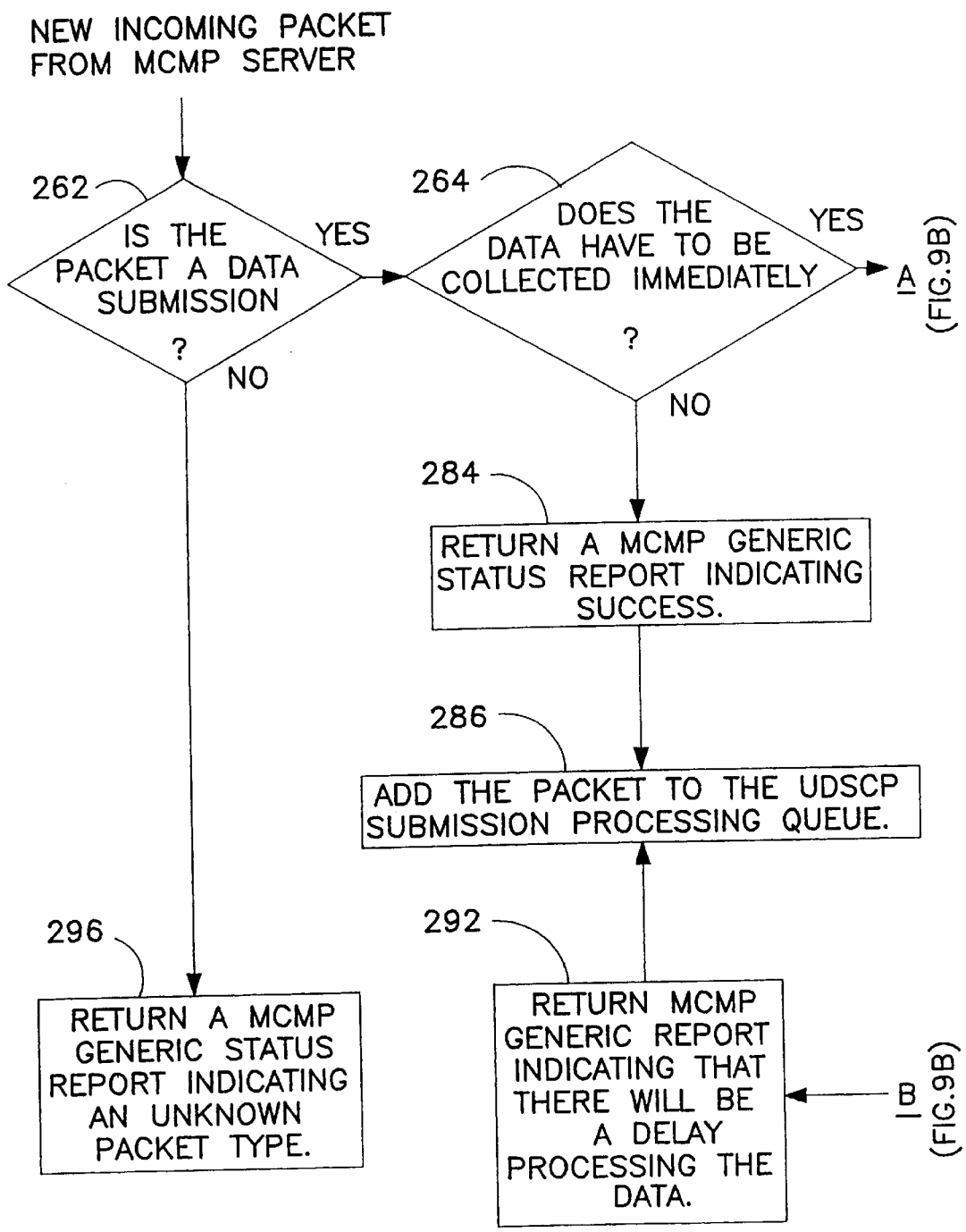
FIGS. 9A through 9D (hereinafter "FIG. 9")are a flow chart diagram illustrating a subroutine for processing an incoming resource request packet in the operation of selected program-modified processing circuits in the primary server of FIG. 2.
Figure 9B:
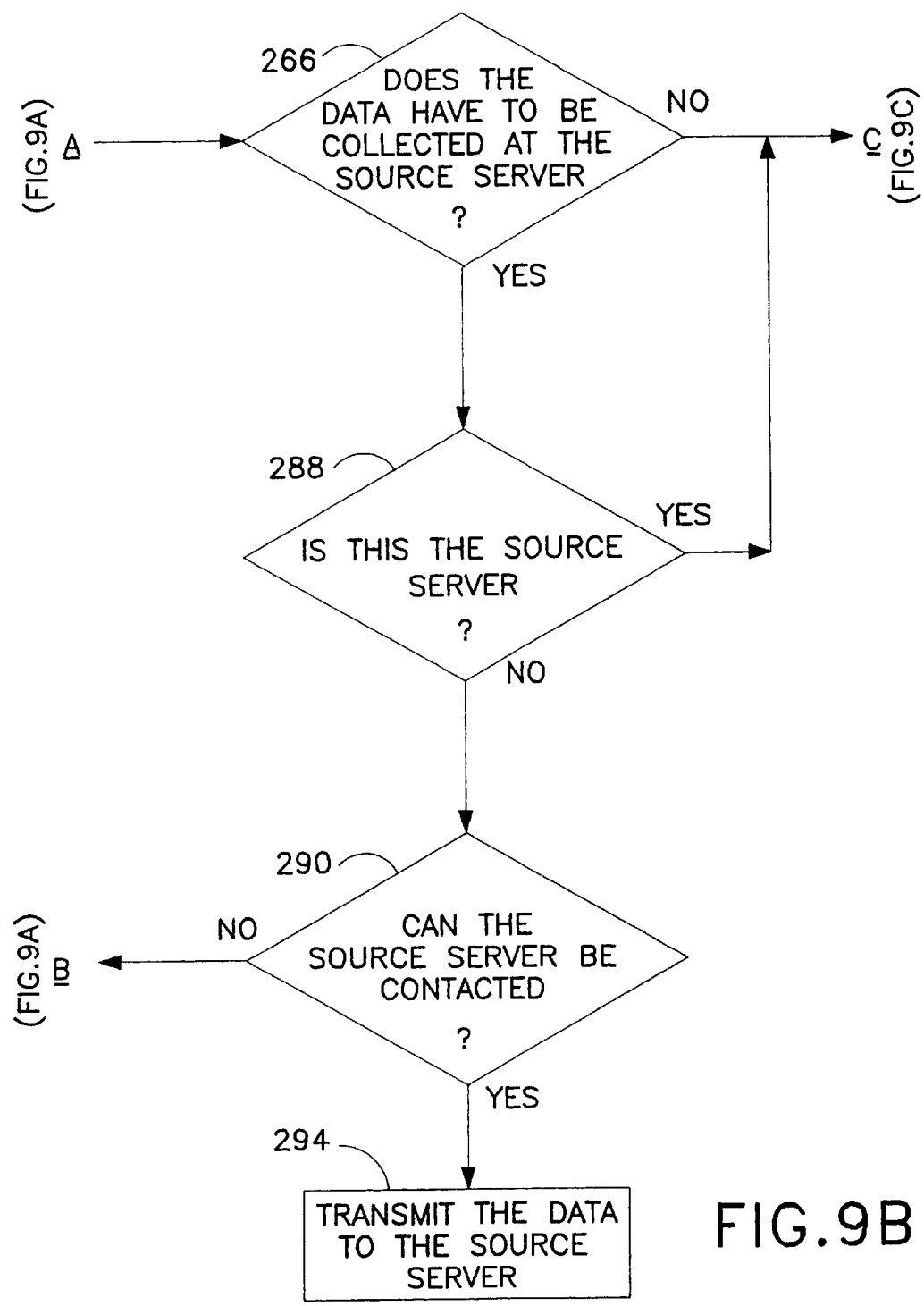
Figure 9C:
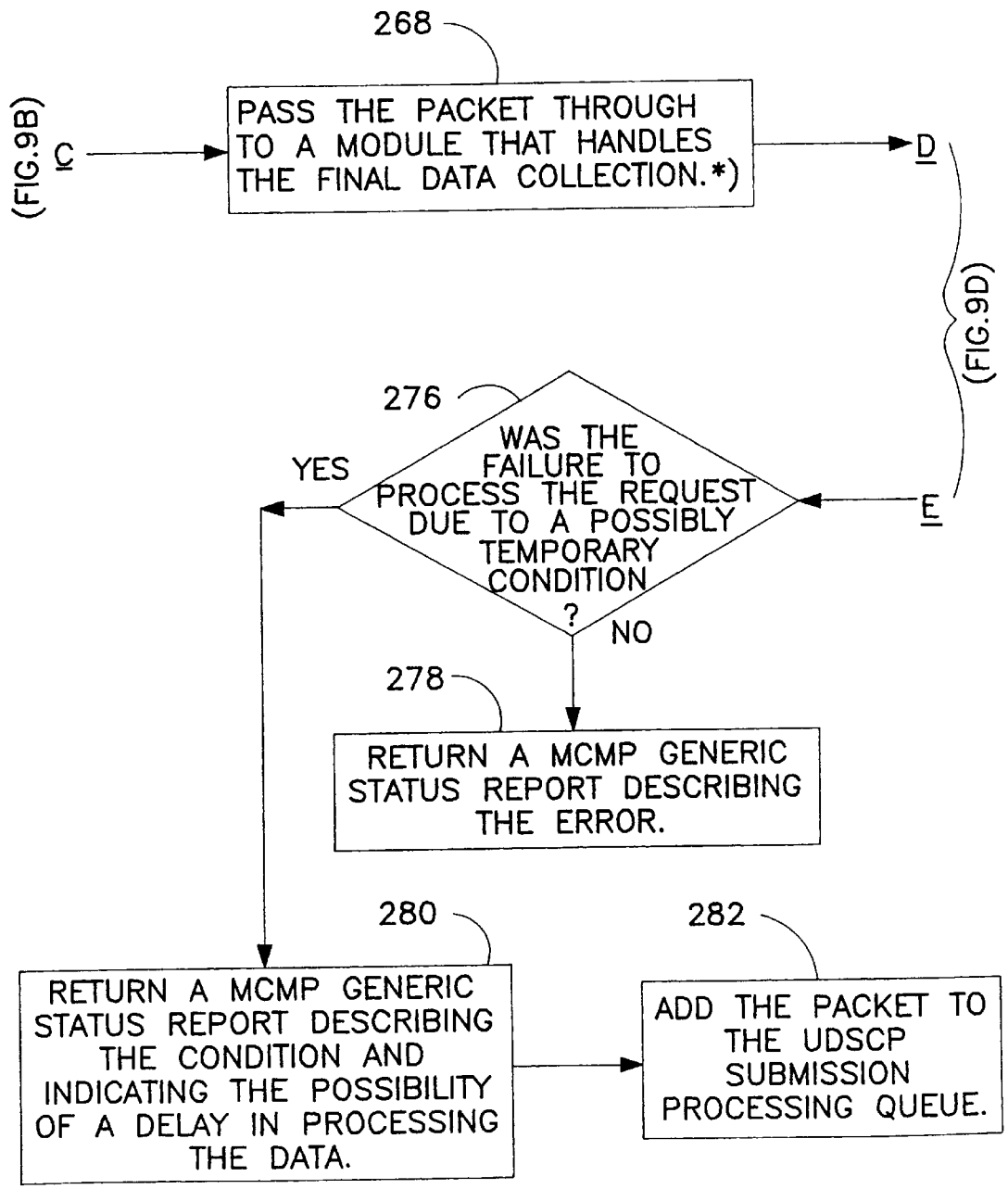
Figure 9D:
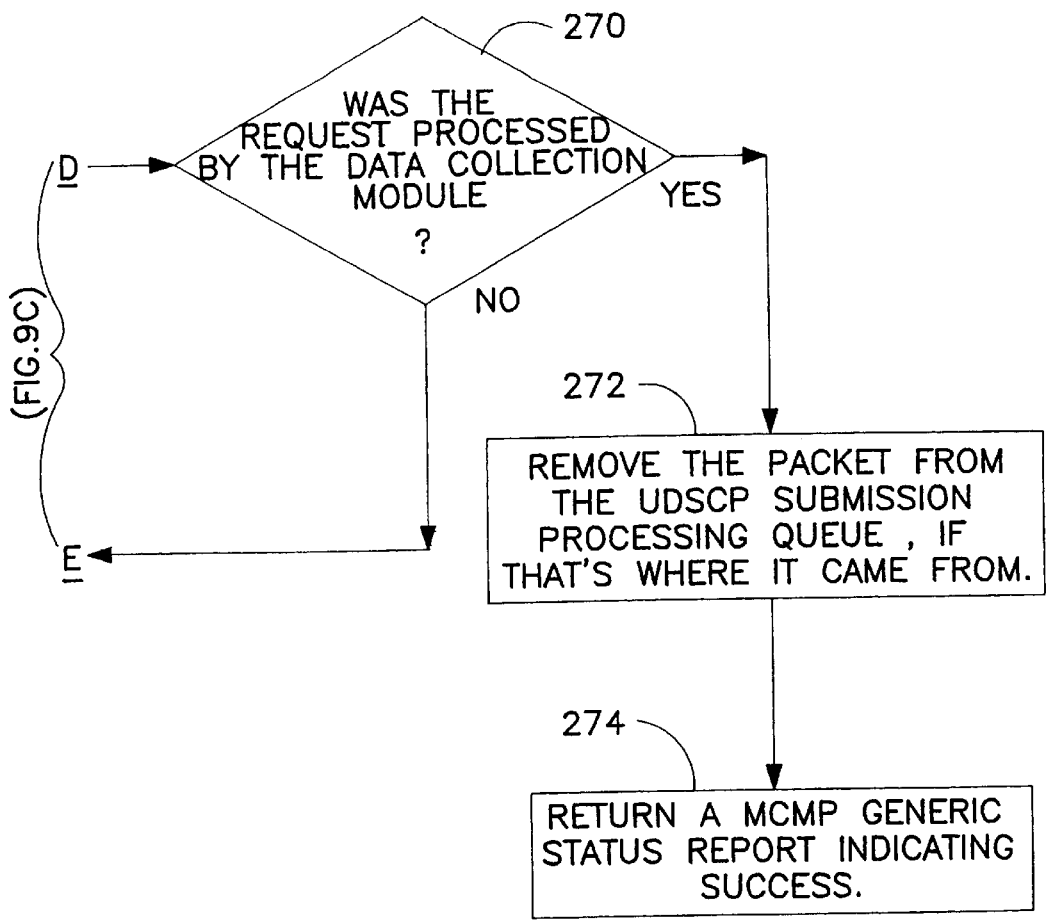

FIG. 7 illustrates operations executed by digital processing circuits of processing unit 30 which are functionally modified in accordance with the CMXP protocol. The operations include a check on author identification. Generally, the author blacklist in memory area 68 of user computers 12 is transmitted to the user computers from a server which undertakes maintenance operations to keep the list updated (FIG. 8).

As illustrated in FIG. 7, processing circuits 50 inquire at 180 whether an incoming packet constitutes a request for a resource. An affirmative answer to this inquiry leads to a further inquiry 182, as to whether the requested resource is available for anonymous access. If the resource is restricted, a determination 184 is made as to whether the requesting user has rights to access the requested resource. If the user has no such rights, an "access denied" message is returned to the requester in a step 186. If the requested resource is available to the requesting party, processing circuits 50 determine at a decision junction 188 whether the requested resource contains executable code. An affirmative determination causes a query 190 as to the validity of the author's fingerprint. If the fingerprint or author identification is invalid, a message is generated for a responsible party in a step 192. The local copy of the resource is deleted in a subsequent step 194 and a message "Resource Distribution Prohibited" is transmitted to the requesting party in a step 196.

If in response to query 190 it is found that the fingerprint of the author of the requested resource is valid, then a check 198 is made as to whether the author is blacklisted. A blacklisting leads to deletion of the local copy of the resource in step 194 and the issuance of the message "Resource Distribution Prohibited" in step 196. If the author is not blacklisted, or if the requested resource does not contain executable code, as determined at decision junction 188, then the processing unit 30 queries at 200 whether the client already has an up-top-date copy of the resource. If the client or user already has the latest version of the resource, a message to that effect is transmitted in a step 202. If the client or user's copy of the resource is an older version, the requested resource is transmitted to the client in a step 204.

If an incoming packet does not constitute a request for a resource, as ascertained in response to at inquiry 180, an investigation 206 is made as to whether the packet constitutes a request to modify a resource. If so, and if the resource is not available for anonymous modification, as determined at a decision junction 208, then processing unit 30 queries at 210 whether the user has rights to modify the resource. If the user has no such rights, then a message "Access Denied" is returned to the requester in a step 212. If the resource is available for modification by anybody (decision junction 208) or by the particular user (query 210), the processing unit 30 makes the requested modification to the resource in a step 214 and notifies key secondary servers, in a step 216, of the change to the resource.

If an incoming packet does not constitute a request for a resource, as ascertained in response to inquiry 180, and is not a request to modify a resource, as determined in investigation 206, then the processing unit 30 checks at 218 whether the packet is an update to a prohibition list, for example, a list of prohibited users or blacklisted authors. If the packet is such an update and is encrypted, as determined at decision junction 220, then the processing unit 30 determines at an inquiry 222 whether the packet was sent under the system user account. If so, the cached copy of the prohibition list is updated in a step 224 and all secondary servers are notified of the update in a step 226. If an incoming update request is not encrypted (decision junction 220) or is not sent under the system user account (inquiry 222), then an alert message is issued to an appropriate party in a step 228. In a step 230, a special status report is issued if an unknown packet type is received.

In a CMXP maintenance loop, shown in FIG. 8, for updating a list of blacklisted authors, processing unit 30 asks in an initial query 232 asks whether the time since the last list update is more than a predetermined number of hours. If that much time has passed, an attempt 234 is made to contact the next server upstream of the server conducting the inquiry. If that server cannot be contacted, as determined in a scan 236, a check 238 is made as to whether there are other servers available. If another server is available, an attempt 240 is made to contact that server. If no server can be contacted, the time is again checked, at 242. If a predetermined interval has lapsed since the last update, then an alert is provided to an appropriate party in a step 244.

If a server can be contacted, as ascertained in scan 236, the date of the last modification of the prohibition list is obtained from that server in a step 246. In a comparison 248, the processing unit 30 then determines whether the prohibition list has been modified since the list was cached by the processing unit. Where such a modification has occurred, a copy of the prohibition list is obtained in a step 250. The encryption status of the obtained list is investigated at 252. If the copy of the prohibition list. Finding a nonencrypted copy of the prohibition list leads to an alert status in a step 254, while an encrypted packet is investigated at 256 to determine with the packet was sent under the system user account. A properly sent packet results in an update of the cached copy of the prohibition list in a step 258 and a notification of the update to all servers in a step 260.

There are two primary methods for submitting or collecting data via the Uni-Directional Data Submission and Collection Protocol ("UDSCP"). Pursuant to the first method, submissions can be directed to either a primary server 14 or a secondary server 22. All submissions are then collected at a central server, where the submissions are processed by an application-specific server-side module. This method would be particularly useful for collecting all form submissions on one server where they can be incorporated into a LAN-based mail system. In the second method, a submission can be again directed at either a primary server 14 or a secondary server 22. The submissions are collected on the servers to which they were originally submitted (or are shunted using the standard load collection rules). The submissions are then processed by an application-specific server-side module. This module could, for example, e-mail all of the submissions to an Internet e-mail address.

FIG. 9 illustrates program steps undertaken by digital processing circuits of processing unit 30 which are functionally modified in in accordance with the UDSCP protocol. These circuit handle data submissions transmitted from user computers 12, particularly from unidirectional data submission and collection circuit 90 of processing unit 54, and from other servers. In a first inquiry 262, the processing unit 30 inquires whether an incoming packet is a data submission. If so, another inquiry 264 is made as to whether the data has to be collected immediately. If immediate collection is called for, the next question 266 entertained by the processing unit 30 is whether the data has to be collected at the source server. If not, the packet is passed in a step 268 through to a module that handles the final data collection. This module handles e-mailing the submission, recording it in a database, writing it to a file, or preforming any other necessary server-side task with the data. Subsequently, in an investigation 270, it is checked whether the request has been processed by the data collection module. If so, the packet is removed in a step 272 from the UDSCP submission processing queue, assuming that is where the packet was obtained. Then a status report is issued at 274 indicating successful data packet transmission. If investigation 270 reveals that the request has not been processed by the data collection module, the processing unit 30 questions at 276 whether the failure to process was due to a possibly temporary condition. If the answer to this question 276 is negative, a status report 278 is issued describing the error condition. If the answer to the question 276 is affirmative, a status report 280 is issued describing the condition and indicating the possibility of delay in processing the data. The packet is then added in a step 282 to the UDSCP processing queue.

If an incoming packet is a data submission which does not have to be collected immediately, as determined at inquiries 262 and 264, a status report 284 is issued indicating success and the packet is then added in a step 286 to the UDSCP processing queue. If an incoming data packet is a data submission which has to be collected immediately at the source server, as determined at inquiries 262 and 264 and in response to question 266, a check 288 is made as to whether the host server is the source server. If so, the packet is passed in step 268 through to a module that handles the final data collection. If not, processing unit 30 conducts an investigation 290 as to whether the source server can be contacted. If no contact is possible, a status report 292 is generated indicating that there will be a delay in processing the data and the packet is then added to the UDSCP processing queue in step 286. If the source server can be contacted, the data is transmitted to that server in a step 294. If the UDSCP function-modified generic processing circuits of processing unit 30 are provided with a packet other than a data submission, a report is produced in a step 296 indicated that the packet is of unknown type.

Figure 10A:
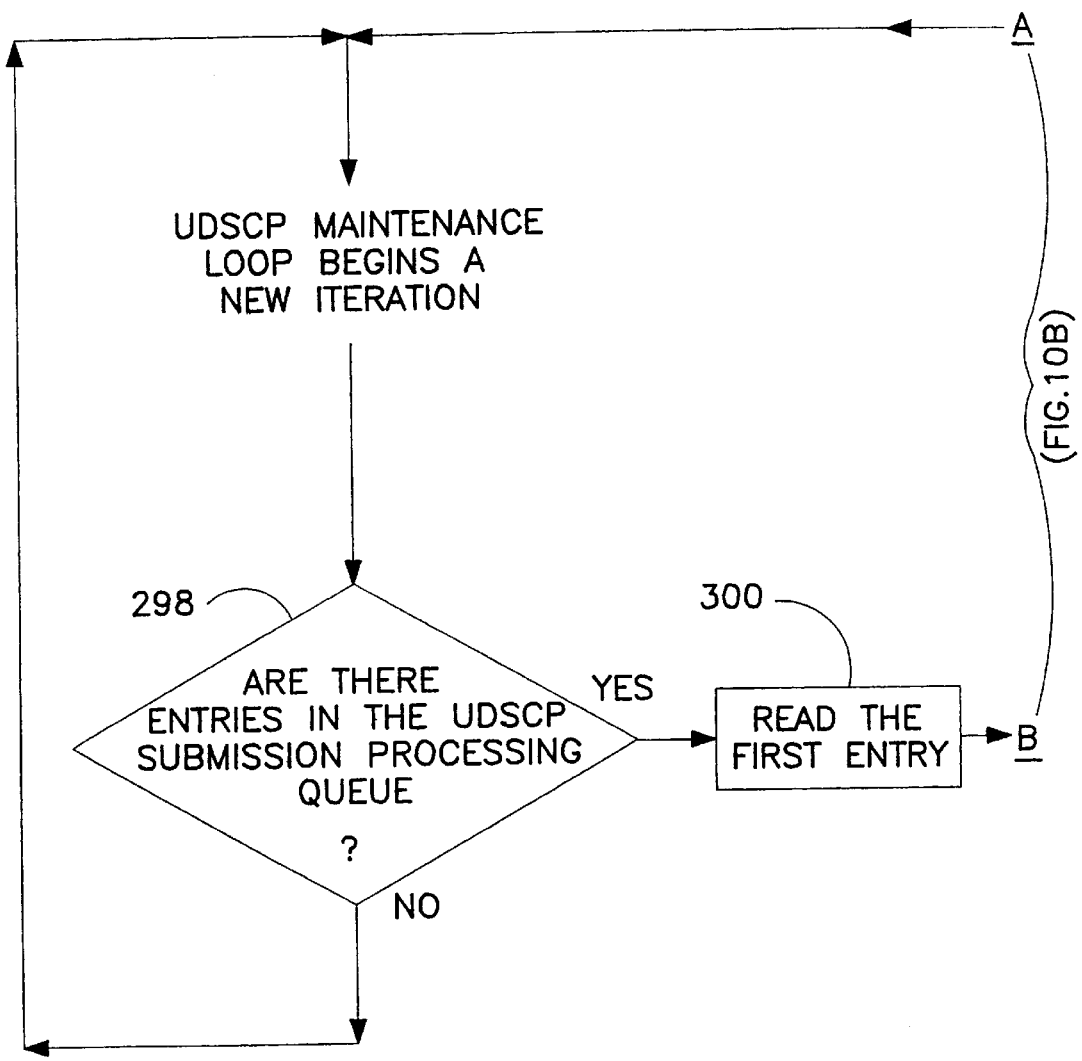
Figure 10B:
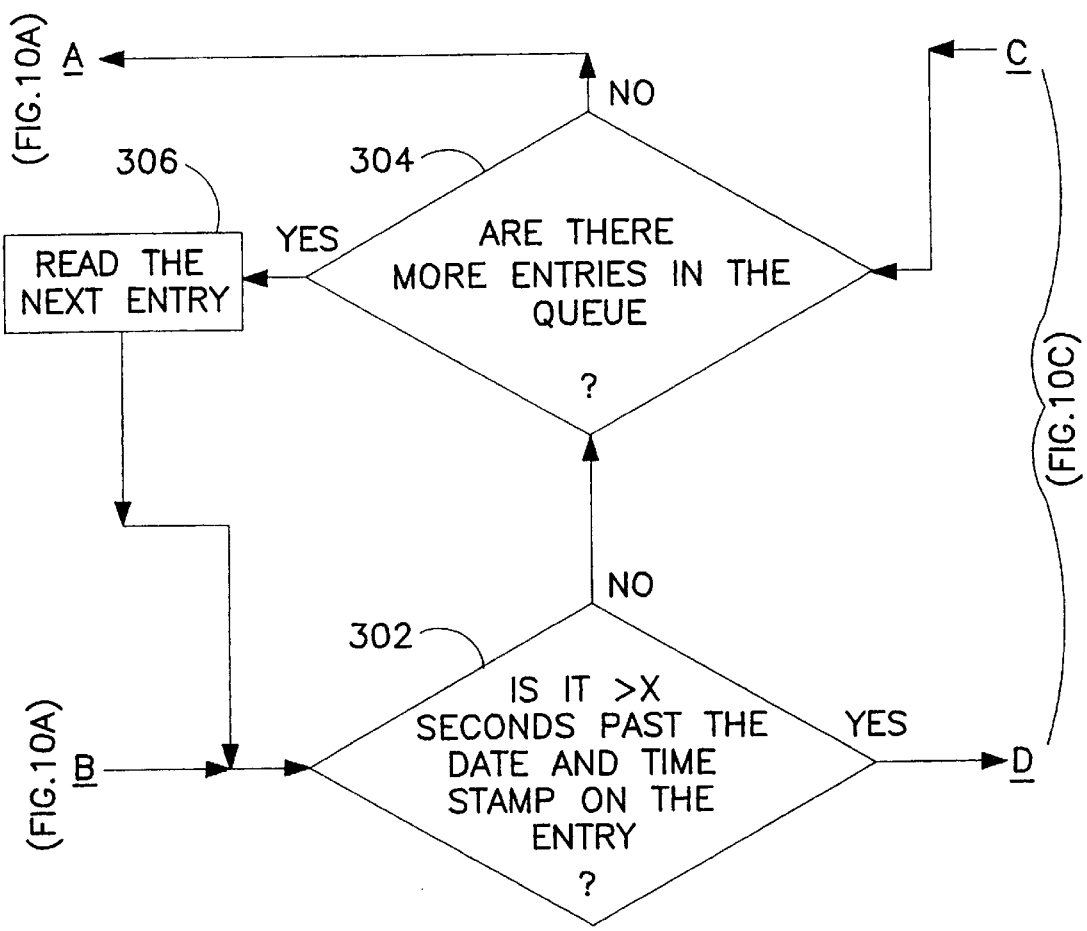
Figure 10C:
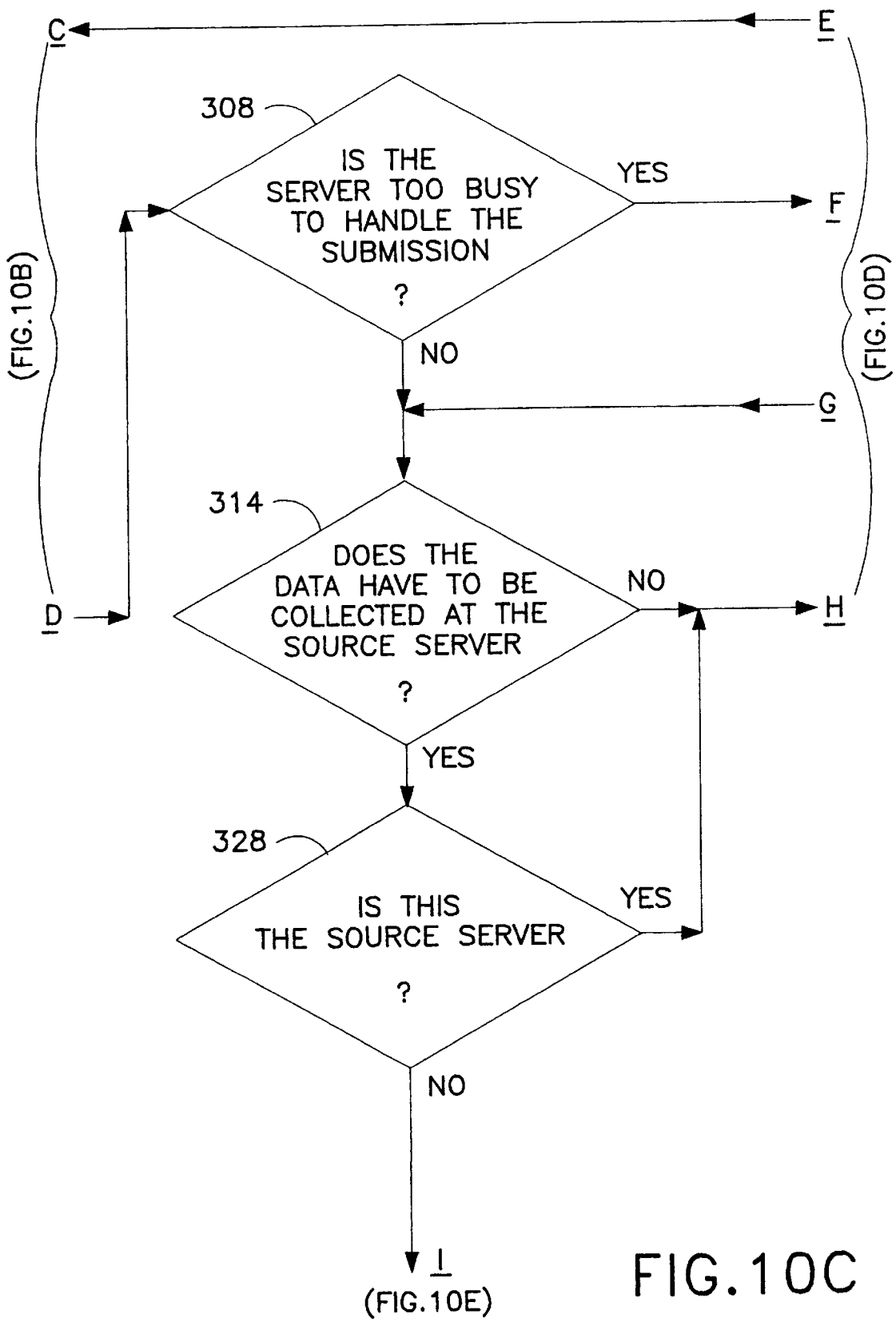

FIG. 10 illustrates steps in a maintenance loop undertaken by generic digital processing circuits in processing unit 30 which are functionally modified in accordance with the UDSCP protocol. First, an inquiry 298 is made as to whether there are entries in the UDSCP submission processing queue. If so, the first entry is read in a step 300. Subsequently, processing unit 30 decides at junction 302 whether more than X seconds have passed since a date and time stamp on the entry. If not, the UDSCP submission processing queue is investigated at 304 to ascertain whether any further entries are in the queue. If so, the next entry is read in a step 306 and again the processing unit 30 decides at junction 302 whether more than X seconds have passed since a date and time stamp on the entry. If the time passed is greater than that predetermined limit, then a query 308 is made as to whether the server is too busy to handle the data submission. If the server is indeed too busy, processing unit 30 questions at 310 whether the data has the be collected immediately. If the data collection is not urgent, processing unit 30 determines at 312 whether the date and time stamp on the entry was earlier than a particular time. If the date and time stamp is recent, processing unit 30 returns to investigation 304 to check any remaining data submissions in the UDSCP submission queue.

If the server is not too busy to handle a data submission (query 308), if the data has to be collected immediately (question 310), or if data and time stamp indicates a certain age to the data submission (determination 312), processing unit 30 determines at a decision junction 314 whether the data has to be collected by the source server. If not, the packet is passed in a step 316 to a module that handles the final data collection. This module handles e-mailing the submission, recording it in a database, writing it to a file, or preforming any other necessary server-side task with the data. Subsequently, processing unit 30 checks at 318 whether the data submission was processed by the data collection module. If processing has indeed occurred, the packet is removed from the UDSCP submission processing queue in a step 320 and the processor 30 returns to investigation 304 to ascertain whether any further entries are in the queue. If the data submission packet has not been processed, which is discovered at 318, an inquiry 322 is made as to whether the failure to process the request is due to a possibly temporary condition. If not, a notification 324 is generated for alerting an appropriate person as to the failure. If so, the date and time stamp on the data submission is updated in a step 326.

If processing unit 30 determines at decision junction 314 that the data has to be collected by the source server and further determines at a subsequent decision junction 328 that the host (itself) is the source server, then the packet is processed (step 3 16). Alternatively, if the source server must do the data collection and is a different computer, as determined at decision junction 328, then an attempt 330 is made to contact the source server. If the source server cannot be contacted, the date and time stamp on the data submission is updated in step 326. If the source server is available, the data submission is transmitted to the source server in a step 332 and the packet is removed from the UDSCP processing queue in a step 334.

As discussed above, the MCMP protocol handles Load Distribution, User Authentication, and Encryption. All other functions are handled by sub-protocols. The MCMP protocol has four sub-protocols. These are the Code Module Exchange Protocol (CMXP), the Uni-directional Data Submission and Collection Protocol (UDSCP), the Metered Delivery and Billing Protocol (MDBP), and the Distributed Processing Protocol (DPP). This set of protocols can be expanded in the future to add additional functionality to the MCMP protocol.

Basic MCMP Packet Structure

All MCMP packets consist of a MCMP header, followed optionally by one or more resource identifiers, and a data area called the packet body (FIG. 1). The entire size of an MCMP packet can be calculated as 128+RsrcIDLen+PacketSize, where RsrcIDLen and PacketSize are elements of MCMP header (see below).

The MCMP header identifies the sub-protocol to which the packet belongs, as well as the type of packet. In addition, the MCMP header contains load distribution, user authentication, and encryption information. The Resource identifiers identify any resource or resources referred to in the packet (the ResourceReq flag being set). The MCMP packet body contains packet-type specific information and is always interpreted by a subprotocol handle. The packet body is optional and can be omitted b ysetting the PacketSize element of the MCMP headet to be 0.

The MCMP header structure is defined as:

| | |
|---|---|
| MCMPHeader,128 | $$ MCMP header structure |
| • MPVersion,4 | $$ Master protocol version |
| • ProtoVendor, 8 | $$ Protocol vendor |
| • ProtoID, 8 | $$ Protocol ID |
| • ProtoVer, 4 | $$ Protocol version |
| • TransID, 2 | $$ Client Assigned Transaction-ID |
| • PacketType, 2 | $$ Protocol-specific Packet Type |
| • PacketVersion, 4 | $$ Packet version number |
| • PacketSize, 4 | $$ Size, in bytes, of packet body |
| • OrigIP, 4 | $$ Originating Host IP Address |
| • OrigPort, 2 | $$ originating Host Port Number |
| • UserID,10 | $$ User ID for client authentication |
| • Password, 10 - | $$ Password for client authentication |
| • RsrcIDLen,2 | $$ Resource identifier length |
| • RsrcIDs,2 | $$ Number of resource identifiers |
| • RsrcSrcIP,4 | $$ Resource source IP |
| • Flags, 2 | $$ Flags; see functions below |
| • , 64 | $$ Reserved |
| * Flags: | |
| Shunted = bit (Flags,1) | $$ Packet has been shunted |
| Shuntable = bit (Flags,2) | $$ Packet can be shunted |
| Encrypted = bit (Flags,3) | $$ Packet was encased in an encryption packet |
| ResourceReq = bit (Flags,4) | $$ Packet constitutes a request for a resource |

The elements of this structure are described in more detail below.

MPVersion: This is a 4-character version identifier for the Master Protocol. If the structure of the MCMP header or any other major component of the Master Protocol structure is revised, this version number is incremented.

ProtoVendor. This is an 8-byte text literal that describes the software vendor initial responsible for maintaining the sub-protocol specificiation for the sub-protocol to which the packet belongs.

ProtoID. This is an 8-byte text literal assigned by the software vendor specified in the ProtoVendor element. This identifies the sub-protocol to which the packet belongs. The combination of ProtoVendor and ProtoID uniquely identifies a sub-protocol.

ProtoVer: This is a 4-byte text string that specifies the version of the sub-protocol specified in the ProtoVendor and ProtoID elements. The first to characters are the major version, the second two the minor version. All characters must be used, so if the major version is one character long, it must be written as 01, not 1. This value does not contain a decimal point. For example, version 2.4 would be 0 2 4 0.

Packet-Type Identifier (PacketType): A two-byte integer assigned by the vendor that uniquely identifies the packet type within a particular sub-protocol.

PacketVersion: This is a 4-character identifier for the packet version. When the structure of a packet is changed, this version number is incremented. This allows a sub-protocol handler running on an MCMP server to deal with both old and new packet structures, should a packet structure need to be altered. The format for the string is the same as the format of the ProtoVer element of the MCMP header.

Shunted flag (Shunted): A flag indicating whether this packet has been shunted as the result of a service hand off.

Shuntable flag (Shuntable). A flag indicating whether this packet can be shunted. This flag and the Shunted flag are mutually exclusive.

Encrypted flag (Encrypted): A flag indicating whether the packet was encrypted. This flag is cleared when a packet is placed in the MCMP Server incoming packets queue, unless the packet is place there by the decryption system, in which case the flag is set.

Request-Resource flag (ResourceReq): Indicates whether the packet constitutes a request for a resource.

Number of Resource Identifiers (RsrcIDs): Dpecifies the number of resource identifiers following the MCMP header structure.

Resource Identifier Length (RsrcIdLen): Specifies the combined length of all resource identifiers following the MCMP Header structure.

Originating Host Address (OrigIP, OrigPort): This is the IP address of the host from which the request originated. If the packet was shunted, this is the IP address of the host that originally transmitted the request, not the address of the server that forwarded the request.

Resource Source IP (RsrcSourceIP): This is the IP address of the host on which the original copy of the requested resource resides, if the Request-Resource flag is true.

Cached Copy Date/Time Stamp (CacheDate, CacheTime): This is the date and time stamp of the cached copy of the resource, or zero if no cached copy exists. If the date and time stamp of the resource match this date and time stamp, the resource content will not be returned.

Size of packet body (PacketSize): The size (in bytes) of the packet body following the MCMP Header and (if present) the resource identifiers.

User ID and Password for client authentication (UserID, Password): A user ID and Password used to authenticate the client. The authority for a user's ID and Password is the Resource Source IP server. If a request is made to a secondary server for a password-protected resource, the secondary server must check with the primary (or source server) for password authentication. This information can be cached for the duration of the session.

Transaction ID (TransID): A unique ID assigned by the host initiating the transaction. This is used to track a transaction over one or more service hand-offs. For an encryption packet, this should be set to zero (although it can be set to a non-zero value in the encased packet).

MCMP Resource Identifiers

If the packet refers to one or more resources (the ResourceReq flag is set), the Resource identifiers identify the resource or resources to which the packet refers. Resource identifiers are null-terminated text strings. The basic format for a resource identifier is:

type:[locator/s;]length[;date[,time]]
Where:

| | |
|---|---|
| type | Identifies the resource type; the possible values for this argument are sub-protocol-specific. |
| locator/s | One or more values (in double-quotes if they contain commas; double up the double-quotes where they are used within the value) used to locate the resource. |
| length | The amount of the resource to read (in units specific to the sub-protocol). This is always the last item in the resource identifier. It can be in the format "n" to specify n units starting at the beginning of the resource, the format "n/n" to specify a range of units (inclusive), the format "n/n" to specify a starting unit and number of units, or "*" to specify the entire resource. |
| date | The date, in the format mm/dd/yyyy that the cached copy of the resource was last modified. This field accepts both single and double digits for the month and day, although the year must be specified as a full 4-character string. Forward-slashes must be used as separators. |
| Time | The time, in the 24-hour format hh:mm:ss, that the cached copy of the resource was last modified. hh may be a single or double digit number, and mm and as must be double digit numbers (use a leading zero if necessary). |

The Resource ID is optional, and does not need to be included in a MCMP packet, so long as the ResourceReq flag is not set.

Some example Resource ID's are:

```
data: "\catharon\demos\media., "video.bin", "play30";*
prohibitedlist:*
dir:"\";*
data:"\catharon\demos\","mag2.dat";0/256
data:"\training","air.bin.","Rudder";*;10/03/1995,4:03:30
```

MCMP Packet Types

The following subprotocols are not sub-protocl specific and are accordingly defined for the MCMP protocol:

| | | | |
|---|---|---|---|
| MCMP_Encrypt | = h0002 | $$ | Encryption |
| MCMP_Status | = h0003 | $$ | Status Report |
| MCMP_PerfStatReq | = h0006 | $$ | Performance Statistics Request |
| MCMP_PerfStatResp | = h0007 | $$ | Performance Statistics Response |
| MCMP_UserIReq | = h0008 | $$ | User Information Request |
| MCMP_UserIResp | = h0009 | $$ | User Information Response |
| MCMP_EchoReq | = h000a | $$ | Echo Request |
| MCMP_EchoResp | = h000b | $$ | Echo Response |

These packet types are described in detail below.

ENCRYPTION (MCMP_Encrypt): The encryption packet is used when data must be encrypted. A packet to be encrypted is encased in the data area of a MCMP System encryption packet. The MCMP Header for the encryption packet is:

PacketType: MCMP_Encrypt (hO002)
PacketSize: Size of encased packet in encrypted form plus 32 bytes
ResourceID's: None
Shuntable: Inherited from encased packet
ResourceReq: False
The packet body of the encryption packet is:

| | |
|---|---|
| Bytes 0–31 | Encryption header |
| Bytes 32–end | Encrypted packet |

The header for the encryption packet is:

| | |
|---|---|
| PT_Encrypt_Header,32 | |
| • DecryptLess,8 | $$ Code module to handle decryption |
| • DecryptUnit,8 | |
| • EncodingMethod,2 | $$ Encoding method |
| • ,14 | $$ Reserved |

STATUS REPORT (MCMP_Status): The status report packet is used to return the status of an operation. When used, it is always a response to a previously transmitted request. The status packet contains detailed error information, including an English language description of the error or status value which can be displayed by the application if it cannot interpret the error code.

A status report packet body consists of one or more information fields, which can vary in length. The first information field is always a Status Report Header. Each information field consists of an 8-byte header which indicates the length and type of the information field, followed by the field itself.

The MCMP Header for the status report packet is:

PacketType: MCMP_Status (h0002)

PacketSize: Variable

ResourceID's: None

Shuntable: No

ResourceReq: No

The Information Field Header for the status report packet is:

```
MCMP_StRprt IFldHdr,8
•   IfldSize,2           $$ Size of information field
•   IfldClass,1          $$ Field alass (1=Standard,
                            2=Protocol Specific)
•   IfldType,2           $$ Field type
•   ,3                   $$ Reserved
```

Following are the standard information field types (where IFldClass=1):

```
MSR_Header         = 1    $$ Header
MSR_ShortDesc -    = 2    $$ Short Description
MSR LongDesc       = 3    $$ Long Description
MSR_DetailDesc     = 4    $$ Detailed Description (Technical)
MSR_XErr70         = 102  $$ LAS 7.0 Execution Error Data
MSR_XErr70do       = 103  $$ LAS 7.0 Execution Error-do-stack
```

These information field types are described in detail below:

The generic status report header (MSR_Header) is always present in all status report packets, and is always the very first information field in the packet. It has the following structure:

```
MSR Header_Struc,32
•   ProtoVendor, 8    $$ The Vendor of the protocol reporting the
                         error
•   ProtoID, 8        $$ The ID of the protocol reporting the error
•   ProtoVer, 4       $$ The version of the protocol reporting the
                         error
•   Severity, 1       $$ severity of error:
•   *                    -1 = Notification of success
•   *                     0 = Warning (operation will proceed
                             anyway, but there may be a
                             problem)
•   *                     1 = Error (operation cannot proceed)
•   *                     2 = Unexpected error
•   ProtoSpecific, 1  $$ Protocol-specific error-flag.
•   ErrorType, 2      $$ Sub-Protocol-Specific error type
•   ErrorCode, 2      $$ Sub-Protocol -Specific error code
•   , 6               $$ Reserved
```

If the ProtoSpecific flag is set, then ErrorType and ErrorCode are protocol-specific. Otherwise, ErrorType is one of the following:

```
ERRT _ Zreturn     = 1    $$
  *zreturn* error
ERRT_XErr          = 2    $$ TenCORE Execution error
ERRT_CErr          = 3    $$ TenCORE Condense error
ERRT_Dosdata       = 4    $$ Catharon dosdata-style error
```

For anything in the MCMP_Status packet that is protocol specific, the ProtoVendor and ProtoID from the Status Report Header are used to identify the protocol.

The Short Description information field type (MSR_ShortDesc) is a short description of the error, 40 characters long or shorter, that can be used in a list or wherever a brief, friendly error description is needed. This packet is 40 bytes long, and is structured as follows:

```
MSR_ShortDesc strtlc, 40
•   ShortErrDesc,40          $$ Short description of error
```

The Long Description information field type (MSR_LongDesc) is a longer description of the error, which can vary in length up to 2048 characters. This description can span multiple lines, with each line terminated by a carriage return (h0d). The length of this description is determined by the length of the information field, and the entire content of the information field is one long buffer variable containing the description as text. There is no maximum length to a line, and lines may be word-wrapped at any position when this description is displayed.

The Detailed Description information field type (MSR_DetailDesc) is a detailed technical description of the error, with all diagnostic error information included. For example, this might be a standard TenCORE execution error as it would be written to the catharon.err log file by the Catharon error handler. This can vary in length, up to 4096 characters. The description can span multiple lines, with each line terminated by a carriage return (h0d). Lines must be no longer than 80 characters. Lines longer than 80 characters may be truncated at display time. This description is never word-wrapped, and is always displayed in a fixed pitch font, allowing items on separate lines to be aligned and formatted using spaces (tables could be created using this method). The length of this description is determined by the length of the information field, and the entire content of the information field is one long buffer variable containing the description as text.

The TenCORE 7.0 Execution Error Data (MSR_XErr70) is an exact snapshot of the data generated by a TenCORE execution error, and returned by TenCORE in the execution error memory block. It is 256 bytes long. This information field type is normally only included if the error being reported is a TenCORE execution error.

The TenCORE 7.0 Execution Error To- Stack (MSR_XErr70do) is an exact snapshot of the TenCORE execution error -do- stack. The size of the data varies based on the size of the TenCORE -do- stack at the time of the error.

PERFORMANCE STATISTICS REQUEST (MCMP_PerfStatReq): The performance statistics request packet requests a server's current performance and load statistics.

The MCMP Header of a performance statistics request is:

PacketType: MCMP_PerfStatReq (h0005)

PacketSize: 0

ResourceID's: None

Shuntable: No (because this is a request for the statistics for the server to which it is addressed, shunting me packet would cause meaningless results)

The response to this packet should be either an MCMP_PerfStatResp or a MCMP_Status packet.

PERFORMANCE STATISTICS REPORT (MCMP_PertStatResp): This packet is a response to an MCMP_PerfStatReq packet and contains a performance statistics report for the server to which it was addressed.

The MCMP Header of a performance statistics report is:

PacketType: MCMP_PerfStatReq (h0006)

PacketSize: 32

ResourceID's: None

Shuntable: No

ResourceReq: No

The Packet Body of a performance statistics report is:

PerfStats,32
- Pusage,1         $$ Processor usage (percent)
- CurReqs,2        $$ Current number of requests being processed
- TotalRegs,2      $$ Total number of requests the can be processed
- ShuntRegs,2      $$ Threshold, in requests, at which shunting begins
- PmemTotal,4      $$ Total physical memory on system
- PmemUsed,4       $$ Used memory on system
- VmemTotal,4      $$ Total virtual memory on system
- VmemUsed,4       $$ Used virtual memory on system
- AreqPMethod,1    $$ Current method for processing additional requests
- ,8               $$ Reserved The elements of the packet body structure are, in detail:

PUsage: Current processor usage percentage (0% to 100%). Set to −1 if processor usage percentage is not available.

CurReqs: Approximate number of requests currently being processed.

TotalReqs: Total number of requests that can be processed at one time.

ShuntReqs: Maximum number of requests before shunting occurs. This is usually less than TotalReqsto allow some extra system resources for the purpose of shunting requests.

PmemTotal: Number of bytes of physical memory on server, or −1 if amount not known.

PnemUsed: Number of bytes of physical memory that have been used, or −1 if amount not known.

VmemTotal: Number of bytes of virtual memory available on server, −1 if not known.

VmemUsed: Number of bytes of virtual memory in use, or −1 if not known.

AreqPMethod: Method that will be used by the server deal with new incoming requests, based on the other statistics in this packet. This can have the numerical value 1, 2, or 3.1 indicates that new requests will be processed normally, 2 indicates that new requests will be shunted; 3 indicates that new requests will be refused.

USER AUTHENTICATION INFORMATION REQUEST (MCMP_UserIReq): This packet requests user authentication information on a particular user. This packet must be encrypted, and is sent only from a secondary server to a primary server. The receiving server must check that the sender is listed as a secondary server before responding to this request.

The expected response is either an MCMP_Status packet or an MCMP_UserIResp packet.

This packet uses a special type of resource identifier, which is defined as follows:

type:user[,uadbitem];length[,date,time]

Where:

| | |
|---|---|
| type | Identifies the resource type; is always "useradb" |
| user | The name of the user in question |
| uadbitem | Path to user authentication database item to retrieve. If omitted, a tree-file is resumed containing the entire user authentication data tree for the specified user. The root of the resumed tree-file is equivalent to \LocalUsers\username in the user database file. length Portion of item to be resumed. |

Examples:
useradb:JohnS.\Catharon\RAdmin\Rights;*:03/13/1995, 12:20:48
useradb:HugoC;*
useradb:JDouglas.\XYZWidSt\WDBP\GroupMembership;256;S/12/1996, 01:00:30

The User Authentication Database (UADB) is stored in a tree-file. User information is stored in \LocalUsers. Inside the \LocalUsers folder are folders for each user, named based on the user's ID. In each user's folder are folders for each vendor (i.e. "Catharon", "CTC", etc.), and inside the vendor folders are folders for each protocol defined by that vendor. The contents of a protocol folder are protocol-specific. The path specified in the resource ID is rooted at \LocalUsers\username.

Basic user authentication information is stored in \Catharon\MCMP\BaseAuthData. This is structured as follows:

UserAuthData,32
- UserID,10        $$ Userts name/ID
- UserPass,10      $$ User's password
- ExpTime,3        $$ Time, in seconds, before data
-                  $$ expires (10 to 864000).
- BinUID,4         $$ Binary User ID
- ,5               $$ Reserved If a secondary server sends a request in the form:
useradb:usez,2ame;* [;date,time]
the entire user authentication tree is retrieved for the specified user. The ability to read a specific item from the user authentication tree is provided for future use and expandability.

After retrieving user authentication data, that data can be cached for the period of time specified in the ExpTime element of the UserAuthData structure. The user authentication data may not be cached longer than the specified time.

The MCMP Header of the User Authentication Information Request is:

PacketType: MCMP_UserIReq (h0008)

PacketSize: 0

ResourceID's: One; specifying the user to retrieve information about, and what information to retrieve.

Shuntable: No (must be processed by primary server because the primary server is the only authoritative source of information on the user).

ResourceReq Yes

USER AUTHENTICATION INFORMATION RESPONSE (MCMP_UserIResp): The response to an MCMP_UserIReq packet, this packet contains the requested information in its data area. This data is either the raw data read from the requested data block in the user database, or (if uadbitem is omitted) is a tree file containing the entire user information tree for the specified user, with the root of the file being equivalent to \LocalUsers\username in the UADB.

The MCMP Header of the User Authentication Information Response is:
PacketType: MCMP_UserIResp (h0009)
PacketSize: Variable
ResourceID's: None
Shuntable: No
ResourceReq: No ECHO REQUEST (MCMP_EchoReq): This packet is used to time the connection to a particular MCMP host. When this packet is received by an MCMP host, a MCMIP_EchoResp packet is immediately sent back. The data area can contain any data, up to a maximum size of 2048 bytes. The return packet's data area will contain the same data.
The MCMP Header of the Echo Request is:
PacketType: MCMP_EchoReq (hOOOa)
PacketSize: Any
ResourceID's: None
Shuntable: No
ResourceReq: No ECHO RESPONSE (MCMP_EchoResp): This packet is sent in response to an MCMP_EchoReq packet.
The MCMP Header of the Echo Response is:
PacketType: MCMP_EchoResp (hOOOb)
PacketSize: Same as original MCMP_EchoReq packet
ResourceID's: None
Shuntable: No
ResourceReq: No Some files in a directory may support additional access pennission information. For example, a tree file could contain information on access permission for individual units within the tree file.

CMXP Resource Identifiers

Resource Identifiers for CMXP packets are defined as follows:
type:patht,file[,unit]];length[;date,time]
Where:

| | |
|---|---|
| type | Identifies the resource type. This can be either "Data" to read data from the specified resource, or "Dir" to read a directory of contained resources. |
| path | Path to a directory...must be at least a backslash "\". If file and unit are not specified, the directory is considered the resource to be read; otherwise, the file or unit referenced is assumed to be located in the specified directory. If file and unit are not specified, then type must be "Dir". |
| file | A filename. If unit is not specified, the file is considered the resource; otherwise, the unit is assumed to be located in the specified file. A file resource can be accessed with both the "Dir" and "Data" resource types; "Dir" will reference the list of contained units, while "Data" will reference the actual data contained in the file. |
| unit | A unit name. If specified, the unit is considered to be the resource. This can be accessed with both the "Dir" and "Data" resource types; "Dir" will reference the list of sub-units, while "Data" will access the data contained in the unit. |
| length | The portion of the resource to read. If typeis "Data", this value is in bytes. If type is "Dir", this value is in directory entries. |
| date/time | Can only be specified in a request packet. Causes the recipient process to ignore the request unless the resource has been modified since the date/time specified This can be used in conjunction with the CMXP_ReadReq packet to request that a resource be sent only if it has changed since it was cached on the client. |

CMXP Packet Types

The following is a list of the packet types used by the CMXP protocol at this time. The functionality of the CMXP protocol can be expanded in future by adding to this list of packet types.

CMXP_ReadRsrcReq=h0002
CMXP_ReadRsrcResp=h0003
CMXP_WriteRsrc=h0004
CMXP_CreateRsrc=h0005
CMXP_DestroyRsrc=h0006
CMXP_RenameRsrc=h0007
CMXP_CopyRsrc=h0008
CMXP_MoveRsrc=h0009
CMXP_AltSListReq=h000a
CMXP_AltSListResp=h000b These packet types are described in detail below.

READ RESOURCE REQUEST (CmxP_ReadRsrcReq): This packet is a request to read one or more resources. It is sent from a client to a server to download a resource, sent from a client to a client to request a code module transfer for a plug-in module, or sent from a server to a server to request transfer of the appropriate resource to service a client request. A CMXP_ReadRsrcReq packet can request either resource content, resource information, or both. Because the definition of a resource includes file directory and code module directories, this packet can also be used to request a list of files in a directory or code modules in a file.

This packet is responded to with a series of packets (one for each request resource). These packets are either CMXP_ReadRsrcResp (if the resource was successfully read) or MCMP_Status (if there was an error reading the resource).

The MCMP Header of a read resource request packet is:
PacketType: CMXP_ReadRsrcReq (honey)
PacketSize: 32
ResourceID's: One or more, Identifying resources to read
Shuntable: Yes
ResourceReq: Yes
The Packet Body of a read resource request packet is:

```
ReadRsrcReqHeader,32
• RHFlags,2           $$ Flags
•  ,30                $$ Reserved
 * Flags:
   IncludeInfo  = bit(RHFlags,1)   $$ Include resource information
   IncludeData  = bit(RHFlags,2)   $$ Include resource content
   IdlePreCache = bit(RHFlags,3)   $$ Request is the result of an
                                      idle-time pre-caching
                                      operation.
```

The elements of the packet body are, in detail:
IncludeInfo: If set, this flag causes infonnation about the resource to be returned.
IncludeData: If set, this flag causes the resource content to be returned.
IdlePreCache: If set, indicates the the request is the result of an idle-time pre-caching operation initiated by the client without user involvement. A CMXP server processes packets with this flag clear before packets with this flag set are processed. When the load on a CMXP server becomes too high for it to deal with all requests, and it can not shunt requests, requests with this flag set will be dropped before requests with this flag clear.
IncludeInfo and IncludeData can both be set in the same request In this case, the response is the resource information followed by the resource content. This is the most common request type. At least one of these flags must be set in each request packet READ RESOURCE RESPONSE (CMXP_ReadRsrcResp): Sent in response to a CMXP_

ReadRsrcReq packet, this packet contains the requested information. Note that this packet is never sent in response to a CMXP_ReadRsrcReq if an error condition exists, instead, a MCMP_Status packet is sent.

Depending on the state of the IncludeInfo and IncludeData flags in the CMXP_ReadRsrcReq packet, the packet body may contain resource information and/or resource content. The resource information, if it is present, always comes first in the packet body, followed by the resource content, if present. The size of the resource information can be determined by reading the ResourceInfoSize element of the version of a program can be sucessfully merged with code modules from an old version of the program.

RsMaxSubs: The maximum number of subsidiaries that the resource can contain.

RaSizeAInfo: The size, in bytes (1 to 8), of the associated information for the resource (RsAInfo).

RsSizeSubName: The maximum length, in characters, of the name of a subsidiary of the resource.

RsHeight, RsWidth. The height and width of the bounding rectangle of the resource at its default scaling, if applicable. This is used for object-based drawings, images, etc.

RsPTime: The playing time, in seconds at the default playing speed, of the resource (if applicable); used for video clips, way files, midi files, animations, etc.

WRITE RESOURCE (CMXP_WriterSrc): This packet writes data to the specified resource. This requires sending a packet to the primary server that cannot be shunted, so this can increase server load. For form submissions and other uni-directional submissions, the UDSCP protocol is recommended over the write functions of the CMXP protocol.

A CMXP_WriteRsrc request may fail due to, among other things, the fact that the user is not allowed to write to the specified resource. This situation may be remediable by repeating the request with a user-id and password specified (in this case, the request must be encased in a MCMP_Encrypt packet).

There are two variations of the status code returned when access is denied due to failed user authentication. One variation indicates that the client should prompt for a user name and password. This is a "hint" to the client that the resource may be accessible via a user name and password. It is not conclusive. In other words, the variation on the Access Denied code does NOT indicate whether access is really available to anyone, i just indicates whether the client should ask. There may, for example, be a resource designed to be accessed under program control, and not under user control, which requires user authentication of an "automation user", and which denies access the rest of the time without even prompting for a user-id/password.

The packet body contains the data to be written to the resource.

The MCMP Headerof the write resource packet is:

PacketType: CMXP_WriteRsrc (h0004)

PacketSize: Variable

ResourceID's: One, the ID of the resource to-wnte to

Shuntable: No

ResourceReq: Yes

CREATE RESOURCE (CMXP_CreateRsrc): This packet creates a subsidiary in the specified resource. This includes files, directories, and units. The same rules regarding user authentication apply to this packet as apply to the CMXP_WriteRsrc packet.

The MCMP Header of the create resource packet is:

PacketType: CMXP_CreateRsrc (h0005)

PacketSize: Variable

ResourceID's: One, the ID of the resource In which to create the new subsidiary.

Shuntable: No

ResourceReq Yes

The Packet Body of the create resource packet is:

```
NewRsrc,300
•   RsSize,4            $$ Size, in bytes, of resource
•   RsAInfo,8           $$ Associated information (if applicable)
•   RsMaxSubs,2         $$ Maximum number of subsidiaries
•   RsSizeAInfo,1       $$ Size, in bytes, of associated information
•   RsSizeSubName,2     $$ Maximum length of a subsidiary's name
•   RsName,256          $$ Resource Name
•   RsName2,8           $$ Secondary Resource Name
•   RsType,8            $$ Resource type
•   ,11                 $$ Reserved
```

The elements of the packet body are, in detail:

ReSise The size, in bytes, of the new resource. If creating a TenCORE nameset or dataset, this must be a multiple of 256 bytes, and is equivalent to the records argumen of the -createn- command multiplied by 256 (to convert from records to bytes). When creating new directories, this is ignored.

R-AInfo: Associated information for the resource, if applicable (see CMXP_CreateRsrc above)

RsMaxSubs: The number of subsidiaries allowed in the resource, if applicable. This is required for TenCORE namesets, and is equivalent to the names argument of the -createn- command. In most cases, when not dealing with TenCORE namesets, this is ignored.

R-SizeAInfo: The size of the resources associated information. For namesets, this is equivalent to the infolength argument of the -createn- command.

RsSizeSubName: Maximum length of a subsidiary's name. For TenCORE namesets, this is equivalent to the namelength argument of the -createn- command. In most cases when-not dealing with TenCORE namesets, this is ignored.

ReName: The name of the resource to create. The length of this name and the rules for allowed characters depend on the type of resource being created.

RaName2: This is a secondary name for the resource. It is not currently used, but is provided for future use. This may be used, for example, to specify a short file name alias to go with a long filename in Windows 95/NT.

RaType: This specifies the type of resource being created. Note that not all resource types are necessarily valid for all possible resources in which they could be created (i.e., one cannot create a file inside of a unit). Where only one resource type is possible for a particular containing resource, the value 'default' is used (for example, the only type of resource that can be created inside a TenCORE nameset is a block). This value is an 8-byte text literal.

The following resource types are currently defined for the CMXP protocol:

| | |
|---|---|
| course | A course file (TenCORE nameset with .CRS extension) |
| group | A group file (TenCORE nameset with .GRP extension) |
| nameset | A gentral purpose nameset file (TenCORE nameset with .NAM extension) |
| roster | A roster file (TenCORE nameset with .RTR extension) |
| source | A source file (TenCORE nameset with .SRC extension) |
| studata | A student data file (TenCORE nameset with .SDF extension) |
| tpr | A Producer file (TenCORE nameset with .TPR extension) |

-continued

| | |
|---|---|
| binary | A binary file (TenCORE nameset with .BIN extension) |
| file | An operating system file |
| dir | An operating system folder or directory |
| dataset | A TenCORE dataset |
| tree | Catharon tree-file |
| default | The default type for the container |
| block | A data block (in a nameset or tree-file) |
| folder | A folder (in a time-file) |

DESTROY RESOURCE (CMXP_DestroyRsrc): This packet destroys the specified resource. The same rules regarding user authentication apply to this packet as apply to the CMXP_WriteRsrc packet. The MCMP Header of this packet is:

PacketType: CMXP_DestroyRsrc (h0006)

PacketSize: 0

ResourceID's: One, the ID of the resource to destroy

Shuntable: No

ResourceReq: Yes

RENAME RESOURCE (CMXP_RenameRsrc): This packet renames the specified resource. The same rules regarding user authentication apply to this packet as apply to the CMXP_WriteRsrc packet. The packet body contains the new name for the resource. The MCMP Header of this packet is:

PacketType: CMXP_RenameRsrc (h0007)

PacketSize: 272

ResourceID's: One; the ID of the resource to rename

Shuntable: No

ResourceReq: Yes

The Packet Body of the rename resource packet is:

| | |
|---|---|
| RenameRsrc,272 | |
| • ResourceName,256 | $$ New name for resource |
| • ResourceSecondaryName,8 | $$ Secondary name for resource (if applicable) |
| • ,9 | $$ Reserved |

COPY RESOURCE (CMXP_CopyRsrc): This packet copies the specified resource. The same rules regarding user authentication apply to this packet as apply to the CMXP_WriteRsrc packet The MCMP Header of the copy resource packet is:

PacketType: CMXP CopyRsrc (h0008)

PacketSize: 0

ResourceID's: Two; the first is the location of the resource to copy, the second the location to create the new copy of the resource.

Shuntable: No

ResourceReq: Yes

MOVE RESOURCE (CMXP_MoveRsrc): This packet moves the specified resource. The same rules regarding user authentication apply to this packet as apply to the CMXP_WriteRsrc packet. The MCMP Header of the move resource packet is:

PacketType: CMXP_MoveRsrc (h0009)

PacketStze: 0

ResourceID's: Two; the first ts the old location of the resource, the second the new location for the resource.

Shuntabte: No

ResourceReq: Yes

ALTERNATE SERVER LIST REQUEST (CMXP_AltSListReq): This packet requests a list of secondary servers available for the specified resource. The server should respond with an CMXP_AltSListResp packet, except in the case of an error, in which case an MCMP_Status packet should be returned. The MCMP Header of this packet is:

PacketType: CMXP_AltSUstReq (h000a)

PacketSize: 0

ResourceID's: One—The resource for which to list secondary servers.

Shuntable: Yes

ResourceReq: Yes

ALTERNATE SERVER LIST RESPONSE (CMXP_AltSListResp): This packet is sent in response to an CMXP_AltSListReq packet and contains the list of alternate servers. The MCMP Header is:

PacketType: CMXP_AltSUstResp (h000b)

PacketSize: Variable

ResourceID's: None

Shuntable: No

ResourceReq: No

The Packet Bodyof the CMXP_AltSListResp packet is:

| | |
|---|---|
| AltSList(nn),16 | |
| • IP,4 | $$ IP Address of server |
| • Port,2 | $$ Port on server to access |
| • Load,1 | $$ Last known load on server |
| • Ping,4 | $$ Last known ping-time to server |
| • ,4 | $$ Reserved |

The following is a list of the packet types used by the UDSCP protocol at this time. The functionality of the UDSCP protocol can be expanded in future by adding to this list of packet types.

| | |
|---|---|
| UDSCP_Submission | = h0002 |
| UDSCP_QueueStatusReq | = h0003 |
| UDSCP_QueueStatusResp | = h0004 |

These packet types are described in detail below.

DATA SUBMISSION (UDSCP_Submission): This is the primary packet type for the UDSCP protocol. It is generated by a client, and then forwarded from server to server until it reaches the collection point. The packet body consists of a UDSCP Header followed by the content of the submission. The MCMP Header of the data submission packet is:

PacketType: UDSCP_Submission (h0002)

PacketSize, 32+Size of data being submitted

ResourceID's: None

Shuntable: Yes

ResourceReq: No

The UDSCP Header is:

| | |
|---|---|
| UDSCPSubmitHeader,32 | |
| • HeaderSize,2 | $$ Size of UDSCPSubmitHeader |
| • DataSize,4 | $$ Size of data being submitted |
| • Cmethod,1 | $$ Collection method (1=Central, 2=Secondary) |
| • CpointIP,4 | $$ Collection point IP Address |
| • Priority, 1 | $$ Priority (0=low, 1=normal, 2=urgent) |

-continued

| | |
|---|---|
| • Lesson,8 | $$ TenCORE Lesson/Unit to process submission |
| • Unit,8 | |
| • Flags, 2 | $$ Flags |
| • ,2 | |
| * Flags: | |
| Forwarded = bit(Flags,1) | $$ Submission has been forwarded by a server |

The elements of the UDSCP header are described in detail below:

HeaderSize: The size, in bytes, of the UDSCPSubmitHeader structure. This value should be read to determine the size of the whole structure, this allowing the structure to be expanded in future without affecting existing code.

DataSize: The size, in bytes, of the content of the submission following the UDSCP Header.

Cmethod: The collection method to be used. This is an integer value. A setting of 1 causes data to be collected and processed at a centeral server, while a setting of 2 allows data to be processed on secondary servers.

CpointIP: The IP address of the collection point (centeral server) This is ignored if CMethod=2.

Priority: The priority of the submission. This is an integer value, and can be either 0 for low, 1 for normal, or 2 for high priority. UDSCP servers attempt to process high priority submissions immediately, while normal and low priority submissions are held in the UDSCP submission queue and processed when the server would othewise be idle. If a normal or low priority remains in the LTDSCP queue for longer than the user configurable time limit, the server will attempt to process it immediately regardless of load or, failing to do so, notify a responsible person. The time limits for low and normal priority submissions are configurable separately, and low priority submissions are usually configured for a longer timeout.

Lesson, Unit: The names of the TenCORE lesson and unit that will process the submission.

Forwarded: This flag is set if the submission has been forwarded by a UDSCP server, or clear if this is the first UDSCP server to deal with the submission (i.e., the submission came from a client).

QUEUE STATUS REQUEST (UDSCP_QueueStatusReq): This packet requests the status of the UDSCP queue. The expected response is either an MCMP_Status packet or a UDSCP QueueStatusResp packet.

The MCMP Headerof the queue status request packet is:

Packet Type: UDSCP—Queue Status Req (h0003)

PacketSize: 0

ResourceID's: None

Shuntable: No

ResourceReq: No

QUEUE STATUS RESPONSE (UDSCP:QueueStatusResp): This packet is the response to a UDSCP_QueueStatusReq packet. It contains infonnation about the UDSCP server's current UDSCP queue status. The MCMP Header is:

PacketType: UDSCPQueueStatusResp (h0004)

PacketSize: 0

ResourceID's: None

Shuntable: No

ResourceReq: No

The Packet Body of this status response packet is:

| | |
|---|---|
| QueueStatus,64 | |
| • Entries,4 | $$ Total number of entries in the queue |
| • LowEntAge,4 | $$ Age of the newest entry in the queue, in seconds |
| • HighEntAge,4 | $$ Age of the oldest entry in the queue |
| • AvgEntAge,4 | $$ Age of the average queue entry |
| • HighPriEnt,4 | $$ Number of high-priority entries in the queue |
| • LowPriEnt,4 | $$ Number of low-priority entries in the queue |
| • FwdEnt,4 | $$ Number of entries which have been forwarded |
| • ToFwdEnt,4 | $$ Number of entries which must be forwarded |
| • ,32 | $$ Reserved |

The Metered Delivery and Billing Protocol (MDBP) controls access to pay-for content, including delivering credit to pay for the content, and collecting royalty information after the content has been purchased.

MDBP Packet Types

The MDBP protocol works closely with the CMXP protocol. The CMXP protocol is used to deliver the content in encrypted form. The content is then decrypted when it is unlocked by the MDBP libraries on the client machine. The content is unlocked when it is paid for with credit on the local machine. Credit can be replenished through the MDBP protocol.

When credit is replenished on the local machine, the royalty information is reported to the credit server, which then handles the appropriate distribution of profits.

In a standard credit-purchasing transaction, three packets are exchanged:

An MDBP_CreditReq is sent from the client to the server

The server responds with an MDBP_CreditTransfer

The client sends an MDBP_PurchaseReport to the server

Before credit can be purchased by a user, that user must be registered with the credit server.

The following is a list of the packet types used by the MDMP protocol at this time. The functionality of the MDBP protocol can be expanded in future by adding to this list of packet types.

| | | |
|---|---|---|
| MDBP_CreditReq | = 2 | $$ Request for additional credit |
| MDBP_CreditTransfer | = 3 | $$ Response to MDBP_CreditReq |
| MDBP_RegisterUser | = 4 | $$ Register a user |
| MDBP_RegisterUserResp | = 5 | $$ Response to MDBP_RegisterUser |
| MDBP_WriteUserData | = 6 | $$ Write user data |
| MDBP_ReadUserData | = 7 | $$ Read user data |
| MDBP_ReadUserDataResp | = 8 | $$ Response to MDBP_ReadUserData |
| MDBP_PurchaseReport | = 9 | $$ Puchasing/Royalty Report |

The MDBP packet types are described in detail below.

REQUEST FOR ADDITIONAL CREDIT (MDBP_CreditReq): This packet requests additional credit from the server. The packet body contains the user's ID code, which is used to access the user's data in the user database, as well as the amount of credit to be purchased. The user's data includes a billing method to use to pay for the credit. This packet must be encrypted. The expected response is either an MDBP_CreditResp or an MCMP_Status packet.

The MCMP Header of a credit request packet is:

PacketType: MDBP_CreditReq (h0002)

PacketSize: 22

ResourceID's: None
Shuntable: No
ResourceReq: No
The Packet Bodyof a credit request packet is:

| UserID,8 | $$ User ID; B-byte integer value |
|---|---|
| Password,10 | $$ User' 8 pasaword |
| Credit, 4,r | $$ How much credit to purchase (in dollars) |

CREDIT TRANSFER (MDBP_CreditTransfer): This packet is the response to an MDBP_CreditReq. It actually performs the transfer of credit from the server to the client. The packet body contains information on the credit transfer. This packet must be encrypted.
The MCMP Header of a credit transfer packet is:
PacketType: MDBP_CreditReq thOo03)
PacketSize: 20
ResourceID's. None
Shuntable: No
ResourceReq. No
The Packet Body of a credit transfer packet is:

| UserID,8 | $$ The ID of the user who should be receiving this credit |
|---|---|
| Credit, 4,r | $$ The amount of credit purchased (in dollars) |
| Tserial,8 | $$ A serial number used to track the transaction |

USER REGISTRATION (MDBP_RegisterUser): This packet is used for the initial registration of a user with a credit server. It causes a new entry to be created in the user registration database. The packet body contains information about the user which will be written into the standard fields in the user's new record. The information can be read and modified at a later time through use of the MDBP_WriteUserData and MDBP_ReadUserData packets. This packet must be encrypted. The expected response to this packet is an MDBP_RegisterUserResp or MCMP_Status packet.
The MCMP Header of a user registration packet is:
PacketType: MDBP_RegisterUser (hO004)
Packet Size:
ResourceID's: None
Shuntable: No
ResourceReq: No
The Packet Body of a user registration packet is:

| RegisterUser, 512 | |
|---|---|
| • Name,54 | $$ Full name |
| • Company, 54 | $$ Company name |
| • Address1,45 | $$ Line 1 of the street address |
| • Address2,45 | $$ Line 2 of the street address |
| • City, 20 | $$ City name |
| • State,2 | $$ 2-letter state abbreviation |
| • Pcode,16 | $$ Postal code (zip code) |
| • Country,30 | $$ Country name |
| • Telephone,16 | $$ Telephone number |
| • AX,16 | $$ FAX number |
| • Email,100 | $$ E-mail address |
| • CardNo,20 | $$ Credit card number ('nnnn nnnn nnnn nnnn') |
| • CardExpDate,5 | $$ Credit card expiration date ('mm/yy' or 'mm-yy') |
| • Password, 10 | $$ Password |
| • ,79 | $$ Reserved |

USER REGISTRATION RESPONSE (MDBP_RegisterUserResp): This packet is the response to an MDBP_RegisterUser packet. It acknowledges the fact that the user has been registered, and returns the user's assigned ID code. The MCMP Header of this packet is:
PacketType: MDBP_RegisterUserResp (h0005)
PacketSize 8
ResourceID's: None
Shuntable: No
ResourceReq: No
The Packet Body is:

| userID,8 | $$ user ID; 8-byte integer value |
|---|---|

WRITE USER DATA (MDBP WriteUserData): This packet writes data to the user database. This uses a resource identifier to identify the element in the user registration database to write to. The packet body is the data to be written. This packet uses a special type of resource identifier, which is defined as follows:
type userid[,dbitem];length[;date,time]
Where:

| type | Identifies the resource type; is always "mdbpuser" |
|---|---|
| userid | The ID of the user in question (in hexadecimal) |
| dbitem | Path to user database item to retrieve. If omitted, a tree-file is resumed containing the entire user data tree for the specified user. |
| length | Portion of item to be returned. |

Examples:
mdbpuser:00000000000003e4,
\Catharon\RAdmin\Rights; * ;03/13/1995,12:20:48
mdbpuser:0000000000000014;*
mdbpuser:0000000000002aff\XYZWidgt\WDBP\Group Membership;256; 5/12/1996,01:00:30
The user database contains a system folder and a publishers folder. The system folder contains the data specified in the initial User Registration packet, and can be expanded to contain additional data. The publishers folder contains a subfolder for each publisher, named based on the publisher's name, and the publisher's folder contain, in turn, publication folders, named based on the publication. The organization of data within a publication folder is specific to the publication.
The MCMP Header of the write user data packet is:
PacketType: MDBP_WriteUserData (h0006)
PacketSize: Variable
ResourceID's: 1 (The resource to write to)
Shuntable: No
ResourceReq: Yes
READ USER DATA (MDBP_ReadUserData): This packet reads data from the user database. This uses a resource identifier to identify the element in the user registration database to read from. The format of the resource identifier is the same as that for the resource identifier used in the MDBP_WriteUserData packet.
Multiple resource identifiers can be specified, causing each of the specified elements in the user registration database to be returned.
This packet is responded to with a series of packets (one for each request resource). These packets are either MDBP_ReadUserDataResp (if the resource was successfully read) or MCMP_Status (if there was an error reading the resource).

The MCMP Header of the read user data packet is:

PacketType: MDBP_ReadUserData (h0007)

PacketSize: 0

ResourceID's: 1 or more

Shuntable: No

ResourceReq: Yes

READ USER DATA RESPONSE (MDBP_ReadUserDataResp): This packet is the response to an MDBP_ReadUserData packet. It contains the content of the requested element of the user registration database. The body is the data that was read. The MCMP Header is:

PacketType: MDBP_ReadUserDataResp (h0008)

PacketSize: Variable

ResourceID's: None

Shuntable: No

ResourceReq: No

PURCHASING/ROYALTY REPORT (MDBP_PurchaseReport): One or more of these packets is sent from the client to the server after the client has received a response to an MDBP_CreditReq packet, if the client has purchasing or royalty information to report.

The data area contains a generic royalty report header followed by a publication-specific royalty-report data area. In some cases, the royalty report header is sufficient to report the needed royalty information, so the data area is optional and does not have to be included. Any data following the royalty report header is assumed to be publication-specific data.

The MCMP Header of the royalty report packet is:

PacketType: MDBP_PurchaseReport (h0009)

PacketSize: Variable

ResourceID's: None

Shuntable: No

ResourceReq: No

The Royalty Report Header is

```
RoyaltyReport,128
•   HeaderSize,2      $$ Size, in bytes, of royalty report header
•   Publisher,45      $$ Name of publisher
•   Publication,45    $$ Name of publication
•   VolIssue,20       $$ Volume and/or issue number of publication,
                         if applicable
•   Version, 4        $$ Version of publication, if applicable
•   UserID,8          $$ ID of user who was reading this publication
•   CreditSpent,4,r   $$ Credit spent, in dollars, on this publication
```

The distributed processing protocol (DPP) is used to reduce the processing load created by a particular task by distributing it over multiple computers. The protocol is used to search for and locate idle systems and (in conjunction with the CMXP protocol) transmit the appropriate code modules to those systems so that they can assist with the task. When the task is complete, the protocol is used to gather the results from all of the "assisting" machines and collect them and compile them on the machine that initiated the task.

The functionality provided by this protocol should not be confused with the load distribution functionality provided by the main MCMP protocol. The MCMP protocol's load distribution works by distributing client requests over various machines in various locations. The DPP protocol uses several machines working together to accomplish a single task, and is more suited to a local area network, and to processor intensive tasks, such as rendering of 3D images.

Each system involved in the distributed processing process must be configured with a list of those systems which can assist it with a task, as well as those systems which it can assist with tasks. This list can include entries with wildcards, to specify an entire network, such as 192.168.123.* for the entire 192.168.123. C-level network.

The purpose for this system configuration is to control who can utilize a system's processor. For example, a company might want to limit shared processing to systems within it's own internal network, for security reasons.

Systems can also be assigned priorities for access to a computer's processor. For example, a company may want all of it's computer to grant distributed processing requests from other computers on it's network in preference to other requests. However, if that company is affiliated with some other company, it might want to grant that other company access to it's computers for distributed processing purposes, provided that none of it's own computers require processing assistance.

The following is a list of the packet types used by the DPP protocol at this time. The functionality of the DPP protocol can be expanded in future by adding to this list of packet types.

```
DPP_AssistReq       = 2   $$ Request for processing assistance
DPP_AssistResp      = 3   $$ Response to DPP_AssistReq
DPP_EndTaskReq      = 4   $$ Request to terminate processing
                             assistance
DPP_EndTaskNotify   = 5   $$ Notification of termination of assistance
DPP_UpdateReq       = 6   $$ Request for update of task status
DPP_UpdateResp      = 7   $$ Response to UpdateReq
```

These packet types are described in detail below.

REQUEST FOR PROCESSING ASSISTANCE (DPP_AssistReq): This packet is sent by a system requiring processing assistance to another system to request processing assistance from that system. This packet contains all the information needed to initiate a distributed process, including the resource identifier for the initial code module to handle the process, so that the code module can be fetched via CMXP if necessary. The response to this packet is either a DPP_AssistResp packet (if the recipient system can assist) or an MCMP Status packet (if the recipient system can not assist).

Possible reasons for an MCMP_Status packet can include:

Access Denied

The system to which the packet was sent was not allowed to assist with the request. This is a result of the system generating the request not being listed in the appropriate configuration file on the receiving system.

Insufficient Free System Resources

There are not enough free system resources on the system receiving the request for that system to assist with the distributed process. In some cases, a system may be to busy to even return this status value.

Request Superceded

This indicates that the system had enough free processor time, but chose to assist a different system in preference to the one sending the request. The reason that Request Superceded is a separate status code from Access Denied is that "Access Denied" may generate an error if encountered by a program searching for systems to assist it (to notify the user of a possible mis-configuration) while Request Superceded would simply indicate that the system is not available to assist with the task at that given time, and would therefore not generate an error.

Task-Specific Error

This is resumed by the code module that would handle the task. The MCMP_Status packet will contain an additional task-specific error code indicating the specific error which occurred. Task specific errors might include an error indicating that the system is not capable of assisting with the task due to a hardware limitation.

The packet body of the assistance request packet consists of a 32-byte header, followed by a task-specific data area, which contains any infommation that the code module referenced in the Resource ID requires to assist in the processing of the task. This could for example, include an image (if an image must be processed) or a description of a 3D environment to be rendered.

The task-specific data area also contains information indicating which portion of the task the system is to work on (for example, starting and ending lines in the image) as well as the frequency with which the assisting system is to update the initiating system with processed data.

The MCMP Header of the assistance request packet is:

PacketType: DPP_AssistReq (hO002)

PacketSize: 32+Size of task-specific data

ResourceID's: One (The ID of the code module to handle the distributed process)

Shuntable: No

ResourceReq. No

The DPP_AssistReq Header is:

| DPP_AssistReq Hdr,32 | |
|---|---|
| • ProcessID,2 | $$ Process Identifier |
| • ,30 | $$ Reserved |

The elements of the DPP_AssistReq Header are described in detail below:

Process-ID: This is a 2-byte integer value that identifies the process. It is assigned by the system initiating the process, and is a unique identifier when combined with that system's IP address.

DPP_AssistResp: This packet is sent in response to a DPP_AssistReq to acknowledge that the system has begun assisting with the task Because this is simply an acknowledgement message, there are no Resource ID's and there is no packet body. The MCMP Header is:

PacketType: DPP_AssistResp (h0003)

PacketSize: 0

ResourceID's: None

Shuntable: No

ResourceReq: No

DPP_EndTaskReq: This packet is sent to an assisting system to instruct that system to cease assisting with a task prematurely (before the task is complete). This would be used, for example, if the user on the initiating system were to click a "cancel" button and abort the task. The MCMP Header is:

PacketType: DPP_EndTaskReq (h0004)

PacketSize: 16

ResourceID's: One (The ID of the code module to handle the distributed process)

Shuntable: No

ResourceReq: No

The Packet Body of the end task request header is:

| DPP_EndTaskReq,16 | |
|---|---|
| • ProcessTD,2 | $$ ID of process to terminate |
| • ,14 | $$ Reserved |

DPP_EndTaskNotify: This packet is sent by an assisting system to notify the initiating system that it will no longer be assisting with a task. This is used both by itself, and as an acknowledgement to a DPP_EndTaskReq packet. This would be sent if, for example, the assisting system was to become too busy to continue to assist with the task, or if the assisting system was to be instructed by the initiating system to abort the task. This packet can also be used to notify an initiating system of a completed task. The MCMP Header is:

PacketType: DPP_EndTaskNotify (h0005)

PacketSize: 16

ResourceID's: One (The ID of the code module to handle the distributed process)

Shuntable: No

ResourceReq: No

The Packet Body of the end task notification packet is:

| DPP_EndTaskResp,16 | |
|---|---|
| • ProcessID,2 | $$ ID of process to terminate |
| • Tstatus,1 | $$ Task status; 1=Complete, O=Incomplete (Aborted) |
| • ,13 | $$ Reserved |

DPP_UpDateReq: This packet is sent by the initiating system to instruct the assisting system to transmit processed data (a DDP_UpdateResp packet). For example, if an image was being processed, this would cause the assisting system to respond with the data making up the portion of the image that it has processed so far. The use of this packet type depends on the task. Some tasks will not use this packet at all, and will instead automatically generate DPP_UpdateResp packets at various intervals, and when the task is complete. The MCMP Header is:

PacketType: DPP_UpdateReq (h0006)

PacketSize: 16

ResourceID's: One (The ID of the code module to handle the distributed process)

Shuntable. No

ResourceReq No

The Packet Body of the update request packet is:

| DPP_EndTaskResp,16 | |
|---|---|
| ProcessID,2 | $$ ID of process for which to return processed data |
| • ,14 | $$ Reserved |

DPP_UpDateResp: This packet is sent from an assisting system to an initiating system. It contains the data that has been processed so far as part of the task in question. For example, if an image is being processed, this packet would contain the portion of the image that had already been processed. Note that the data sent in these packets in not cumulative. That is, if two packets are sent in succession, the second contains only data not included in the first.

These packets are often sent in response to DPP_UpdateReq packets, although they can also be sent automatically by the program handling the task assistance, both during the task and upon task completion.

The packet body consists of a header, followed by task-specific data. All data not part of the header is assumed to be task-specific data.

The MCMP Header of the update response packet is:

PacketType: DPP_UpdateResp (h0007)

PacketSize: 16+Size of task-specific data

ResourceID's: One (The ID of the code module to handle the distributed process)

Shuntable: No

ResourceReq: No

DPP_UpdateResp Header is:

DPP_UpdateResp,16
- HeaderSize,2      $$ Size, in bytes, of DPP_UpdateResp header
- ProcessID,2       $$ ID of process for which to return processed data
- ,12               $$ Reserved The term "code module" is used herein to denote a self-standing portion of an applications program dedicated to the performance of a specific operation of the applications program. For example, in a painting program, one code module may control the drawing of a line, while another code module implements the application of color and yet another code module is used for generating a geometrical figure such as a circle. These code modules are independent in that at least some of them are not required for executing any particular operation. Sometimes two or more modules are required to interact to produce a particular result. However, in no case are all modules required.

The term "machine-executable" as used herein refers to code modules which are program modules, capable of controlling computer operations and changing the state of the arithmetic logic circuits of a general purpose digital computer, thereby changing the functionality of the general purpose digital computer. Thus, "machine-executable code modules" do not include data files and other passive electronically encoded information.

The term "applications program" as used herein refers to any executable collection of computer code other than operating systems and other underlying programming for controlling basic machine functions. Thus, the Modularized Code Master Protocol, including its subprotocols, is an applications program which is itself modularized and transmittable in code modules over a network. For example, at least some subprotocols will not exist on some secondary servers. Should such a subprotocol be required for a secondary server to compete a task or process a user's request then that required subprotocol may be transmitted over the network from the primary server to the secondary server.

Subprotocols are handled by including a subprotocol identifier in the MCMP Header attached to each MCMP packet. On an MCMP server, the circuits for handling the subprotocols may be plug-in modules which are handled in real-time by the CMXP protocol. When an incoming packet is received, the appropriate subprotocol handler is called. The subprotocol handler can then process the packet in whatever way is required. A protocol handler becomes involved in the load distribution process because the MCMP server has no way of knowing what format the resources are in, how to transfer them between servers, or what the caching rules are. The subprotocol handler must deal with accessing, transfer, and caching of the protocol-specific resources. The subprotocol handlers are called periodically during the MCMP server's main processing loop, allowing it to perform various maintenance tasks. Alternatively, the subprotocol handler could be called from a loop running in a separate thread.

The handler for a specific subprotocol may request that the MCMP server flag a socket as being in a Proprietary Dialog Mode (PDM). On a PDM socket, all incoming data is passed directly to the subprotocol handler without being processed by the MCMP server. When a socket is returned to normal operation from the PDM operation, the subprotocol handler must pass any "extra" unprocessed data to the MCMP server, since it may have read a portion of one or more MCMP packets.

The term "primary server" or "source server" is used herein to denote the authoritative source for the resources relating to a particular application. For example, the primary server for the TenCORE Net Demo would be the server where the latest version of the demo was always posted.

The term "secondary server" as used herein denotes a server that receives service-handoffs from a primary server. A secondary server usually mirrors the content of the primary server for which it is secondary. For example, a secondary server for the TenCORE Net Demo would be a server that could take over servicing clients if the primary server became too busy. A secondary server does not necessarily contain mirrors of the resources for which it is secondary server, inasmuch as the secondary server can request these resources from the primary server as needed.

A single machine is can be both a primary server and a secondary server. For example, a machine could be primary server for the TenCORE Net Demo, and secondary server for the Country Closet Clothing Catalog.

A single machine can function as primary server for multiple applications, and can function as secondary server for multiple applications.

The word "resource" is used herein to denote any block of data that can be used by a server or client. A resource can be a file, a code module, a portion of a file, a code module, a portion of a code module. a file directory, a code module directory, or any related piece of information, including the CMXP Prohibited List. The term "resource" is also used to refer to hardware and system resources, such as processor time and memory.

The term "tree-file" refers to a Catharon Tree-Structure Nameset File. A tree-file contains a series of named sets of records, which are grouped and nested into a tree-like structure (similar to an operating system's file system). In tree files, names beginning with a percent sign "%" are reserved for internal use. Any other names may be used by whatever application is maintaining the tree-file. Currently, only one percent-sign name has been assigned. It is "\%System" and it contains general information about the file, including (optionally) the name of the application that created the file, the user under who's network account the file was last edited the date and time the file was last edited, the location of various resources in the file, the location of the default folder (if none specified), and the file's associated information.

As related hereinabove, TenCORE is an interpreted language which utilizes pseudocode. Interpreter programs suitable for use with the TenCORE programming language as modified in accordance with the above descriptions are in common use today.

A description of the TenCORE programming language is set forth a microfiche Appendix in the file for this application. The basic characteristics of the language are discussed first, then the treatment of variables. Finally, an exposition is made of all the important commands used in the language. From this information, as well as the foregoing description, one of ordinary skill in the art can generate a modular programming language suitable for use in the invention.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for optimally controlling storage and transfer of computer programs between computers on a network to facilitate interactive program usage, comprising:

storing an applications program in a nonvolatile memory of a first computer, said applications program being stored as a plurality of interacting individual and independent machine-executable code modules;

in response to a request from a second computer transmitted over a network link, retrieving a selected one of said machine-executable code modules and only said selected one of said machine-executable code modules from said memory; and transmitting said selected one of said machine-executable code modules over said network link to said second computer.

2. The method defined in claim 1 wherein said first computer is a server computer on a network, said second computer being a secondary server on said network, further comprising, in response to a user request directed to said first computer, forwarding said user request from said first computer to said second computer to initiate processing of said user request by said second computer, said selected one of said machine-executable code modules being required by said second computer to process said user request.

3. The method defined in claim 2, further comprising:

storing, in a memory of said first computer, a list of secondary servers on said network, said list including response times for the respective secondary servers;

periodically updating said response times, said updating including (a) sending echo packets from said first computer to said secondary servers and (b) measuring, at said first computer delays between the sending of said echo packets and a receiving of responses to said echo packets from the respective secondary servers; and selecting said second computer from among said secondary servers as the secondary server having the shortest response time.

4. The method defined in claim 1, further comprising:

storing a list of user authentification codes in said memory;

upon receiving said request from said second computer, comparing a user authentification code in said request with said list of user authentification codes in said memory;

proceeding with the retrieving and transmitting of said selected one of said machine-executable code modules only if the user authentification code in said request matches a user authentification code in said list.

5. The method defined in claim 4 wherein said request from said second computer is contained in an encryption packet, further comprising decrypting said encryption packet prior to the comparing of said user authentification code in said request with said list of user authentification codes in said memory.

6. The method defined in claim 1 wherein said request from said second computer is a second request directed to said first computer from said second computer, further comprising:

receiving a first request directed to said first computer from said second computer via said network link, said first request asking for transmission of a first version of a particular code module included in said machine-executable code modules;

transmitting, from said first computer to said second computer via said network link, a signal indicating that a more recent version of said particular code module is available, said selected one of said machine-executable code modules being said more recent version of said particular code module.

7. The method defined in claim 1 wherein said machine-executable code modules are written in a user-friendly programming code, further comprising translating said selected one of said code module at said second computer from said programming code into machine code directly utilizable by said second computer.

8. A method for optimally controlling storage and transfer of computer programs between computers on a network to facilitate interactive program usage, comprising:

storing a portion of an applications program in a first computer, said applications program comprising a plurality of interacting individual and independent machine-executable code modules, only some of said machine-executable code modules being stored in said first computer;

executing at least one of said machine-executable code modules on said first computer;

transmitting, to a second computer via a network link, a request for a further machine-executable code module of said applications program;

receiving said further machine-executable code module at said first computer from said second computer over said network link; and executing said further machine-executable code module on said first computer.

9. The method defined in claim 8, further comprising:

sending a request from the first computer to a further computer for a list of servers on said network;

after transmission of said list of servers from said further computer to said first computer, determining response times for said servers by (a) sending echo packets from said first computer to said servers and (b) measuring, at said first computer, delays between the sending of said echo packets and a receiving of responses to said echo packets from the respective servers; and selecting said second computer from among said servers as the server having the shortest response time, the transmitting of said request for said further machine-executable code module being executed after the selecting of said second computer.

10. The method defined in claim 8 wherein said request from said first computer is a second request directed to said second computer from said first computer, further comprising transmitting a first request from said first computer to said second computer via said network, said first request being for a first version of a particular machine-executable code module of said applications program, said second request being transmitted in response to a signal from said second computer indicating that a more recent version of said particular machine-executable code module is available, said second request being for said more recent version of said particular machine-executable code module.

11. The method defined in claim 8 wherein said second computer stores at least some of said machine-executable code modules of said applications program, said second computer executing at least one of said machine-executable code modules in response to the execution of a machine-executable code module by said first computer, whereby said first computer and said second computer engage in interactive processing via said network.

12. The method defined in claim 8 wherein said machine-executable code modules are written in a user-friendly programming code, further comprising translating said selected one of said code module at said second computer from said programming code into machine code utilizable by said second computer.

13. The method defined in claim 8 wherein said machine-executable code modules each incorporate an author identification, further comprising, in response to an instruction received by said first computer over said network and prior to executing said one of said machine-executable code modules on said first computer, determining whether the particular author identification incorporated in said one of said machine-executable code modules is an allowed identification and proceeding with the executing of said one of said machine-executable code modules only if said particular author identification is an allowable identification.

14. The method defined in claim 8 wherein the storing of said portion of said applications program in said first computer includes caching said code modules in a nonvolatile memory of said first computer.

15. The method defined in claim 8, further comprising transmitting a request from said first computer to said second computer for a machine-executable code module during an idle time on said first computer.

16. A computing system comprising:
digital processing circuitry;
a nonvolatile memory storing general operations programming and an applications program, said applications program including a plurality of interacting individual and independent machine-executable code modules, said memory being connected to said processing circuitry to enable access to said memory by said processing circuitry;
a communications link for communicating data and programs over a network to a remote computer; and
a code module exchange means operatively connected to said memory and to said communications link for retrieving a single code module from among said machine-executable code modules and transferring said single code module to said remote computer in response to a request for said single code module from said remote computer.

17. The computing system defined in claim 16 wherein said computing system is a server computer on said network.

18. The computing system define in claim 17 wherein said memory contains a list of secondary servers on said network, said list including response times for the respective secondary servers, further comprising:
detection means for detecting an overload condition of the computing system, and
server selection means operatively connected to said detection means, said memory and said communications link for determining which of said secondary servers has a shortest response time and for shunting an incoming user request to the secondary server with the shortest response time when said overload condition exists at a time of arrival of said user request.

19. The computing system defined in claim 18 wherein the secondary server to which said user request is shunted is said remote computer, said single code module being required for enabling said remote computer to process the user request.

20. The computing system defined in claim 18, further comprising updating means operatively connected to said memory and said communications link for (I) periodically sending echo packets to said secondary servers, (II) measuring delays between the sending of said echo packets and a receiving of responses to said echo packets from the respective secondary servers, and (III) updating the response times in said list in accordance with the measured delays.

21. The computing system defined in claim 17 wherein said network is the Internet.

22. The computing system defined in claim 16 wherein said memory contains a stored list of user authentification codes, further comprising comparison means for comparing a user authentification code in said request with said list of user authentification codes in said memory and for preventing code-module retrieval and transmission in the event that the user authentification code in said request fails to correspond to any user authentification code in said list.

23. The computing system defined in claim 22 wherein said request from said remote computer is contained in an encryption packet, further comprising means connected to said communications link and said comparison means for decrypting said encryption packet prior to the comparing of said user authentification code in said request with said list of user authentification codes in said memory.

24. The computing system defined in claim 16, further comprising means for determining whether a requested code module has an updated version and for responding to said request with an invitation to said remote computer to accept the updated version of the requested code module.

25. The computing system defined in claim 16 wherein said machine-executable code modules are written in a user-friendly programming code, further comprising an interpreter for translating said programming code into machine code directly utilizable by said processing circuitry.

26. A computing system comprising:
a first computer;
a second computer remotely located relative to said first computer;
communications links at said first computer and said second computer for tying said first computer and said second computer to one another over a network,
said first computer including a nonvolatile memory storing at least a portion of an applications program, said applications program including a plurality of interacting individual and independent machine-executable code modules,
each of the computers being provided with code module exchange means for cooperating with the code module exchange means of the other computer to transfer a single code module from among said machine-executable code modules from said first computer to said second computer.

27. The computing system defined in claim 26 wherein said first computer is a primary server and said second computer is a secondary server on said network, said first computer including detection means for detecting an overload condition of said first computer, said first computer further including shunting means operatively connected to said detection means and the communications link at said first computer for shunting an incoming user request to said second computer when said overload condition exists at a time of arrival of said user request.

28. The computing system defined in claim 27 wherein said first computer further includes updating means operatively connected to said memory and said communications link for (I) periodically sending echo packets to a plurality of secondary servers on said network, (II) measuring delays between the sending of said echo packets and a receiving of responses to said echo packets from the respective secondary servers, and (III) updating the response times in a list in said memory in accordance with the measured delays.

29. The computing system defined in claim 26 wherein said first computer is a server computer and said second computer is a user computer.

30. A computing system comprising:
   a memory storing a portion of an applications program, said applications program comprising a plurality of interacting individual and independent machine-executable code modules, only some of said machine-executable code modules being stored in said memory;
   digital processing circuitry operatively connected to said memory for executing at least one of said machine-executable code modules;
   a communications link for communicating data and programs over a network to a remote computer; and
   a code module exchange means operatively connected to said memory and to said communications link for communicating with a remote computer via a network link to obtain from said remote computer a further machine-executable code module of said applications program, said digital processing circuitry being operatively tied to said code module exchange means for executing said further machine-executable code module upon reception thereof from said remote computer.

31. The computing system defined in claim 30 wherein said computing system is a user computer on said network and said remote computer is a server computer.

32. The computing system defined in claim 31 wherein said memory contains a list of servers on said network, said list including response times for the respective servers, further comprising server selection means operatively connected to said memory and said code module exchange means for instructing said code module exchange means to communicate with a server selected from among said secondary servers as having a shortest response time, said remote computer being the selected server.

33. The computing system defined in claim 32, further comprising updating means operatively connected to said memory and said communications link for (I) periodically sending echo packets to said servers, (II) measuring delays between the sending of said echo packets and receiving of responses to said echo packets from the respective servers, and (III) updating the response times in said list in accordance with the measured delays.

34. The computing system defined in claim 30, further comprising a software modified circuit operatively connected to said code module exchange means for encrypting communications transmitted to said remote computer and for decrypting communications received from said remote computer.

35. The computing system defined in claim 30 wherein said machine-executable code modules are written in a user-friendly programming code, further comprising an interpreter for translating said programming code into machine code directly utilizable by said processing circuitry.

36. A method for distributing processing among computers on a computer network, comprising:
   storing an applications program in a nonvolatile memory of a first computer, said applications program being stored as a plurality of interacting individual and independent machine-executable code modules;
   executing portions of said applications program on said first computer;
   transmitting a request over a network link to said first computer from a second computer not running at full capacity, said request being to take over a part of a work load of said first computer;
   in response to said request from said second computer, selectively transmitting machine-executable code modules of said applications program from said first computer to said second computer over said network link, the transmitted code modules being less than all of the code modules of said applications program; and
   operating said second computer to follow programming instructions in the transmitted code modules to assist said first computer in executing its work load.

* * * * *